Aug. 8, 1961 F. G. STEELE 2,995,729
ELECTRONIC DIGITAL INVENTORY COMPUTER
Filed Feb. 17, 1956 6 Sheets-Sheet 2
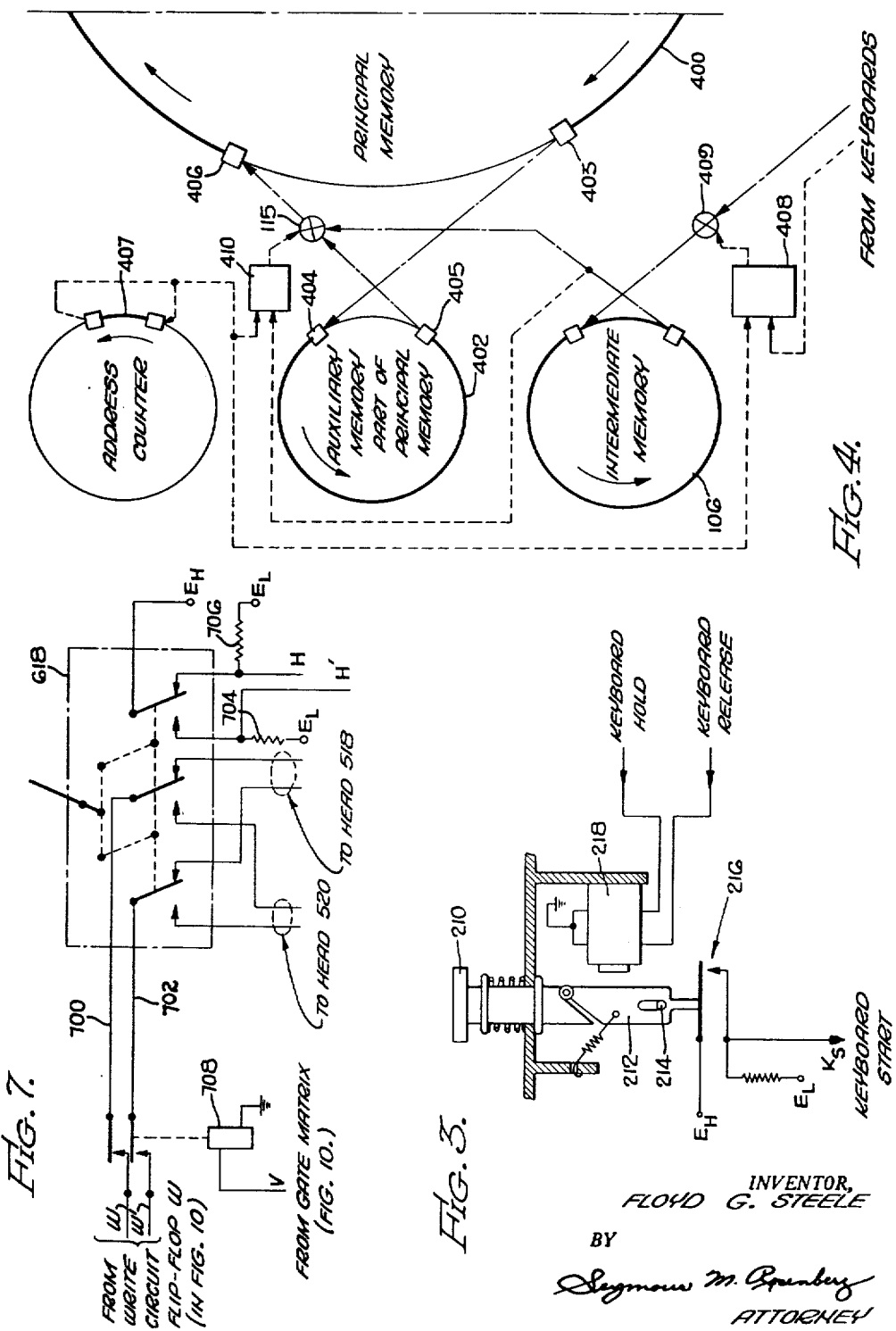
INVENTOR,
FLOYD G. STEELE
BY
Seymour M. Greenberg
ATTORNEY Aug. 8, 1961  F. G. STEELE  2,995,729
ELECTRONIC DIGITAL INVENTORY COMPUTER
Filed Feb. 17, 1956  6 Sheets-Sheet 3

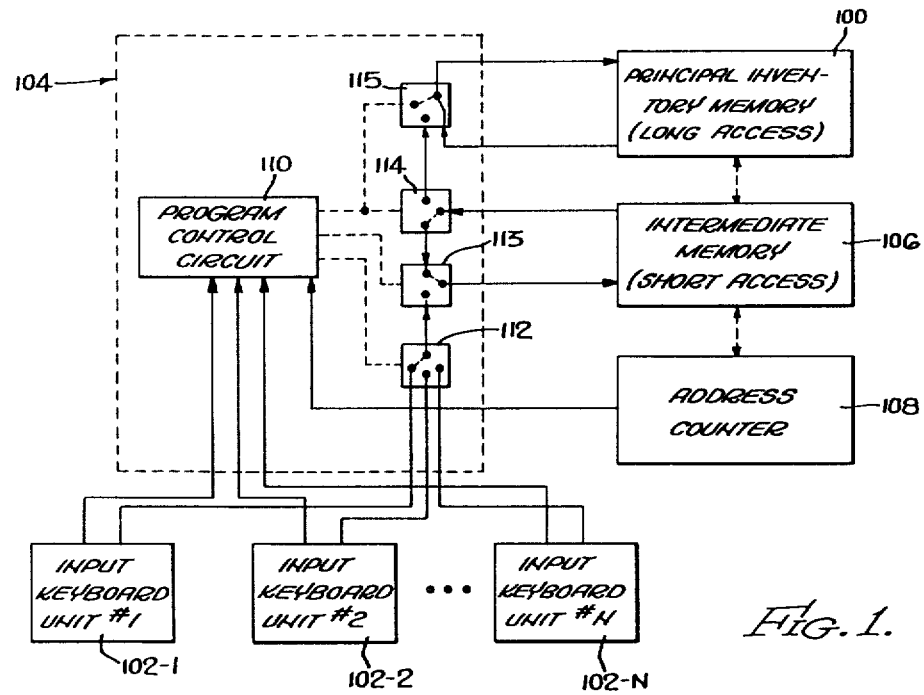
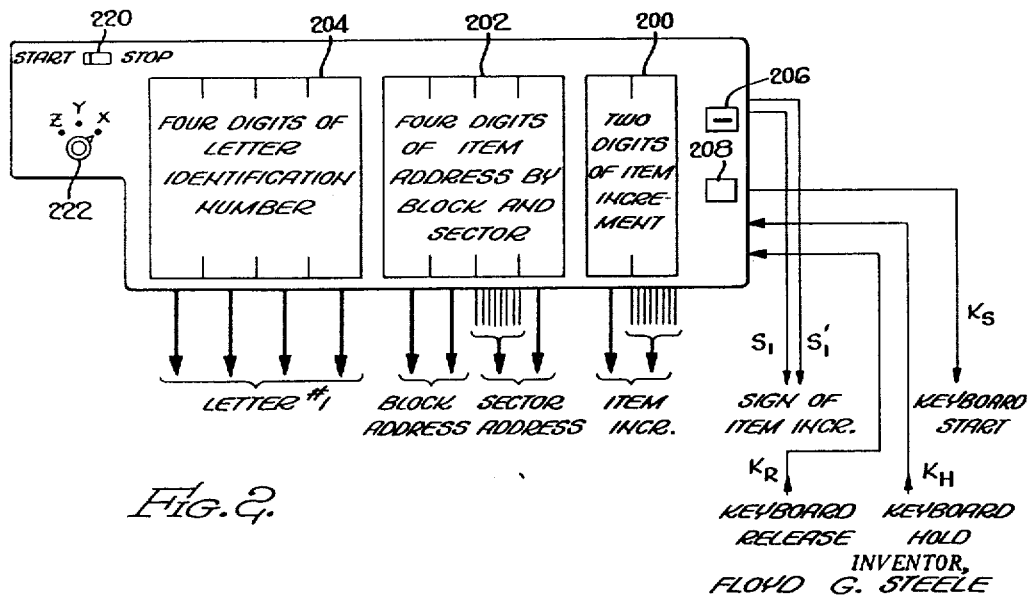
Fig. 1.
Fig. 2.

INVENTOR.
FLOYD G. STEELE
BY
Seymour M. Rosenberg
ATTORNEY

Aug. 8, 1961    F. G. STEELE    2,995,729
ELECTRONIC DIGITAL INVENTORY COMPUTER
Filed Feb. 17, 1956    6 Sheets-Sheet 4

INVENTOR,
FLOYD G. STEELE
BY
Seymour M. Rosenberg
ATTORNEY

INVENTOR,
FLOYD G. STEELE
BY
Seymour M. Rosenberg
ATTORNEY

United States Patent Office 2,995,729
Patented Aug. 8, 1961

2,995,729
ELECTRONIC DIGITAL INVENTORY COMPUTER
Floyd G. Steele, La Jolla, Calif., assignor to Digital Control Systems, Inc., La Jolla, Calif., a corporation of California
Filed Feb. 17, 1956, Ser. No. 566,219
33 Claims. (Cl. 340—172.5)

This invention relates to electronic digital inventory computers, and more specifically to a digital inventory computer which employs an intermediate memory, synchronized with a principal inventory memory, as in input buffer unit for receiving a plurality of inventory change orders and for subsequently modifying the corresponding inventory item quantities in accordance with the change orders whenever the item quantities are presented by the principal memory for modification.

It has long been recognized that high speed electronic digital computers are especially useful for processing business data both rapidly and reliably, and numerous computers have been constructed for solving the many data processing problems which businessmen encounter. Although almost all of these computers have increased the efficiency of data processing systems in which they are utilized, it is nevertheless true that many business data handling computers are needlessly complex and expensive, and do not accept input data at the maximum rate which should be achieved in view of their complexity.

Especially is this true in those business data handling computers which have been designed to handle one particular business data problem, namely, the maintenance of a running inventory on a number of items whose quantities are constantly subject to change. Computers of this general category are most commonly used in department stores or mail order houses for maintaining a running inventory on the various merchandise items in stock or back-ordered, although similar computers are also used by public carriers for tallying passenger reservations and for indicating the number of passenger accommodations still available on particular trains or aircraft flights.

In the inventory computers of the prior art it is common practice to enter one inventory item change into the computer at a time, the computer thereafter remaining inaccessible to other entries until the first entry received has been used to modify its associated item quantity. Owing to the fact that the memory or storage unit in these computers is usually a serial device such as a magnetic drum, the delay created by completely handling one item change at a time, to the exclusion of all other item changes, greatly reduces the rate at which input entries may be made.

In at least one prior art inventory computer the problem of inefficient use of time has been partially solved by dividing the principal inventory memory, containing the item quantities, into a large number of parallel tracks on the memory drum. Accordingly, when an inventory change entry is received, it is only necessary to scan the part of the principal memory in one of the parallel tracks to obtain the old inventory item quantity and to change it. Although this scheme represents an improvement, the average rate of entry is still limited to one entry for every one and one-half drum revolutions. Of considerable more significance, however, is the fact that the utilization of parallel tracks for the principal memory greatly increases the size and complexity of the computer and concomitantly decreases its reliability.

Still other disadvantages of the prior art inventory computers reside in the fact that the registers employed for receiving input information invariably consist of a plurality of flip-flops or bistable multivibrators which contribute to increased cost, decreased reliability and poor volumetric efficiency. In a similar manner, the counters utilized for counting off successive inventory items, to determine when the proper item quantity is available during the memory scanning operation, also use a relatively large number of bistable storage elements with their attendant disadvantages.

According to the present invention, on the other hand, there is provided a wholly new concept in inventory computers which contributes to high volumetric efficiency, relatively few components and an exceptionally high input entry rate. According to the basic concept of the invention, the inventory computers herein disclosed employ an intermediate recirculating memory, synchronized with a serial principal inventory memory, and operative as an input buffer for receiving a plurality of inventory change orders during each recirculation of the intermediate memory, the change orders received being stored in the intermediate memory until they can be employed subsequently for modifying the corresponding inventory item quantities when they are presented by the principal memory.

Stated differently, in its most basic form the inventory computers of the invention employ a relatively long memory loop for serially storing signals representing a large number of items, and a relatively short memory loop operable in synchronism with the long loop, each storage spot in the short loop corresponding to an integral number of equally time-spaced storage spots in the long loop so that the contents of a spot in the short loop are repetitively presented simultaneous with the sequential presentation by the long loop of the corresponding spaced spots. Entries of input information from one or more input devices are stored in the short storage spots corresponding to the long loop storage spots for which the entries are intended; each entry then remains temporarily in the short loop until its predetermined long loop storage spot is accessible, at which time the entry is also accessible and is combined with the contents of the long loop storage spot.

In the specific inventory computer to be described and shown in detail hereinafter, the principal inventory memory is divided into a plurality of sequential blocks each of which is divided into a plurality of sectors, each sector being capable of storing intelligence information pertaining to one particular item. The intermediate recirculating memory, or in other words the short loop described hereinabove, is one block in length, includes the same number of sectors as each block in the principal memory, and is operable in synchronism with the principal memory. In addition the intermediate memory operates in synchronism with an address counter which serially presents output signals corresponding to the sector and block addresses of each group of item information sequentially presented for modification by the principal memory.

In operation each inventory change entry applied to the computer includes signals representing the block and sector address of the inventory item for which the change is intended, the sector address being compared with the cyclically changing sector address generated by the address counter until an affirmative comparison results, at which time the inventory change and its sign, together with the accompanying block address signals, are entered in the intermediate memory sector which next appears.

On subsequent recirculations the block addresses thus stored in the intermediate memory are then compared with the block address as indicated by the address counter, an affirmative comparison initiating a transfer of the associated item change out of the intermediate memory and into the principal memory where it is combined with the inventory item information to which it pertains.

The foregoing concept of utilizing descending information loops for buffering input information from one or more input devices into a relatively large memory permits exceptionally high entry rates with a minimum of equipment, especially where both the intermediate and principal memories merely comprise tracks on a magnetic drum. Moreover the concept may be employed in other forms of data handling machines for merely identifying items stored in a relatively large memory, or for collating a large number of randomly occurring items.

According to still another feature of the invention there is provided a relatively long recirculating memory which comprises a magnetic drum and associated reading and writing transducers which are moveable along the drum parallel to the axis thereof and in synchronism with the drum rotation, thereby providing a spiral track memory on the drum. By utilizing a pair of reading and writing transducers in conjunction with a level windshaft or similar device for imparting reciprocating motion to the transducers, a continuous long memory is provided which constitutes two spiral tracks whose ends close upon each other.

An additional feature of the invention is the provision of a binary coded decimal address counter which comprises a recirculating memory on the magnetic drum, and means for increasing the digits of the count as they are recirculated through the memory, the carry digits produced by an overflow in any decade being entered in an associated precessing channel on the magnetic drum so that they subsequently reappear prior to the appearance of the count digit to which they pertain. These carry digits are then stored in front of the decade digit to which they pertain so that upon subsequent receipt of a carry signal from the next lower decade an excess code fix-up may be made to the decade digit.

The specific inventory computer herein disclosed in detail also employs precessing channels for performing other novel functions, as for example to erase on a subsequent memory recirculation a mark signal which is used to initiate an electronic comparison operation, a control signal being entered in a precessing channel for subsequently causing erasure of the mark signal only if the results of the comparison are affirmative.

It is, therefore, an object of the invention to provide business data handling computers which employ an intermediate recirculating memory as an input buffer unit to provide an optimum rate of entering input information into a relatively long principal memory.

It is another object of the invention to provide business data handling computers which rapidly accept input information to be stored in a relatively large principal recirculating memory, the input information entered being stored temporarily in an intermediate recirculating memory until it can be transferred to the principal memory.

A further object of the invention is to provide relatively small and inexpensive business data handling computers which accept input information at a relatively high rate, store the information temporarily in a relatively short memory loop, and subsequently transfer the information to predetermined spots in a relatively long memory loop operable in synchronism with the short loop.

An additional object of the invention is to provide a relatively inexpensive inventory computer which accepts inventory item change orders at a relatively high rate by temporarily storing the change orders in predetermined spots in an intermediate recirculating memory until the inventory items to which they pertain are presented by a principal inventory memory operable in synchronism with the intermediate memory.

It is also an object of the invention to provide an inventory computer capable of receiving inventory change orders at a relatively high rate, the computer being operable to store temporarily the change orders in predetermined locations in a relatively short, recirculating memory loop until the inventory items to which they pertain are presented by a relatively long memory loop operable in synchronism with the short loop, and to combine the change orders with the pertinent item information and restore the combined information in the long loop.

Still another object of the invention is to provide a relatively long serial memory on a magnetic drum by moving a magnetic recording transducer parallel to the axis of the drum in synchronism with rotation of the drum to record a spiral track thereon.

A still further object of the invention is to provide a relatively long recirculating memory on a magnetic track by reciprocatingly moving a pair of magnetic reading transducers and a pair of magnetic writing transducers parallel to the axis of the drum in synchronism with the rotation thereof to provide a pair of spiral tracks on the drum, one transducer of each pair being operative while the transducers are moving in one direction while the other transducer of each pair is operative while the transducers are moving in the opposite direction.

Still an additional object of the invention is to provide a binary coded decimal counter which comprises a circulating memory on a magnetic drum, means for increasing the count in unit steps as the digits thereof are recirculated through the memory, and a precessing memory channel for precessing overflow carry signals from the decade digits with respect to the circulating memory so that the overflow carry signals reappear prior to the reappearance of the decade digits to which they pertain, thereby providing means for making an excess code fix-up on the pertinent decade digit when a carry signal is received from the next lower order decade digit.

Still another object of the invention is to provide means for erasing on a subsequent memory recirculation a mark signal which is used to initiate an electronic comparison operation on signals serially following the mark signal, a control signal being entered in a precessing channel for subsequently causing erasure of the mark signal only if the results of the comparison are affirmative.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

FIG. 1 is a block diagram of a digital inventory computer according to the invention, illustrating its basic mode of operation;

FIG. 2 is a block diagram of one form of keyboard input device which may be employed with inventory computers constructed in accordance with the invention;

FIG. 3 is a schematic diagram of one form of automatically releasable start switch which may be employed in the keyboard input device of FIG. 2;

FIG. 4 is an information flow diagram which illustrates diagrammatically the manner in which inventory change information is handled by a specific embodiment of the invention;

FIG. 7 is a schematic view of a magnetic transducer switch for switching alternately between the two spiral tracks on the drum of FIG. 5 in response to movement of the magnetic transducers by the device of FIG. 6;

Figure 9:
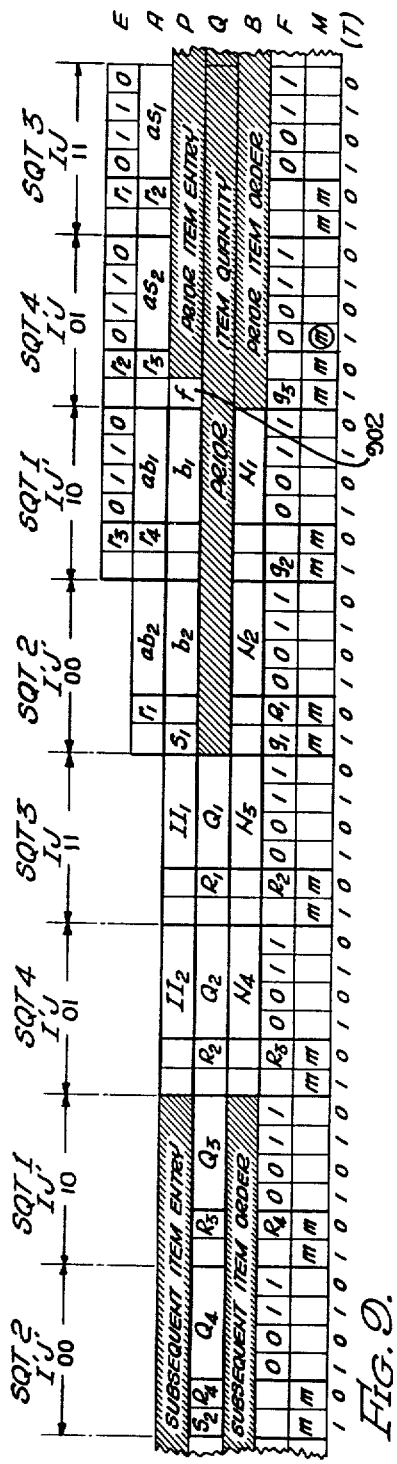
FIG. 9 is a diagram of the word structure employed in the specific embodiment of the inventory computer of the invention to be hereinafter described.
Figure 10:
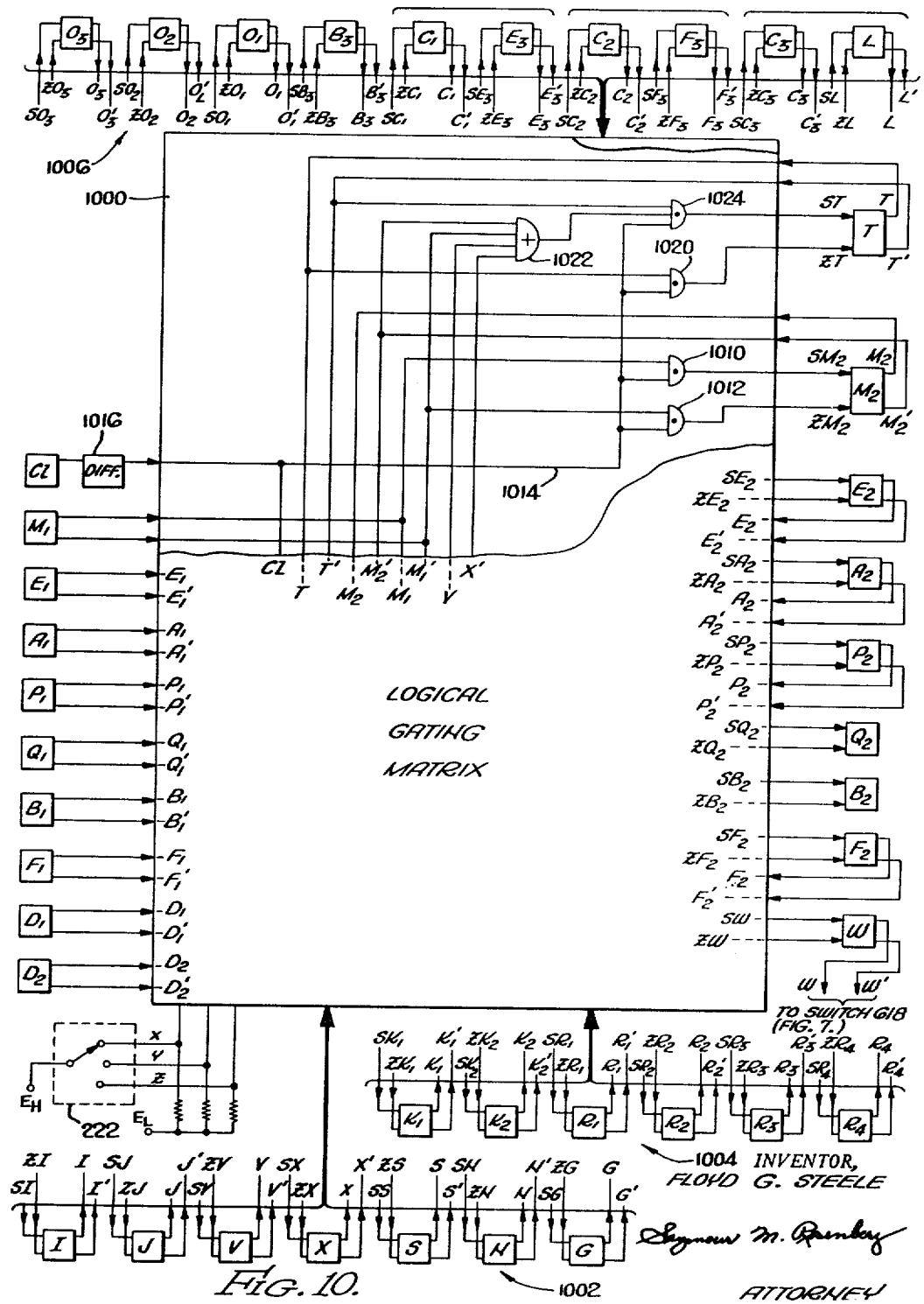
Figure 11:
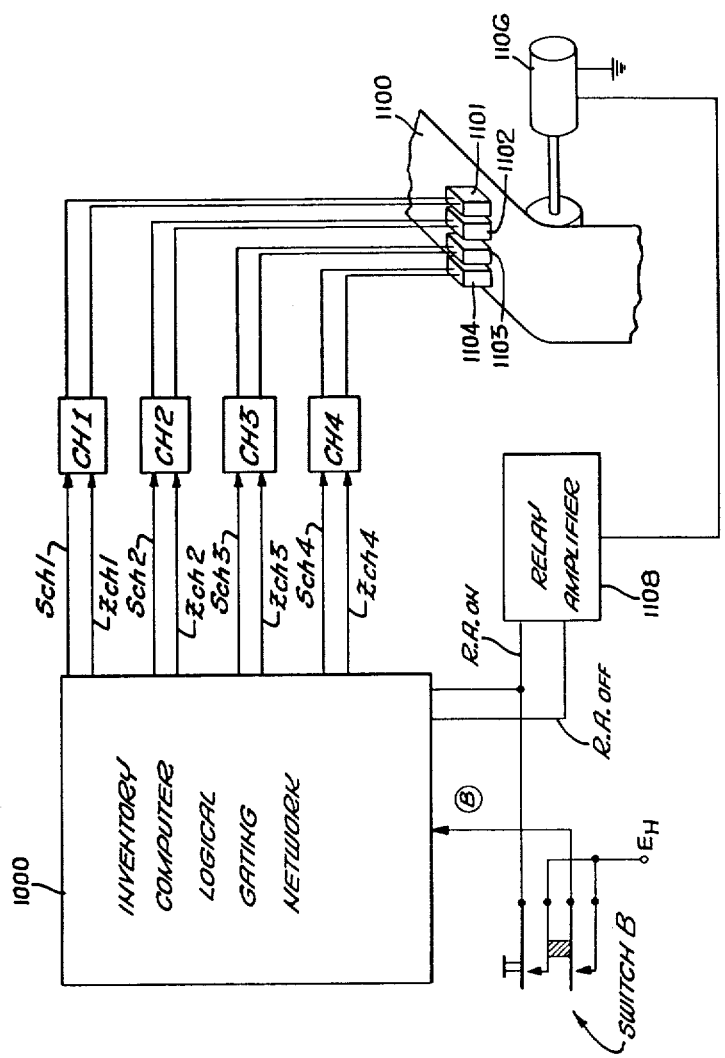

FIG. 10 is a block diagram, partly in schematic form, illustrating the various control elements of the invention, and includes an exemplary showing of the manner in which the input signals to the control elements may be generated by interconnecting electronic gating circuits in accordance with predetermined logical equations; and FIG. 11 is a block diagram, partly in schematic form, illustrating one form of read-out device which may be utilized with the specific embodiment of the invention shown in FIGS. 4 through 10.

For purposes of description it will be assumed hereinafter that the computer is to operate with, upon, and in response to signals representing binary coded decimal numbers, although it will be clear from both the general and detailed description set forth hereinbelow that the fundamental concepts of the invention are equally applicable to operation with numbers represented in the conventional binary system of notation. Hereinafter it will also be assumed for purposes of illustration that the computer is being employed for maintaining a running inventory of the cataloged items in a mail order house which has not more than ninety-six hundred catalog items and not more than ten thousand of any one item either on hand or back-ordered. It is to be understood that this limitation is also set forth merely to simplify the subsequent operational description, and that it will be apparent that larger inventories may be handled by inventory computers constructed in accordance with the teachings of the present invention.

With reference now to the drawings, wherein like or corresponding parts are designated by the same reference characters throughout the several views, there is shown in FIG. 1 a block diagram of a digital inventory computer according to the invention, illustrating its fundamental elements and mode of operation. Basically the inventory computer is operative to store in a recirculating principal inventory memory, designated 100, electrical signals representative of a plurality of inventory items and indicative of the quantity of each inventory item either available or back-ordered, and is selectively operable to modify the inventory item quantities either positively or negatively by modifying the signals stored in the memory in response to inventory change signals received from one or more input devices such as keyboard units 102–1 through 102–N, for example. As shown in FIG. 1 the inventory computer includes, in addition to the aforementioned elements, a control network generally designated 104 which controls the various routines and subroutines of the computer, an intermediate memory 106 synchronized with principal memory 100 and utilized as a buffer storage unit for receiving and storing signals from the input keyboard units until the corresponding and appropriate signals from the principal memory are presented to be modified, and an address counter 108 synchronized with principal memory 100 and intermediate memory 104 for sequentially generating signals representative of the address of the sequential inventory item signals presented at the output circuit of the recirculating principal memory.

Before proceeding further with the detailed descriptions of the inventory computer of this invention, it is essential to first fully comprehend the basic information storage technique employed therein. In essence, all of inventory data, or in other words, the quantities of the inventory items either available or back-ordered, are stored in a plurality of information blocks, the information blocks in turn including a plurality of what will hereinafter be termed sectors, each sector being associated with and corresponding to one particular inventory item.

For purposes of simplicity and to facilitate the description of the invention, it will be assumed that the particular inventory computer to be described hereinafter is theoretically capable of processing ten thousand different inventory items, these items being addressed in one hundred information blocks each of which includes one hundred inventory item sectors. The term "theoretically capable" is employed hereinabove because the particular embodiment to be described hereinbelow actually stores only ninety-six hundred inventory items, the remaining four hundred inventory items being omitted to permit switching of the memory reading and writing transducers during the intervals through which the remaining four hundred inventory items would normally be processed.

In the operation of the inventory computer of this invention, the entire inventory is stored in principal memory 100 which is a single long access recirculating memory, the entire inventory stored being serially presented block by block, and sector by sector within each block, once during each cycle of the computer. As each inventory item is serially presented address counter 108 advances concomitantly, the lower order digits of the address count corresponding to the sector number in which the inventory item being presented is stored, while the higher order digits of the address count correspond to the block number of the inventory information block being presented at the output circuit of the principal memory 100.

Intermediate memory 106, on the other hand, is a relatively short access recirculating memory which has a total length of one information block, the intermediate memory being divided into one hundred item sectors corresponding to the one hundred item sectors contained in each of the information blocks stored in the principal inventory memory. By virtue of the synchronization between principal memory 100 and intermediate memory 106, the intermediate memory functions to sequentially present its entire information storage block at its output circuit simultaneous with the presentation of each inventory information block at the output circuit of the principal memory, the designation of the item sectors sequentially presented by the intermediate memory corresponding to the designation of the sequential item sectors of whichever information block is simultaneously being presented at the output circuit of the principal memory.

Before continuing further with the generalized operation of the inventory computer of FIG. 1, consider first the content of the inventory change data which is made available to the computer and the manner in which it is set up in the keyboard input units. With reference now to FIG. 2, the input keyboard includes three key units 200, 202 and 204 for respectively entering inventory item change data, inventory item address data, and order identification data. In addition, each input keyboard includes a sign button 206 which is employed for indicating whether the item change data is to be added or subtracted from the present inventory memory, and a start button 208 which is depressed to engage the inventory computer after the appropriate data has been set up in key units 200, 202 and 204.

Keyboard start button 208 is preferably an automatically releasable switch so that the keyboard unit may be disengaged automatically from the computer after data entry has been completed or in case the data set into the keyboard cannot be entered. For example, there is shown schematically in FIG. 3 one form of start button which may be employed in each keyboard input device, the start button including a manually depressible switch piston 210 which cooperates with a spring loaded switch actuator 212 slidably mounted on a pivot pin 214 for closing a pair of start contacts 216 to transmit a keyboard start signal $K_s$ to the inventory computer.

If the start button is released manually after data entry has been started but before data entry is completed, the computer will continue to hold the keyboard until entry is completed, as will be described later. However, if the data is entered before the start button is released, a keyboard release signal $K_R$ is received which energizes a solenoid 218 to disengage actuator 212 from piston 210 by rotating the actuator about pivot pin 214, thereby permitting the associated spring to move the actuator to open start contacts 216. In a similar manner receipt of a keyboard hold signal $K_H$ from the computer will also release the keyboard start button, the distinction between the keyboard hold and release signals being that the hold signal releases only start contacts 216 whereas the keyboard release signal is also applied to another solenoid, not shown, for actuating a keyboard release mechanism which restores those keys in key units 200, 202 and 204 which have been depressed.

Referring back to FIG. 2, key unit 200 includes two key decades, not shown in detail, which are employed for representing the units and tens decade digits of the incremental item change by which a predetermined inventory item quantity is to be modified. In a similar manner, key units 202 and 204 each include four key decades, not shown in detail, the decades of key unit 204 being utilized for keying up the decade digits of identification numbers employed for identifying the individual inventory change orders, while the decades of key unit 202 are utilized to key up the decimal digits of the units, tens, hundreds and thousands decades of the address of the inventory item quantity which is to be modified. It should be noted here that, inasmuch as the inventory includes one hundred information blocks each including one hundred inventory item sectors, the units and tens decades of the item address correspond to the sector address of the inventory item being changed while the hundreds and thousands decades of the item address designate the particular information block in which the item to be changed is located.

As set forth hereinabove, the numerical data set up in the keyboards is transmitted to the computer as electrical signals representing binary coded decimal digits; accordingly, each key decade has associated therewith eight output conductors, as illustrated by the output busses from the units key decade of key unit 200 and the tens key decade of key unit 202. Each set of eight conductors is in turn broken down into four pairs of conductors representing the progressive binary weights of 1, 2, 4 and 8, the two conductors in each pair being utilized to indicate whether the correspondingly weighted binary digit has a value of one or zero.

The actual key mechanisms employed in key units 200 through 204 may conform to any of numerous conventional structures, and preferably include either a mechanical or electrical hold feature for constraining those keys which have been depressed until either a keyboard release signal is received from the inventory computer, or until another key in the same decade is depressed if, for example, an initial mistake was made in keying the digit. Structures which may be employed for energizing the output conductors from each key decade in accordance with the digit key therein depressed are also well known to the art and may be of the type shown and described in Section 15–6 of "High Speed Computer Devices" by Engineering Research Associates, published in 1950 by the McGraw-Hill Book Company of New York, N.Y.

It will be recognized by those skilled in the computer art that there are several different binary coded decimal codes which may be employed in the key decade conversion matrices, such as the excess-zero code, excess-three code, and excess-six code, for example. For purposes of maintaining structural simplicity in the control network of the particular embodiment of the inventory computer herein shown and described, it will be assumed that the item change data presented by key unit 200 in FIG. 2 is coded in the excess-three system, while the units decade and the tens, hundreds and thousands decades of the item address data are coded in two different modified excess-six code systems. The item reference number key unit 204, on the other hand, may employ any code which is desired, the reasons therefor being more clearly understood from the detailed description to be presented hereinafter. The following table sets forth the codes employed in item change key unit 200 and address key unit 202, and correlates the digit keys within each decade with the binary coded decimal numbers presented on the four output conductor pairs of each decade upon depression of the associated key:

TABLE I

| Digit key | Item change code for both decades | Address decades units | Others |
|---|---|---|---|
| 0 | 0011 | 0000 | 0000 |
| 1 | 0100 | 0001 | 0111 |
| 2 | 0101 | 1000 | 1000 |
| 3 | 0110 | 1001 | 1001 |
| 4 | 0111 | 1010 | 1010 |
| 5 | 1000 | 1011 | 1011 |
| 6 | 1001 | 1100 | 1100 |
| 7 | 1010 | 1101 | 1101 |
| 8 | 1011 | 1110 | 1110 |
| 9 | 1100 | 1111 | 1111 |

It should be noted that the decimal digits 2 through 9 in the units decade of the address and the decimal digits 1 through 9 in the other decades of the address are represented in the excess-six code, while the digit 0 in all decades and the digit 1 in the units decade are represented in the excess-zero code. The reason for employing these modified codes is to secure correspondence between the keyboard address code and the count sequence in which the address counter in the computer progresses.

Before returning to the description of FIG. 1 it should also be pointed out that one of the keyboard input units is a master keyboard and includes auxiliary equipment which is employed for starting the computer and for initiating certain preliminary routines employed to insure proper operation during the subsequent inventory change operations. Thus as shown in FIG. 2, one of the keyboard units includes a start switch 220 for energizing the computer, and a program control switch 222 having three positions Z, Y and X, respectively, which are sequentially engaged during the starting operation. The routines thus initiated are tabulated as follows and will be described more particularly in the subsequent detailed description of the invention.

TABLE II

| Switch position | Routine |
|---|---|
| Z | Clear. |
| Y | Prepare to Compute. |
| X | Compute. |

Returning now to the description of FIG. 1 and with reference in particular to control network 104, the general flow of inventory data in the computer will be described. Basically the control network includes a program control circuit 110 and a plurality of diagrammatically illustrated switching matrices 112 through 115 which are operative under the guidance of the program control circuit for controlling the flow of inventory data from the input keyboard units, and into and out of the principal and intermediate memories. In their normal condition matrices 113, 114 and 115 merely function to recirculate the inventory data in both the principal and intermediate memories, while matrix 112 is dormant.

Assume now that an inventory change is keyed into one of the keyboard input units and the associated start button is depressed. The resultant keyboard start signal thereby generated is applied to program control circuit 110 which functions to lock out the remaining input keyboard units, and to initiate a comparison operation in which the sector address of the item change, as set up in the selected input keyboard, is compared with the sector count portion of the count presented by address counter 108. When correspondence between the item sector address and the sector count is achieved, switching matrices 112 and 113 are actuated for one sector interval by control circuit 110 to shift into intermediate memory 106 from the selected input keyboard, the item increment or change, the sign of the item increment, and the block address of the item increment. During this operation the control circuit also functions to initially store a "sector filled" mark in the intermediate memory designating that the following sector is filled, and, after entry has been completed, releases the keyboard from which data has been received.

Thereafter additional item changes may be entered in the keyboard units and in turn entered in the intermediate memory, the only restriction being that a subsequent inventory change destined for a sector address which is already filled in the intermediate memory will be temporarily rejected until that sector in the intermediate memory is emptied. The temporary rejection order is accomplished by transmitting a keyboard hold signal $K_H$ to the rejected keyboard which releases the keyboard start pushbutton as previously described in connection with FIG. 3, and makes it mandatory to first release and then again depress the start button to enter the item change.

Returning again to the generalized description of operation, each time a "sector filled" mark is presented at the output circuit of the intermediate memory as it continuously recirculates, control circuit 110 functions to initiate a comparison between the block address of the item change stored in the intermediate memory, and the block count represented by the address signal generated by the address counter. When correspondence of block address and block count is achieved, control circuit 110 then functions to actuate switching matrix 114 to divert the signals representing the item increment and its sign from the intermediate memory to switching matrix 115 wherein they are combined with the signals representing the quantity of the item either on hand or back-ordered, the output signals from matrix 115 representing a new item sum or difference quantity, depending upon the signs of the item increment and of the old item quantity, the new item quantity being returned to principal inventory memory 100. In addition, control circuit 110 functions to erase the "sector filled" mark stored in the intermediate memory so that the particular sector which has just been emptied may again be filled.

It is clear from the foregoing generalized description that the longest period through which an inventory change or item increment may be stored in the intermediate memory is the time required for one complete cycle of the principal inventiory memory, the average storage time in the intermediate memory being only one-half of one complete computer cycle. In practice this interval is actually relatively short, since for a ten thousand item inventory such as has been hypothecated a complete computer cycle will be of the order of one to four seconds, depending upon the basic clock rate at which the computer is operated.

It will also be recognized from the description set forth hereinabove that a plurality of entries may be made into the intermediate memory during each recirculation thereof, and that a plurality of dispersals may be made from the intermediate memory to the principal memory during each recirculation of the intermediate memory. As a matter of fact, the particular inventory computer described in detail hereinbelow has a maximum theoretical keyboard entry rate of fifty entries per revolution of the intermediate memory, which takes of the order of .01 to .04 second for the assumed one hundred information block computer. Similarly, it may be shown that the detailed computer to be described hereinafter is capable of transferring a full one hundred item changes from the intermediate memory to the principal memory during one recirculation of the intermediate memory.

It should be emphasized that the basic block diagram of FIG. 1 is generic to both serial and parallel operation, and to operation on either conventional binary coded data or binary coded decimal data. It should also be pointed out that the memory units may employ any of the known forms of storage devices, such as a magnetic drum or tape, electrostatic storage tubes, or a magnetic core matrix, for example. Of these a magetic memory is preferable for inventory purposes owing to the fact that the information storage is non-volatile in nature, or in other words, remains in the memory even though the computer is temporarily shut-down. With reference now to FIG. 4, there is shown in more specific forms the information flow pattern in a serially operable inventory computer, according to the invention, which operates upon and in response to binary coded decimal data signals, and wherein the memory units comprise magnetizable tracks on one or more magnetic drums, discs or tapes.

Referring now with particularity to the information flow pattern of FIG. 4, the principal memory includes a long channel 400 and an auxiliary channel 402, the main inventory data being presented at an output or reading transducer 403 on the long channel and in turn rewritten in the auxiliary channel by a writing transducer 404. The auxiliary channel is one information block in length and includes an output transducer 405 for reading the information serially recorded in the auxiliary channel, the information thus read being transferred to a writing transducer 406 on long channel 400 through a selectively actuable signal combining matrix 115 corresponding to matrix 115 in FIG. 1. The spacing of transducers 403 and 406 is also one information block in length, or in other words, corresponds to the length of the auxiliary channel so that each information bid read at transducer 403 will be re-recorded at transducer 406 one information block time later but on the same physically located spot or cell in long channel 400 that it formerly occupied. The purpose of the auxiliary channel 402, as will be disclosed in more detail later, is to permit a fix-up of the binary coded decimal digits following an addition or subtraction of an item increment from an item quantity, the fix-up signal being provided by inserting the sign of the carry signal from the arithmetic operation into an associated precessing channel, not here shown.

FIG. 4 also depicts the relationship of intermediate memory 106 with respect to the auxiliary channel of the principal memory, and in addition, illustrates schematically a practical form of address counter which comprises a relatively short recirculating register on an address channel 407. As will be disclosed in more detail hereinafter in connection with FIGS. 7 and 8, the address counter is one item sector in length and increases one count per recirculation, thereby keeping a paced count of the item sectors serially presented at the output circuit of the principal memory.

The first two binary coded decimal digits of the address count thus generated correspond to the sector count and are compared in a comparator circuit 408 with the sector address of item changes awaiting entry from the keyboards, an affirmative comparison functioning to open a gate 409 to store in the correspondingly designated sector of the intermediate memory the item increment or change, its sign, and the block address of the item quantity to which the increment or change pertains. It should be noted that gate 409 in FIG. 4 corresponds to switching matrices 112 and 113 in FIG. 1. The second two binary coded digits of the address count correspond to the block address of the principal memory and are compared with the block address digits accompanying each item change in the intermediate memory by a comparator circuit 410, an affirmative comparison resulting in a transfer of the item increment from intermediate memory 106 to combining matrix 115 where it is employed to modify the corresponding item quantity stored in the principal memory.

It will be recognized that if a single magnetic drum is employed as the memory medium for the inventory computer of this invention, some structure must be provided for recording the entire long channel of the principal inventory memory on the surface of the drum. This could be accomplished by employing a plurality of parallel tracks, one per information block, and by utilizing a transducer switching apparatus for sequentially shifting a common reading circuit and a common writing circuit from the transducers of each block channel to those of the adjacent channel once per block interval. Such a structure has the obvious disadvantage, however, that it requires a relatively large number of transducer heads and a relatively complex transducer switching matrix.

Figure 5:
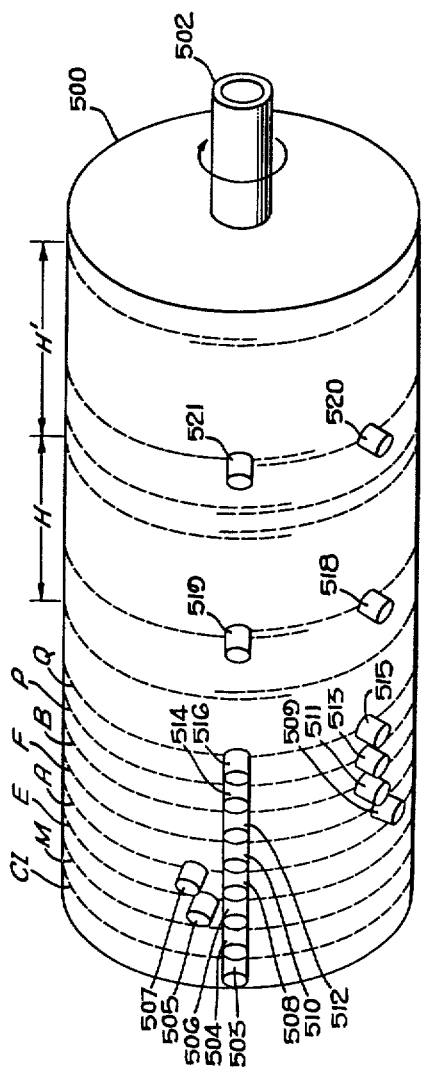
FIG. 5 is a three dimensional view of a magnetic drum memory which may be utilized in computers constructed in accordance with the invention, and illustrates the magnetic track arrangement for a specific embodiment of the invention.

With reference now to FIG. 5, there is shown one form of magnetic drum storage unit which may be utilized in the inventory computer of the invention and in which the read-write structure of the principal inventory memory is simplified through the utilization of a helically recorded long channel. Basically the storage unit includes a magnetic drum 500 which is rotatably driven by a shaft 502 from an electric motor, not shown, and a plurality of magnetic transducers or heads which are positioned adjacent the periphery of the drum by associated transducer mounting apparatus, not shown.

As shown in FIG. 5, drum 500 has a plurality of circumferentially disposed closed-loop record channels designated $Cl$ through $Q$ on its surface, the function of these tracks, together with the designation of their associated reading and writing heads being correlated by the following table:

TABLE III

| Channel | Read head | Write head | Function |
|---|---|---|---|
| Cl | 503 | None | Clock channel for generating timing pulses which operate computer. |
| M | 504 | None | Timing mark channel for dividing each item section into quadrants. |
| E | 505 | 506 | Short precessing channel employed with address channel A. |
| A | 507 | 508 | Address channel which functions with channel E as address counter. |
| F | 509 | 510 | Long precessing channel used for excess-three code fix-up of item quantities. |
| B | 511 | 512 | Storage channel for holding order identification number from keyboard. |
| P | 513 | 514 | Intermediate Channel. |
| Q | 515 | 516 | Auxiliary Channel of Principal Memory. |

The long channel of the principal memory is recorded on drum 500 as a pair of adjacent helically counterwound tracks one of which will hereinafter be designated the H domain while the other will be designated the H' domain, as illustrated in the drawing. Each of these helical tracks includes fifty sequentially recorded inventory information blocks and an associated write head and read head, the write heads for domains H and H' being desigated 518 and 520, respectively, while the read heads are designated 519 and 521, respectively. In operation both sets of read and write heads are simultaneously moved longitudinally across their respective domains in a reciprocating movement and in synchronism with the drum rotation, the H domain read and write heads being operative when the heads are moving to the left, as viewed in FIG. 5, while the H' domain read and write heads are operative when all of the heads are moving to the right.

Figure 6:
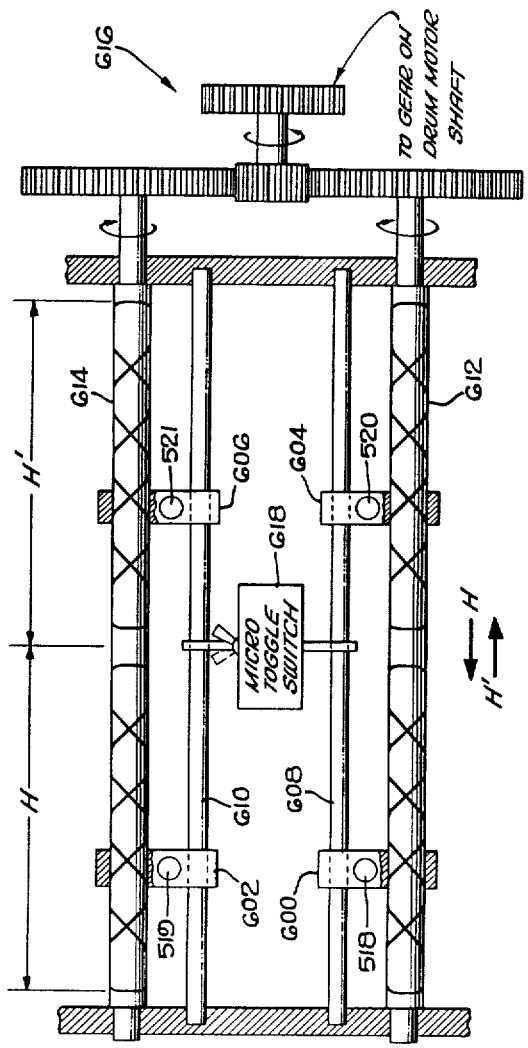
FIG. 6 is a developed view of a magnetic transducer moving device which is utilized with the drum of FIG. 5 to provide a principal inventory memory in the form of two spiral tracks on the drum.

Referring now to FIG. 6 there is shown a developed view in one form of head moving mechanism which imparts the desired reciprocating motion to the heads in synchronism with rotation of the memory drum. The mechanism includes four head mounts 600, 602, 604 and 606 for mounting heads 518, 519, 520 and 521, respectively, the head mounts being longitudinally slidable on a pair of guide rods 608 and 610 and being longitudinally driveable by a pair of duplex level-wind shafts 612 and 614. The level wind shafts are in turn driven in synchronism with the memory drum through a suitable reduction gear unit generally designated 616.

In operation, the principal inventory read and write heads are driven longitudinally across the drum surface and then back again by rotation of the level-wind shafts, read heads 519 and 521 functioning to actuate a micro-toggle switch 618 each time one or the other is moved to the center of the head moving mechanism, as viewed in FIG. 6. As shown in FIG. 7, which illustrates schematically one form of micro-toggle switch which may be employed in the head moving mechanism, actuation of the toggle switch functions to switch a pair of write condctors 700 and 702 between write heads 518 and 520. In addition, the toggle switch functions to switch a relatively high level voltage $E_H$, supplied by a source of potential only one terminal of which is shown, between a pair of output conductors H and H' which are normally maintained at a relatively low voltage $E_L$ by a pair of resistors 704 and 706. The function of signals $E_L$ and $E_H$ on conductors H and H', as will be more fully understood from the description hereinbelow, is to indicate to the computer control network whether the principal inventory write heads are operating in the H domain or in the H' domain.

It should be pointed out that only write heads 518 and 520 are switched in accordance with head movement, and that read heads 519 and 521 are continuously functioning as they move in both directions; however, it will subsequently be shown that in operation the computer accepts signals from only one read head at a time, depending upon which of the toggle switch output conductors H and H' is presenting a relatively high level voltage. It should also be pointed out that write heads 518 and 520 are completely disconnected from this associated writing circuit, not yet described, during the preliminary routines of clear and prepare to compute, this function being accomplished by a pair of normally open contacts of a relay 708 which is actuated only when the computer commences its compute routine.

If it is assumed now that the principal memory is one hundred inventory blocks long, and that blocks 0 through 49 are sequentially recorded in the H' domain while blocks 50 through 99 are seqentially recorded in the H domain, it is clear that the entire one hundred block principal memory may be sequentially scanned or interrogated in a continuous and cyclically repetitive manner. However, owing to the facts that the micro-toggle switch may not always switch at precisely the same point, that the switching action may take as long as one sector interval during which the inventory information corresponding to an item could be lost, and that it is desirable to switch the computer simultaneously from one set of read and write heads to the other set, it is clear that at least a portion of the principal inventory memory should be left blank at opposite ends of both the H and H' domains. Analysis has shown that more than adequate protection is afforded if information blocks 0 and 49 in the H' domain and blocks 50 and 99 in the H domain are left vacant, or in other words, if none of the inventory or catalog items are assigned addresses within these blocks. It will be appreciated, however, that the capacity of the principal memory is thereby decreased from ten thousand items to only ninety-six hundred items. It should also be pointed out that the same results could be achieved by employing a single level wind shaft or similar device for moving all of the reading and writing transducers, in which instance all of the transducers would be mechanically coupled by a common transducer mount.

Figure 8:
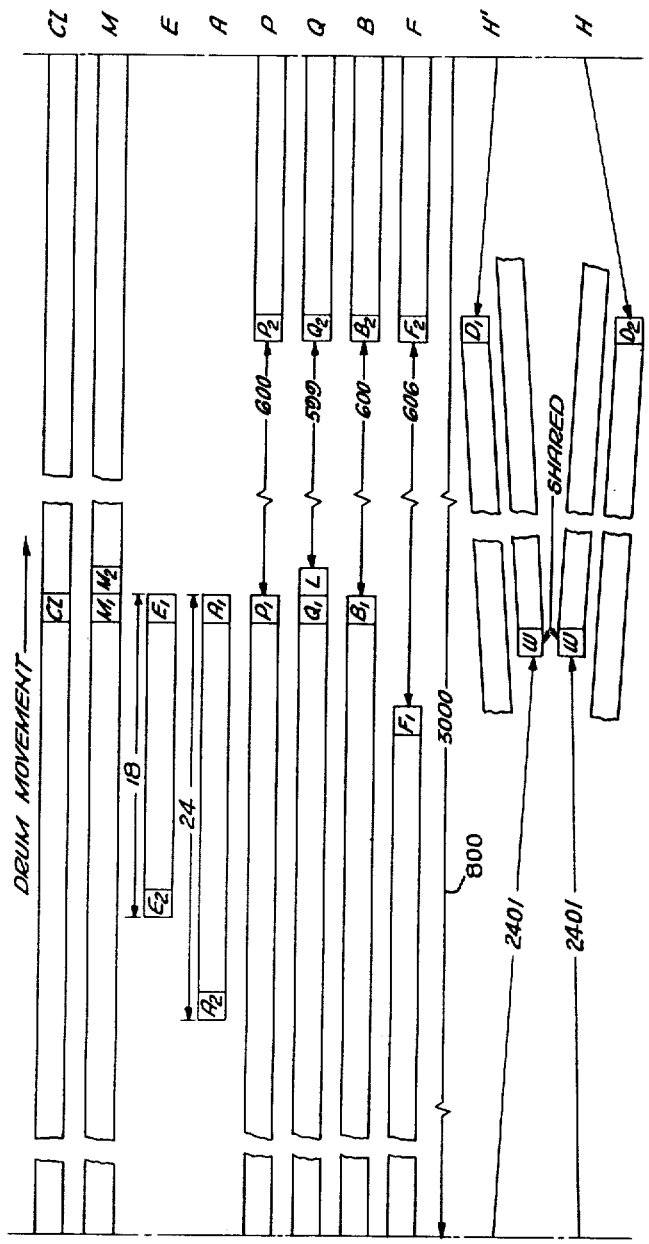
FIG. 8 is a developed view of the magnetic tracks or channels on the memory drum of FIG. 5 illustrating their relative lengths with reference to the drum circumference.

Referring now to FIG. 8, there is shown a developed view of the surface of memory drum 500 illustrating the length of the various tracks or channels relative to the circumference of the drum. In lieu of reshowing the read and write transducers which are employed for communicating with the various channels, there is shown diagrammatically superimposed on the channels in place of the transducers the various read and write flip-flops or bistable elements which are connected to the read and write transducers, each flip-flop being illustrated as a box with an alphabetical designation which will hereinafter identify the flip-flops. It is to be understood, of course, that the term flip-flop as herein utilized encompasses all forms of bistable devices including bistable multivibrators employing either vacuum tubes or transistors It will be appreciated by those familiar with the computer art that reading or writing flip-flops are essentially windows on their respective tracks, the read flip-flops sequentially presenting signals representative of the sequential magnetization of the binary cells on their associated tracks as detected by the associated reading transducers, whereas the write flip-flops function in conjunction with their associated writing transducers to sequentially magnetize successive cells on their associated tracks in accordance with the binary values of the signals sequentially applied to the flip-flop input circuits. The following table correlates the reading and writing transducers shown in FIG. 5 with the flip-flops shown in FIG. 8.

TABLE IV

| Channel | Read | | Write | |
|---|---|---|---|---|
| | Head | Flip-flop | Head | Flip-flop |
| Cl | 503 | Cl | | |
| M | 504 | $M_1$ | | |
| E | 505 | $E_1$ | 506 | $E_2$ |
| A | 507 | $A_1$ | 508 | $A_2$ |
| P | 509 | $P_1$ | 510 | $P_2$ |
| Q | 511 | $Q_1$ | 512 | $Q_2$ |
| B | 513 | $B_1$ | 514 | $B_2$ |
| F | 515 | $F_1$ | 516 | $F_2$ |
| H domain | 519 | $D_1$ | 518 | W {Time. |
| H' domain | 521 | $D_2$ | 520 | W {Shared. |

As shown diagrammatically in FIG. 8 by the memory-encircling line 800, each circumferential track on the memory drum has a capacity of 3,000 binary bit signals, the capacity being permanently recorded in the computer by the recordation of 3,000 clock signals in the clock channel Cl so that the associated flip-flop Cl presents 3,000 pulse signals during each rotation of the drum. For purposes of the subsequent detailed description, assume now that each item sector in the memory includes 24 binary cells, so that each inventory block of one hundred item sectors includes 2,400 binary cells. Accordingly, it will be recognized that intermediate memory channel P, which is one inventory block in length, includes 2,400 bits, while address channel A, which is only one inventory item sector in length, has a total capacity of only 24 bits.

In a similar manner, the short precession channel E which is used in conjunction with channel A has a capacity of only 18 binary bits, while order identification channel B is the same length as intermediate channel P and has a capacity of 2,400 bits. Auxiliary channel Q, on the other hand, is effectively 2,401 bits long owing to the fact that its read flip-flop $Q_1$ is cascaded with a second flip-flop L, as shown in FIG. 8, thereby providing a delay of one binary bit more than an inventory block. Recalling from the description of FIG. 4 that the spacing of the transducer in the long channel of the principal inventory corresponds to the length of its auxiliary memory, the gaps between flip-flops $D_1$ and W in the H domain and between flip-flops $D_2$ and W in the H' domain are, therefore, also 2,401 binary bits.

On the other hand, the long precessing channel F which is used to provide an excess-three code fix-up for binary coded decimal digits in the Q line is six bits shorter than an information block, or in other words, is 2,394 bits long. The only remaining channel in the memory is the continuous sector mark channel M, its read flip-flop $M_1$ having cascaded therewith a second read flip-flop $M_2$ into which the output signals from flip-flop $M_1$ are continually shifted.

With reference now to FIG. 9, the word structure of the memory channels will be described in detail for one item sector of 24 bits, the portion of the memory actually shown encompassing 48 bits owing to the fact that the sectors in the address channel A and the intermediate channel P are slipped 12 cells or bits with respect to auxiliary channel Q of the principal inventory. It will be noted that the item sectors are divided into four equal quadrants, each six binary bits in length, the division being accomplished by a pair of program flip-flops I and J to be shown and described hereinafter. The following table correlates the sequential states of the I and J flip-flops with the successive sector quadrants:

TABLE V

| Sector quadrant time | Flip-flop I | Flip-flop J |
|---|---|---|
| SQT 1 | 1=I | 0=J' |
| SQT 2 | 0=I' | 0=J' |
| SQT 3 | 1=I | 1=J |
| SQT 4 | 0=I' | 1=J |

The setting of the I and J flip-flops, as will be shown later, is controlled by two factors, namely, the appearance in the mark channel flip-flops $M_1$ and $M_2$ of a pair sector markers, designated m in mark channel M, during the last two digit times of each quadrant sector, and the setting of a timing flip-flop T, not yet described, whose successive states are illustrated in FIG. 9 by the alternate zeroes and ones below the M channel. The initial synchronization of the T flip-flop is in turn accomplished by a single fiducial or origin mark, designated ⓜ in FIG. 9, which is recorded in the fourth digit space in the fourth quadrant of any one item sector. In operation the fiducial ⓜ mark will thus appear only once per drum revolution.

As shown in FIG. 9, the E and F channels have recorded in the first four digits spots of each sector quadrant the binary numbers six and three, respectively, the sixes in the E channel being utilized to provide a fix-up of the excess-six coded address digits in the A channel after a carryover. The threes in the F channel, on the other hand, are used to provide a fix-up of the excess-three coded item quantity digits in the auxiliary Q channel each time an item increment or change is to be combined therewith.

In the address channel A, the first four binary cells in sector quadrants 3 and 4 represent the units digit $as_1$ and the tens digit $as_2$ of the present address, or in other words, together designate the sector address of the item quantity simultaneously being presented by the auxiliary channel Q. The first four binary cells in sector quadrants 1 and 2 following quadrants 3 and 4 represent the hundreds digit $ab_1$ and the thousands digit $ab_2$ of the present address, and together correspond to the block address of the inventory block being processed.

In operation an "add one" signal is generated at the end of each sector quadrant 2 and is added to the units digit of the address in quadrant number 3 each time the A channel recirculates, or in other words, every 24 bits. When the units digit $as_1$ reaches the binary number 1111, which represents the decimal digit nine in the units excess-six code as set forth in Table I above, the "add one" signal generated at the end of sector quadrant 2 functions to change the units digit $as_1$ to the binary number 0000 representing decimal digit zero, and to generate a carry signal $r_1$ which is now used in two different manners. Firstly, the units carry $r_1$ is stored in the fifth cell of the third quadrant in precessing channel E, and 18 bits later, after channel E has recirculated, is removed and rewritten in the fifth cell of sector quadrant 2 in the A channel. Secondly, the $r_1$ carry is added to the immediately following tens digit of the address, thereby increasing the tens decade digit arithmetically by one.

During the subsequent recirculation of the address channel A when the $r_1$ carry is shifted back to the A channel from the E channel, an "add one" signal is again added to the units digits $as_1$ to change the digits to the binary number 0001 which represents a units digit of 1 according to Table I. On the subsequent recirculation of the A channel, however, the carry digit $r_1$ is first removed from the end of sector quadrant 2, and in conjunction with the normal "add one" signal, functions to add to the address units digit not only the usual "one," but the simultaneously appearing binary six in the E channel, thereby increasing the units digit by seven from 0001 to 1000. It may be seen therefore, that the units digit of the address increases in the same code employed for the units address digit in the input keyboard, as shown in Table II.

Insofar as the tens, hundreds and thousands digits $as_2$, $ab_1$ and $ab_2$ are concerned, they are increased one count each time an overflow signal is received from an addition in the previous decade. Similarly, when any one of these address decades overflows, its carry signal is not only passed on to the next decade to increase its count by one, but is shifted into the E channel for one recirculation and is thereafter extracted and placed in the fifth bit place of the sector quadrant prior to the decade digit to which it pertains.

Owing to the fact that the tens, hundreds and thousands digits of the item address receive a count-up signal from the previous decade only every tenth, hundredth and thousandth recirculation of the address register, and since it only requires one recirculation of the E channel to precess the carry digit generated by these decades to a position in front of the corresponding digit, it will be recognized that the count sequence of these decades can progress from the binary value 0000, representing zero, to the binary value 0111 representing the decimal digit one, in accordance with the keyboard count sequence in Table I. In other words, the carry digit $r_2$ which is generated when digit $as_2$ overflows has already been stored in front of the $as_2$ digit for nine circulations of the address channel before another count-up signal is received from a carry in the units decade, and hence the carry digit $r_2$ generated by the previous count of $as_2$, together with the next carry over from the units decade, function to "add one" plus the simultaneously appearing binary six in the E channel to digit $as_2$ and change it from 0000 representing a decimal zero to 0111 representing the decimal digit one in the excess-six code.

The hundreds and thousands decades of the address also function in the same manner as the tens decade except for the fact that carries from the thousands decade are not used as an "add one" signal to the units decade, since the units decade automatically receives an "add one" signal every cycle of the A channel, as previously described. It will be recognized from the foregoing description that the address counter keeps pace with the sequential item sectors presented from the principal memory long channel and auxiliary channel, and counts a full ten thousand items for each complete cycle of the inventory computer, or stated differently, for each complete scan of the H and H' domains of the principal inventory memory.

When a keyboard entry is to be made in a particular item sector in the intermediate channel P, the newly formed sector address digits $as_1$ and $as_2$ are compared with the sector address of the item to be entered, as denoted by the digit keys which have been depressed in the input keyboard. If the comparison is positive denoting that the following item sector in the intermediate memory corresponds to the sector address of the item increment in the keyboard, the last binary cell of the simultaneously appearing intermediate channel sector is interrogated to see if it contains a binary zero or a binary one. This particular cell is designated 902 in FIG. 9, and is utilized for storing the "sector filled" mark, previously described briefly with regard to the generalized operational description of FIG. 1; a binary one in this cell indicates that the immediately following intermediate channel sector is filled with a previous keyboard entry, and indicates the transmittal of a keyboard hold signal to the keyboard now trying to enter, whereas a binary zero stored in the cell indicates the next intermediate channel sector is empty, thereby initiating the actual keyboard entry operation.

If cell 902 contains a binary zero, the first operation performed in entering keyboard information is the insertion of an "$f$" mark in the cell by writing therein a signal representing the binary value one. Thereafter, the digits of the block address of the inventory change are entered in sector quadrants 1 and 2 of the following intermediate channel sector, the least significant digit being designated $b_1$ while the most significant digit is designated $b_2$. It will be recalled from the description of FIG. 2 that these digits are coded in the same excess-six code employed in the address counter, and that these block address digits $b_1$ and $b_2$ correspond to the hundreds and thousands digits respectively, of the item address entered in the keyboard unit. After the entry of the block address of the inventory change data from the keyboard input, the sign of the item increment is entered in the last cell of sector quadrant 2 of the intermediate memory, this cell being designated $S_1$ in FIG. 9. The units and tens digit of the item increment are then entered in the first four cells of sector quadrants 3 and 4 of the P channel item sector, the item increment digits being designated $II_1$ and $II_2$, respectively, in FIG. 9.

Consider now the manner in which the inventory item quantities are stored in the principal memory and the sequence in which the digits of each time quantity are presented at the output windows or flip-flops on the auxiliary channel Q. The units, tens, hundreds and thousands digits of each inventory quantity are designated $Q_1$, $Q_2$, $Q_3$ and $Q_4$, respectively, and are located in the first four cells of sector quadrants 3, 4, 1 and 2, respectively, as shown in FIG. 9.

Assuming now that at least one item increment has been previously entered in the intermediate channel P, the transfer of this data to the principal memory will now be described. The appearance of an "$f$" mark at the end of any intermediate channel sector, indicating that the following intermediate channel sector is filled with a keyboard entry, is employed to initiate a comparison between the block address digits $ab_1$ and $ab_2$ thereafter presented by address channel A, and the block address digits $b_1$ and $b_2$ which are simultaneously presented by intermediate channel P. If the comparison has a positive result, the computer has recognized that the item increment should be combined with the corresponding item quantity in the principal memory.

Recall now from the description of FIG. 1 that whatever an item increment is combined with its corresponding item quantity, the "sector filled" mark $f$ in the intermediate channel must be erased so as to leave the intermediate channel sector available for future keyboard entries. However, it will be recognized from the foregoing description of the block address comparison operation that the pertinent "sector filled" mark has already been viewed and returned to the P channel two sector quadrants prior to the generation of an affirmative or positive block comparison signal, and thus is no longer available for erasure.

In order to overcome the foregoing problem, the block address of each inventory item, as given in the catalogue utilized by the keyboard operators in keying up inventory changes, may be made two units smaller than the actual block in which the inventory item appears. For example, an inventory item to be stored in block 34, sector 66 would be catalogued as being in block 32, sector 66, while an item stored in block 80, sector 66 would be catalogued as being in block 78, sector 66. If this is done, an affirmative block address comparison, as outlined hereinabove, will occur two block intervals prior to the appearance at the output circuit of the auxiliary channel Q of the inventory item which is to be modified.

Continuing then with the description of how an item increment is combined with its corresponding item quantity, an affirmative block address comparison results in a signal $g_1$ being written in the last cell of sector quadrant 2 in the F channel, which will be recalled as being a long precessing channel which is six cells, or one sector quadrant, shorter than the intermediate channel P. Consequently, on the next recirculation of the P channel one block interval later, the $g$ mark has precessed one sector quadrant, and appears in the last cell of sector quadrant 1. The precessed $g$ mark after one block interval is shown in FIG. 9 in the cell designated $g_2$.

After the intermediate memory has recirculated through a second block interval, the $g$ mark has precessed to the last cell of sector quadrant 4, as shown in FIG. 9 by the cell designated $g_3$. In this position the computer functions to recognize the simultaneous occurence of the $g$ mark, indicating an affirmative block comparison two block intervals earlier, and the $f$ mark indicating that the following item sector is filled, and performs the following two operations. Firstly, it functions to erase both the $f$ and $g$ marks so that additional item entries may be made subsequently to the immediately following item sector in the intermediate channel P. Secondly, the recognition of the $f$ and $g$ marks simultaneously is used to prepare the appropriate computer circuitry for combining the following item increment with the correspondingly appearing item quantity. It should be noted, incidently, that the two block intervals consumed during the precession of the $g$ mark have precisely compensated for the purposely introduced misaddressing of the block destination by two units.

In the combining operation, the sign digit of the item increment, as represented by the digit stored in the cell designated $S_1$ in the last digit space in sector quadrant 2, is first extracted and is used to direct whether the subsequent operation is add or subtract. Thereafter, the item increment digits $II_1$ and $II_2$ in sector quadrants 3 and 4 are sequentially combined with the units and tens digits $Q_1$ and $Q_2$, respectively, of the item quantity, any carry-overs from these operations being propagated to the next highest decade. In addition, the carry from the arithmetic operation on each of the units and tens decades is stored in the fifth cell of the corresponding sector quadrant; thus in FIG. 9, for example, the cells designated $R_1$ and $R_2$ store the carry of the digits $Q_1$ and $Q_2$ which were newly formed when the item quantity was last combined with an item increment.

After the item increment has been arithmetically combined with digits $Q_1$ and $Q_2$ of the item quantity, the same arithmetic operation is continued on the hundreds and thousands digits $Q_3$ and $Q_4$, respectively, of the item quantity in order to propagate therethrough any carry digits resulting from operation on the lower order decades. However, the item increment has now been processed, and in order to maintain digits $Q_3$ and $Q_4$ in the excess-three code, the computer functions to combine therewith the simultaneously appearing binary threes (0011) which are presented at the output of the F channel. The results of these operations are then written in the principal inventory memory as the new $Q_3$ and $Q_4$ digits, together with their carries, designated $R_3$ and $R_4$ in FIG. 9, which are recorded in the fifth cells of sector quadrants 1 and 2, respectively.

At the conclusion of the arithmetic operation, the sign of the newly formed item quantity is stored in the last cell of the item quantity sector, this cell being designated $S_2$ in FIG. 9 and indicating whether the quantity of the item, as represented by the newly formed digits $Q_1$ through $Q_4$, represents the quantity on hand or the quantity of the item back-ordered. For reasons which will appear later, a binary zero in cell $S_2$ will represent a positive inventory, whereas a binary one in cell $S_2$ will represent a negative or back-ordered inventory.

With reference now to both FIG. 8 and FIG. 9, it should be pointed out that the aforementioned arithmetic operation whereby the item increment is combined with the item quantity actually takes place when the item quantity digit signals are presented at the output circuit of flip-flop L in the auxiliary channel Q, the item increment digit signals combined therewith during sector quadrant intervals 3 and 4 being taken from the writing flip-flop $P_2$ in the intermediate channel, while the binary threes combined with item quantity digits $Q_3$ and $Q_4$ during sector quadrant intervals 1 and 2 are taken from writing flip-flop $F_2$ in the F channel. The fact that the item increment digits are recorded in the P channel has, of course, no significance since the "sector filled" $f$ mark has been erased previously.

The reason for performing the arithmetic operation when the item quantity appears at the output of flip-flop L resides in the fact that in adding or subtracting two excess-three binary coded decimal numbers, a fix-up of the immediate result is required by either the addition thereto or subtraction therefrom of the binary number three (0011). It will be remembered by those familiar with binary coded decimal notation that if the immediate result has no carry digit, the binary number three should be subtracted from the immediate result to provide the true result, whereas the binary number three should be added to the immediate result if the result carries with it a carry digit.

However, in the operation of the particular inventory computer herein described, in detail, the immediate result of the operation on each decade digit of the inventory quantity has been returned to the principal or long access memory by the time the sign of its carry digit can be ascertained. Accordingly, the signs of the carry digits on each decade, as represented by the contents of cells $R_1$, $R_2$, $R_3$ and $R_4$, are also stored in the principal memory following their associated digits and without having been used for an excess-three code fix-up. Consequently, an excess-three code fix-up must be made on each of the quantity digits $Q_1$ through $Q_4$ before the item quantity is again combined with another item increment subsequently entered from an input keyboard.

In the operation of the specific inventory computer to be hereinafter described with particularity, the excess-three code fix-up of any one item quantity is not made until another item increment is to be combined with that particular item quantity. Thus, until a further item increment is to be added thereto or subtracted therefrom, the immediate result digits of the item quantity, together with their signs, are continuously recirculated through the long channel and auxiliary channel of the principal memory.

On each recirculation of the principal memory, as each of the ninety-six hundred item quantities is read from the long channel and placed in the auxiliary channel Q, its carry digits $R_1$ through $R_4$ are also written in the fifth cell of the simultaneously appearing sector quadrants of the F channel, thereby permitting the digit carry signals to precess by six cells or bits so that they are read at flip-flop $F_1$ immediately before the appearance at flip-flop $Q_1$ in auxiliary channel Q of the item digits to which they pertain. However, these precessed carry signals are not utilized unless an item increment is to be combined with the item quantity to which they pertain, and the quantity digits and sign digits which appear at flip-flop $Q_1$ in the Q channel are merely shifted into the L flip-flop and then into the W flip-flop to be rewritten in the principal memory.

If it is assumed now that another item increment is to be either added or subtracted from a particular item quantity previously operated upon, the coincidence of the f and g marks previously described again prepares the computer for its usual arithmetic operation as outlined hereinabove. In addition to this, however, the computer is set up to detect the precessed carry digits previously entered into the F channel, and when the item quantity to be operated upon arrives, functions to add or subtract the binary threes appearing in flip-flop $F_1$ of the F channel from the item quantity digits appearing at flip-flop $Q_1$, the selection of addition or subtraction on each quantity digit being determined by the sign of the associated carry digit. The sequential result digits of this operation thus represent the true item quantity in the excess-three code, and are shifted sequentially into flip-flop L at whose output they are again combined with the new item increment, in the manner described previously; the immediate result digits of this operation are then again recorded in the long channel together with their sign digits to await an excess-three code fix-up in the future when still another item increment is to be combined therewith.

It thus may be seen that each item quantity is properly represented in the excess-three code for only a transitory period, namely, as it is shifted into the L flip-flop to be combined with an item increment. At all other times, the item quantity digits are amiss by either a plus three or a minus three, the associated carry or remainder digit following each digit indicating by its sign whether the fix-up required is positive or negative. It should be emphasized, however, that the item quantities as stored in the long memory do provide all of the intelligence information required as to the quantity of each item either on hand or back-ordered, since on read-out of the entire memory by an associated read-out device for purposes of inventory check, each item quantity digit may be automatically corrected by controlling an excess-three code fix-up of each digit with its associated sign digit.

Before proceeding to the detailed description of operation, it should be pointed out that the specific inventory computer of the invention herein described includes a structure not only to provide a complete inventory read-out of the principal memory, but also to provide an error-checking read-out of each item increment as it is combined with the item quantity. More specifically, the computer is operative at the time each item increment is combined with its corresponding item quantity to read-out the following items for error-check purposes:

TABLE IV (1) Item increment.
(2) Increment block address as entered from keyboard.
(3) Order identification number stored in channel B.
(4) Final sign of item quantity after arithmetic operation to indicate if item is still available or is now back-ordered.

The item increment and its block address are obtained by merely shifting into the output device the signals appearing in flip-flop $P_1$ on intermediate channel P. The order identification number, on the other hand, is read out simultaneously from channel B, while the final sign of the item quantity is obtained by communicating to the read-out device the signal $S_2$ as it is generated.

With reference now to FIG. 10, there is shown a block diagram, partly in schematic form, of the electronics of the specific inventory computer of the invention which is herein described in detail. This particular embodiment of the invention includes a plurality of flip-flops or bistable elements, and a logical gating matrix 1000 which controls the various operations of the computer, the read flip-flops C1 through $D_2$ previously described with respect to FIG. 8 being aligned in the same sequence to the left of gating matrix 1000, as viewed in FIG. 10. On the other hand, the write flip-flops $E_2$ through W described hereinabove in connection with FIG. 8 are shown to the right of the gating matrix in FIG. 10.

The remaining flip-flops may be classified into a control group, generally designated 1002, which is employed in conjunction with program control switch 222 to control the operational sequence of the inventory computer, a keyboard entry group 1004 which is utilized for entering keyboard information, and an operational group 1006, which is utilized in the performance of the various arithmetic operations within the computer. In addition the computer includes two additional flip-flops T and $M_2$, shown in the upper right hand side of FIG. 10, these flip-flops being utilized, together with read flip-flop $M_1$ for synchronizing the operation of the computer.

It should be pointed out that keyboard entry flip-flops group 1004 is shown to include nine flip-flops including a $K_1$ flip-flop and a $K_2$ flip-flop. In reality there may be $n$ flip-flops which are designated K, one for each input keyboard unit. For purposes of simplicity, however, it will be assumed hereinafter that only two keyboards are being utilized in conjunction with the computer, their associated flip-flops being designated $K_1$ and $K_2$, respectively.

Before continuing further with the description of the functions of the various flip-flops, consideration will be given to the designation of the input and output conductors of the various flip-flops shown in FIG. 10. Each flip-flop includes a pair of input conductors which are designated the S input conductor and the Z input conductor, respectively, each conductor being further designated by an alphabetical postscript corresponding to the alphabetical designation of its associated flip-flop. In addition, each flip-flop includes a pair of output conductors one of which is designated by the same alphabetical designation as the flip-flop from which it is taken, while the other is designated by the prime of the alphabetical designation of the flip-flop. Thus, for example, flip-flop T has both ST and ZT input conductors and T and T' output conductors.

In operation each flip-flop will be assumed to be responsive to the application of an input signal to its S-input conductor for setting to a conduction state corresponding to the binary value one, and to the application of an input signal to its Z-input conductor for setting to the opposite conduction state, which corresponds to the binary value zero. In addition, it will be assumed that when a flip-flop is in its one-representing state the voltage presented on its correspondingly represented output conductor has a relatively high level value while the voltage presented on its prime output conductor has a relatively low level value. Conversely, when a flip-flop is in its zero-representing state, the voltage presented on its correspondingly designated output conductor has a relatively low level value whereas the voltage presented on its prime output conductor has a relatively high level value. For example, when flip-flop T is in its one-representing state, high and low level signals are presented on output conductors T and T', respectively, whereas these voltage levels reverse when flip-flop T is in its zero-representing state.

Returning now to the description of FIG. 10, the following table sets forth the functions of each of the various flip-flops in the computer, exclusive of the read and write flip-flops which were previously described.

TABLE VII

| Group | Flip-flop | Function |
| --- | --- | --- |
| Synchronize | $M_2$ | Takes the signals from read flip-flop $M_1$ and in conjunction therewith detects the two $m$ marks in each sector quadrant to mark the end of each quadrant. |
| | T | Basic timing flip-flop. Reverses state every time interval. |
| Control | I, J | I and J operate as a scale-of-four-counter to divide each item sector into four quadrants. |

TABLE VII—Continued

| Group | Flip-flop | Function |
|---|---|---|
| Control | N | (1) Detects keyboard entries and controls sector address comparison. (2) Detects coincidence of $f$ and $g$ marks to initiate addition of item increment to item quantity. |
| | G | Set to one after N flip-flop detects coincidence of $f$ and $g$ marks, and controls addition of item increment and item quantity. |
| | S | (1) Used to synchronize address counter with drum when compute operation begins. (2) Responsive to $f$ marks to compare following block address of item increment in intermediate channel with block address of address counter. |
| | V | Separates the preliminary routines of clear and fill from the compute routine. |
| | X | (1) During preliminary routines used as a third window on channel M to detect fiducial mark $\widehat{m}$ to synchronize timing flip-flop T. (2) During addition of item increment to item quantity, stores sign digit $S_1$ to control operation of addition or subtraction. |
| Keyboard Entry Flip-flop Group. | $K_1$ | (1) Sets to 1 when keyboard No. 1 wants to enter item increment. (2) Compares sector address of item increment in its keyboard with sector address of block counter. |
| | $K_2$ | (1) Sets to 1 when keyboard No. 2 wants to enter item increment. (2) Compares sector address of item increment in its keyboard with sector address of block counter. |
| | $R_1, R_2, R_3$ and $R_4$. | (1) After keyboard indicates it has information to enter, the units and tens digits of sector address are serially shifted into these flip-flops from channel A for comparison with sector address in keyboard. (2) If sector addresses coincide, first the item address digits, and then the item increment digits are shifted in parallel, and are serially shifted out to write flip-flop $P_2$ in the intermediate channel. |
| | $O_1, O_2$ and $O_3$. | Used as a shifting register for receiving order identification numbers during keyboard entry. |
| Operational Flip-flop Group. | $C_1$ | (1) Sets up the "add one" signal for increasing unit count of sector address every 24 bits. (2) Stores carries generated in the address addition. |
| | $E_1$ | (1) Used in preliminary routine with flip-flop $F_1$ to enter 3's and 6's in the F and E channels, respectively. (2) Used to detect address digit carries for controlling excess-six code fix-up of address digits. |
| | $C_2$ | Stores carry digits generated in excess-three code fix-up of item quantity digits. |
| | $F_1$ | (1) Used in preliminary routine with flip-flop $E_1$ to enter 6's and 3's in E and F channels respectively. (2) Takes precessed item quantity carry digits from F channel to indicate whether excess-three code fix-up is plus 3 or minus 3. |
| | $C_3$ | Stores carry digits generated in adding item increment to item quantity. |
| | L | Buffer storage of digit interval; takes old item quantity from excess-three code fix-up and presents it for addition to item increment. |
| | $B_1$ | Controls inventory read-out. |

Consider now the manner in which logical gating matrix 1000 functions to control and actuate the various flip-flops which cooperate therewith. It is well known to those skilled in the digital computer art that the complete mechanization of the gate circuits which generate the input functions to a flip-flop may be specified by what are termed Boolean or logical equations. For purposes of clarity and simplicity, the unreduced logical equations which specify the input signals to all of the flip-flops with the exception of the read flip-flops will first be given. The gate mechanizations of the input functions to several exemplary flip-flops will then be considered with reference to the specific gating structures shown in FIG. 10, after which the detailed operational description will be set forth with reference to the logical equations.

$$SM_2 = M_1, \quad \underline{13} \tag{1}$$

$$ZM_2 = M_1', \quad \underline{14} \tag{2}$$

$$ST = T'(V + M_1' + M_2' + X') \quad \underline{17} \tag{3}$$

$$ZT = T \quad \underline{18} \tag{4}$$

$$SI = I'M_2T \quad \underline{19} \tag{5}$$

$$ZI = IM_2T + IM_2M_1 = IM_2(T+M_1) \quad \underline{20} \quad \underline{21} \quad \underline{22} \tag{6}$$

$$SJ = I'J'M_2T \quad \underline{23} \tag{7}$$

$$ZJ = I'JM_2T + I'JM_2M_1 = I'JM_2(T+M_1) \quad \underline{24} \quad \underline{25} \quad \underline{26} \tag{8}$$

$$SE_2 = V'\widehat{y}M_2TI'J'F_2' + VM_1T'A_1I'J' + VM_1T'A_1C_1 \quad \underline{27} \quad \underline{60} \quad \underline{62} \tag{9}$$

$$ZE_2 = V'\widehat{z} + V'M_2TIJ' + VM_1T'A_1' + VM_1T'C_1'(I+J) \quad \underline{8} \quad \underline{28} \quad \underline{68} \quad \underline{69} \tag{10}$$

$$SF_2 = V'E_2M_2T + VM_1T'F_1 \quad \underline{33} \quad \underline{134} \tag{11}$$

$$ZF_2 = V'\widehat{z} + V'\widehat{y}'M_1T + VM_1T'F_1' \quad \underline{9} \quad \underline{36} \quad \underline{135} \tag{12}$$

$$SX = V'M_2 + VI'J'M_2TP_1 \quad \underline{15} \quad \underline{148} \tag{13}$$

$$ZX = V'M_2' + VI'J'M_2TP_1' \quad \underline{16} \quad \underline{149} \tag{14}$$

$$SN = I'J'M_2T(K_1+K_2) + I'JM_2TP_1F_1 \quad \underline{110} \quad \underline{143} \tag{15}$$

$$ZN = I'J'M_2TK_1'K_2' + I'JM_2T(P_1'+F_1') \quad \underline{121} \quad \underline{144} \tag{16}$$

$$-SV = S\widehat{s}'M_1M_2T' \quad \underline{44} \tag{17}$$

$$ZV = \widehat{z} \quad \underline{1} \tag{18}$$

$$SS = V'\widehat{x}\widehat{s} + VIJ'M_1'M_2P_2 \quad \underline{43} \quad \underline{136} \tag{19}$$

$$ZS = V'\widehat{z} + V(M_2' + M_1T')(P_2A_2' + P_2'A_2) \quad \underline{10} \quad \underline{137}$$
$$+ VIJ'M_1'M_2P_2' \quad \underline{140} \tag{20}$$

$$SG = I'J'M_2TN \quad (21)$$
$$\underline{146}$$

$$ZG = I'J'M_2TN' \quad (22)$$
$$\underline{147}$$

$$SC_1 = I'J'M_2T + (M_1'+M_2'T)E_2A_1E_1 \quad (23)$$
$$\underline{49} \qquad \underline{66}$$

$$ZC_1 = (M_1'+M_2'T)E_2'A_1' + (M_1'+M_2'T)E_2A_1'E_1' \quad (24)$$
$$\underline{52} \qquad \underline{67}$$

$$SC_2 = M_1T'F_1 + (M_1'+M_2'T)F_2F_1Q_1$$
$$\underline{150} \qquad \underline{154}$$
$$+ (M_1'+M_2'T)F_2F_1'Q_1$$
$$\underline{158} \quad (25)$$

$$ZC_2 = M_1T'F_1' + (M_1'+M_2'T)F_2F_1Q_1'$$
$$\underline{151} \qquad \underline{155}$$
$$+ (M_1'+M_2'T)F_2F_1Q_1' \quad (26)$$
$$\underline{159}$$

$$SC_3 = I'J'M_2TP_1' + (M_2'+M_1T')XJP_2L$$
$$\underline{160} \qquad \underline{164}$$
$$+ (M_2'+M_1T')XJ'F_2L + (M_2'+M_1T')X'JP_2'L$$
$$\underline{168} \qquad \underline{172}$$
$$+ (M_2'+M_1T')X'J'F_2'L \quad (27)$$
$$\underline{176}$$

$$ZC_3 = I'J'M_2TP_1 + (M_2'+M_1T')XJP_2'L'$$
$$\underline{161} \qquad \underline{165}$$
$$+ (M_2'+M_1T')XJ'F_2'L'$$
$$\underline{169}$$
$$+ (M_2'+M_1T')X'JP_2L' + (M_2'+M_1T')X'J'F_2L'$$
$$\underline{173} \qquad \underline{177} \quad (28)$$

$$SE_2 = V'(M_1'+M_2'T)E_2TE_2' + V'(M_1'+M_2'T)E_2'E_1$$
$$\underline{29} \qquad \underline{31}$$
$$+ VM_1T'C_1 + V(M_1'+M_2'T)E_1$$
$$\underline{53} \qquad \underline{55} \quad (29)$$

$$ZE_2 = V'\textcircled{2} + V'(M_1'+M_2'T)E_2TE_2$$
$$\underline{2} \qquad \underline{30}$$
$$+ V'(M_1'+M_2'T)E_2'E_1'$$
$$\underline{32}$$
$$+ VM_1T'C_1' + V(M_1'+M_2'T)E_1'$$
$$\underline{54} \qquad \underline{56} \quad (30)$$

$$SA_2 = V'E_1 + V(M_1'+M_2'T)E_2'(C_1A_1' + C_1'A_1)$$
$$\underline{4} \qquad \underline{50}$$
$$+ VM_1T'E_1 + VM_1T'A_1C_1'(I+J)$$
$$\underline{57} \qquad \underline{59}$$
$$+ V(M_1'+M_2'T)E_2(A_1C_1E_1$$
$$+ A_1C_1'E_1' + A_1'C_1E_1' + A_1'C_1'E_1)$$
$$\underline{64} \quad (31)$$

$$ZA_2 = V'E_1' + V(M_1'+M_2'T)E_2'(C_1A_1 + C_1'A_1')$$
$$\underline{5} \qquad \underline{51}$$
$$+ VM_1T'E_1'A_1' + VM_1T'A_1I'J' + VM_1T'A_1C_1$$
$$\underline{58} \qquad \underline{61} \qquad \underline{63}$$
$$+ V(M_1'+M_2'T)E_2(A_1'C_1'E_1' + A_1'C_1E_1$$
$$\underline{65}$$
$$+ A_1C_1'E_1 + A_1C_1E_1') \quad (32)$$

$$SP_2 = V'F_1 + VI'JM_2TN'P_1'(K_1+K_2)$$
$$\underline{6} \qquad \underline{89}$$
$$+ V(M_1'+M_2'T)J(K_1+K_2)R_4$$
$$\underline{98}$$
$$+ VI'J'M_2T(K_1S_{11}+K_2S_{12}) + V(M_1'+M_2'T)JNR_4$$
$$\underline{104} \qquad \underline{111}$$
$$+ VI'JM_2TP_1F_1' + V(M_1'+M_2'T)J'K_1'K_2'P_1$$
$$\underline{124}$$
$$+ VI'J'M_2TK_1'K_2'P_1 + V(M_1'+M_2'T)JN'P_1$$
$$\underline{126} \qquad \underline{128} \quad (33)$$

$$ZP_2 = V'F_1' + V(M_1'+M_2'T)J(K_1+K_2)R_4'$$
$$\underline{7} \qquad \underline{99}$$
$$+ VI'J'M_2T(K_1S_{11}'+K_2S_{12}') + V(M_1'+M_2'T)JNR_4'$$
$$\underline{105} \qquad \underline{112}$$
$$+ VI'JM_2TP_1'(N+K_1'K_2')$$
$$\underline{123}$$
$$+ V(M_1'+M_2'T)J'K_1'K_2'P_1' + VI'J'M_2TK_1'K_2'P_1'$$
$$\underline{125} \qquad \underline{127}$$
$$+ V(M_1'+M_2'T)JN'P_1' + VI'JM_2TP_1F_1$$
$$\underline{129} \qquad \underline{145} \quad (34)$$

$$SL = VG'Q_1 + VG(M_1'+M_2'T)F_2'(Q_1C_2F_1$$
$$\underline{45}$$
$$+ Q_1'C_2'F_1 + Q_1'C_2F_1' + Q_1C_2'F_1')$$
$$\underline{152}$$
$$+ VG(M_1'+M_2'T)F_2(Q_1C_2F_1'$$
$$+ Q_1'C_2'F_1' + Q_1'C_2F_1 + Q_1C_2'F_1)$$
$$\underline{156}$$
$$+ VGI'J'M_2T(X'C_2 + Q_1(C_2'+X')) \quad (35)$$
$$\underline{180}$$

$$ZL = VG'Q_1' + VG(M_1'+M_2'T)F_2'(Q_1'C_2F_1$$
$$\underline{46}$$
$$+ Q_1C_2'F_1 + Q_1C_2F_1' + Q_1'C_2'F_1')$$
$$\underline{153}$$
$$+ VG(M_1'+M_2'T)F_2(Q_1'C_2'F_1'$$
$$+ Q_1C_2F_1' + Q_1C_2'F_1 + Q_1'C_2'F_1)$$
$$\underline{157}$$
$$+ VGI'J'M_2T(XC_2 + Q_1'(C_2+X)) \quad (36)$$
$$\underline{181}$$

$$SW = VG'L + VG(M_2'+M_1T')XJ(LP_2C_3$$
$$\underline{47}$$
$$+ L'P_2'C_3 + L'P_2C_3' + LP_2'C_3'$$
$$\underline{162}$$
$$+ VG(M_2'+M_1T')XJ'(LF_2C_3 + L'F_2'C_3$$
$$\underline{166}$$
$$+ L'F_2C_3' + LF_2'C_3') + VG(M_2'+M_1T')X'J(LP_2C_3$$
$$+ L'P_2C_3 + L'P_2'C_3' + LP_2C_3') \quad$$
$$\underline{170}$$
$$+ VG(M_2'+M_1T')X'J'(LF_2'C_3$$
$$+ L'F_2C_3 + L'F_2'C_3' + LF_2C_3')$$
$$\underline{174}$$
$$+ VGM_2TC_3' + VGM_1'M_2L$$
$$\underline{178} \qquad \underline{182} \quad (37)$$

$$ZW = VG'L' + VG(M_2' \atop \underline{48}$$
$$+ M_1T')XJ(L'P_2'C_3 + LP_2'C_3 + LP_2C_3' + L'P_2'C_3') \atop \underline{163}$$
$$+ VG(M_2' + M_1T')XJ'(L'F_2'C_3 + LF_2'C_3 + LF_2C_3' \atop \underline{167}$$
$$+ L'F_2'C_3') + VG(M_2' + M_1T')X'J(L'P_2'C_3 + LP_2'C_3 \atop \underline{171}$$
$$+ LP_2C_3' + L'P_2'C_3') + VG(M_2' + M_1T')X'J'(L'F_2'C_3$$
$$+ LF_2'C_3 + LF_2C_3' + L'F_2'C_3') \atop \underline{175}$$
$$+ VGM_2TC_3 + VGM_1'M_2L' \atop \underline{179} \quad \underline{183} \quad (38)$$

$$SF_2 = V'(M_1' + M_2'T)F_2T'F_2' \atop \underline{34}$$
$$+ V'(M_1' + M_2'T)F_2'F_1 + VM_1T'(H'D_1 + HD_2) \atop \underline{37} \quad \underline{130}$$
$$+ V(M_1' + M_2'T)F_1 + VI'J'M_2TS + VIJ'M_2TF_1 \atop \underline{132} \quad \underline{138} \quad \underline{141} \quad (39)$$

$$ZF_2 = V'\textcircled{2} + V'(M_1' + M_2'T)F_2T'F_2 \atop \underline{3} \quad \underline{35}$$
$$+ V'(M_1' + M_2'T)F_2'F_1' + VM_1T'(H'D_1' + HD_2') \atop \underline{38} \quad \underline{131}$$
$$+ V(M_1' + M_2'T)F_1' + VI'J'M_2TS' + VIJ'M_2TF_1 \atop \underline{133} \quad \underline{139} \quad \underline{142} \quad (40)$$

$$SK_1 = VK_{81}I'J'M_2TK_1'K_2' \quad (41) \atop \underline{79}$$
$$ZK_1 = V'\textcircled{2} + IJM_1T'N'(R_1d_{14}' + R_1'd_{14} \atop \underline{11}$$
$$+ R_2d_{13}' + R_2'd_{13} + R_3d_{12}' + R_3'd_{12} + R_4d_{11}' + R_4'd_{11}) \atop \underline{81}$$
$$+ I'JM_1T'N'(R_1d_{18}' + R_1'd_{18} + R_2d_{17}' + R_2'd_{17} \atop \underline{83}$$
$$+ R_3d_{16}' + R_3'd_{16} + R_4d_{15}' + R_4'd_{15})$$
$$+ I'JM_2TN'P_1 + I'JM_2TN \atop \underline{85} \quad \underline{117} \quad (42)$$

$$SK_2 = VK_{82}I'J'M_2TK_1'K_2' \quad (43) \atop \underline{80}$$
$$ZK_2 = V'\textcircled{2} + IJM_1T'N'(R_1d_{24}' + R_1'd_{24} + R_2d_{23}' + R_2'd_{23} \atop \underline{82}$$
$$+ R_3d_{22}' + R_3'd_{22} + R_4d_{21}' + R_4'd_{21})$$
$$+ I'JM_1T'N'(R_1d_{28}' + R_1'd_{28} + R_2d_{27}' + R_2'd_{27} + R_3d_{26}' \atop \underline{84}$$
$$+ R_3'd_{26} + R_4d_{25}' + R_4'd_{25})$$
$$+ I'JM_2TN\ (P_1 + K_1) + I'JM_2TN \atop \underline{86} \quad \underline{118} \quad (44)$$

$$SR_1 = JN'(M_1' + M_2'T)[E_2'(C_1A_1' + C_1'A_1) + E_2(A_1C_1E_1 \atop \underline{70}$$
$$+ A_1'E_1'C_1 + A_1'E_1C_1' + A_1C_1'E_1')]$$
$$+ I'JM_2T(K_1b_{14} + K_2b_{24}) + IJ'M_2T(K_1b_{18} + K_2b_{28}) \atop \underline{90} \quad \underline{100}$$
$$+ I'J'M_2T(K_1i_{14} + K_2i_{24}) + IJM_2T(K_1i_{18} + K_2i_{28}) \atop \underline{106} \quad \underline{113} \quad (45)$$

$$ZR_1 = JN'(M_1' + M_2'T)[E_2'(C_1A_1 + C_1'A_1')$$
$$+ E_2(A_1'C_1'E_1' + A_1'E_1C_1 + A_1E_1'C_1 + A_1E_1C_1)] \atop \underline{71}$$
$$+ (J' + N)(M_1' + M_2'T) + I'JM_2T(K_1b_{14}' + K_2b_{24}') \atop \underline{72} \quad \underline{91} \quad (46)$$

$$SR_2 = (M_1' + M_2'T)R_1 + I'JM_2T(K_1b_{13} + K_2b_{23}) \atop \underline{73} \quad \underline{92}$$
$$+ IJ'M_2T(K_1b_{17} + K_2b_{27}) \atop \underline{101}$$
$$+ I'J'M_2T(K_1i_{13} + K_2i_{23}) + IJM_2T(K_1i_{17} + K_2i_{27}) \atop \underline{107} \quad \underline{114} \quad (47)$$
$$ZR_2 = (M_1' + M_2'T)R_1 + I'JM_2T(K_1b_{13}' + K_2b_{23}') \quad (48) \atop \underline{74} \quad \underline{93}$$

$$SR_3 = (M_1' + M_2'T)R_2 + I'JM_2T(K_1b_{12} + K_2b_{22}) \atop \underline{75} \quad \underline{94}$$
$$+ IJ'M_2T(K_1b_{16} + K_2b_{26}) \atop \underline{102}$$
$$+ I'J'M_2T(K_1i_{12} + K_2i_{22}) + IJM_2T(K_1i_{16} + K_2i_{26}) + \atop \underline{108} \quad \underline{115} \quad (49)$$
$$ZR_3 = (M_1' + M_2'T)R_2 + I'JM_2T(K_1b_{12}' + K_2b_{22}') \quad (50) \atop \underline{76} \quad \underline{95}$$

$$SR_4 = (M_1' + M_2'T)R_3 + I'JM_2T(K_1b_{11} + K_2b_{21}) \atop \underline{77} \quad \underline{96}$$
$$+ IJ'M_2T(K_1b_{15} + K_2b_{25}) \atop 103$$
$$+ I'J'M_2T(K_1i_{11} + K_2i_{21}) + IJM_2T(K_1i_{15} + K_2i_{25}) \atop \underline{109} \quad \underline{116} \quad (51)$$

$$ZR_4 = (M_1' + M_2'T)R_3 + I'JM_2T(K_1b_{11}' + K_2b_{21}') \quad (52) \atop \underline{78} \quad \underline{97}$$

$$SQ_2 = HD_1 + H'D_1 \quad (53) \atop \underline{39} \quad \underline{40}$$
$$ZQ_2 = HD_1' + H'D_2' \quad (54) \atop \underline{41} \quad \underline{42}$$
$$KR_1 = I'JM_2TNK_1 \quad (55) \atop \underline{119}$$
$$KR_2 = I'JM_2TNK_2 \quad (56) \atop \underline{120}$$
$$KH_1 = I'JM_2TN'P_1 \quad (57) \atop \underline{87}$$
$$KH_2 = I'JM_2TN'(P_1 + K_1) \quad (58) \atop \underline{88}$$

Write 0 with head 518 = $W' \oplus \textcircled{V}$ (59)

Write 1 with head 518 = $W \oplus \textcircled{V}$ (60)

Write 0 with head $520 = W' \oplus ' \circledV$ (61)

Write 1 with head $520 = W \oplus ' \circledV$ (62)

$$RA\ on\ = \underset{184}{\circledD} + \underset{223}{VIJ'M_2TF_1}$$ (63)

$$RA\ off\ = \underset{194}{VB_1I'J'M_2TC_1} + \underset{233}{VI'J'M_2TG}$$ (64)

$$SB_1 = \underset{188}{V \circledD I'J'M_2TC_1}$$ (65)

$$ZB_1 = \underset{193}{VI'J'M_2TC_1}$$ (66)

$$S_{ch1} = \underset{189}{B_2Q_1} + \underset{224}{(J'N+JG)B_1}$$ (67)

$$Z_{ch1} = \underset{190}{B_2Q_1'} + \underset{225}{(J'N+JG)B_1'}$$ (68)

$$S_{ch2} = \underset{191}{B_2A_1} + \underset{226}{(J'N+JG)P_1}$$
$$+ \underset{231}{GI'J'M_2T(K'C_2' + Q_1(X'+C_2'))}$$ (69)

$$Z_{ch2} = \underset{192}{B_2A_1'} + \underset{227}{(J'N+JG)P_1'}$$
$$+ \underset{232}{GI'J'M_2T(KC_2 + Q_1'(X+C_2))}$$ (70)

$$S_{ch3} = \underset{185}{\circledD M_1} + \underset{195}{B_2M_1} + \underset{228}{(J'N+G)M_1}$$ (71)

$$Z_{ch3} = \underset{186}{\circledD M_1'} + \underset{196}{B_2M_1'} + \underset{229}{(J'N+G)M_1'}$$ (72)

$$S_{ch4} = \underset{187}{\circledD cl} + \underset{197}{B_2cl} + \underset{230}{(J'N+G)cl}$$ (73)

$$S_{01} = \underset{198}{IJ'M_1'M_2(K_1n_{114}+K_2n_{214})}$$
$$+ \underset{209}{I'J'M_1'M_2(K_1n_{124}+K_2n_{224})} + \underset{213}{IJM_1'M_2(K_1n_{134}+K_2n_{234})}$$
$$+ \underset{217}{I'JM_1'M_2(K_1n_{144}+K_2n_{244})}$$ (74)

$$Z_{01} = \underset{208}{M_2'}$$ (75)

$$S_{02} = \underset{199}{IJ'M_1'M_2(K_1n_{113}+K_2n_{213})} + \underset{202}{(M_2'+M_1T')O_1}$$
$$+ \underset{210}{I'J'M_1'M_2(K_1n_{123}+K_2n_{223})}$$
$$+ \underset{214}{IJM_1'M_2(K_1n_{133}+K_2n_{233})} + \underset{218}{I'JM_1'M_2(K_1n_{143}+K_2n_{243})}$$ (76)

$$Z_{02} = \underset{203}{(M_2'+M_1T')O_1'}$$ (77)

$$S_{03} = \underset{200}{IJ'M_1'M_2(K_1n_{112}+K_2n_{212})} + \underset{204}{(M_2'+M_1T')O_2}$$
$$+ \underset{211}{I'J'M_1'M_2(K_1n_{122}+K_2n_{222})}$$
$$+ \underset{215}{IJM_1'M_2(K_1n_{132}+K_2n_{232})} + \underset{219}{I'JM_1'M_2(K_1n_{142}+K_2n_{242})}$$ (78)

$$Z_{03} = \underset{205}{(M_2'+M_1T')O_2'}$$ (79)

$$SB_2 = \underset{201}{IJ'M_1'M_2(K_1n_{111}+K_2n_{211})}$$
$$+ \underset{206}{(K_1+K_2)(J'+N)(M_2'+M_1T')O_2}$$
$$+ \underset{212}{I'J'M_1'M_2(K_1n_{121}+K_2n_{221})} + \underset{216}{NIJM_1'M_2(K_1n_{131}+K_2n_{231})}$$
$$+ \underset{220}{NI'JM_1'M_2(K_1n_{141}+K_2n_{241})} + \underset{221}{(K_1'K_2'+JN')B_1}$$ (80)

$$ZB_2 = \underset{207}{(K_1+K_2)(J'+N)(M_2'+M_1T')O_2'}$$
$$+ \underset{222}{(K_1'K_2'+JN')B_1'}$$ (81)

Now before considering the logical significance of the various terms in the foregoing equations, consideration will be given first to the manner in which these terms specify in detail the mechanization of the logical gating matrix 1000 in FIG. 10. For purposes of simplicity and clarity, the mechanization of the logical gating networks which supply the input signals to flip-flops $M_2$ and T will be described with particularity and with reference to Equations 1 and 2 for flip-flop $M_2$, and to Equations 3 and 4 for flip-flop T. With the understanding of gating techniques thereby gained, the mechanization of the remaining logical equations will be readily apparent to those skilled in the art.

With reference now to FIG. 10, the logical gating networks which mechanize the input functions to flip-flops $M_2$ and T comprise a plurality of logical "and" gates and logical "or" gates, each logical "and" gate being represented by a semicircular hood with a dot (.) in the center thereof, while each logical "or" gate is represented by a semicircular hood with a plus sign (+) in its center. The "and" and "or" gates may utilize either vacuum tubes or crystal rectifiers, and are preferably similar to the gating circuits shown and described in connection with FIGS. 3 and 4 of the article entitled "An Algebraic Theory for Use in Digital Computer Design," by Eldred C. Nelson, on page 12 of the September 1954 issue of the Transactions of the IRE Professional Group on Electronic Computers.

Briefly stated, an "and" gate includes two or more input terminals and a single output terminal and is responsive to the voltage levels of two-level signals applied to its input terminals for producing a high level output signal at its output terminal only when all of the input signals are at their high level values. Each "or" gate, on the other hand, includes two or more input terminals and a single output terminal and is responsive to the voltage levels of two-level signals applied to its input terminals for producing a high-level output signal at its output terminal whenever one or more of the input signals is at its high level value.

It should be pointed out that the "and" gates which are connected directly to the input terminal to each flip-flop will hereinafter be termed "clock pulse and" gates. Structurally a "clock pulse and" gate and a conventional "and" gate, as described hereinabove, are identical, the difference between these gates being in their operational significance. More specifically, it has been pointed out above that an "and" gate in the conventional sense is responsive to what are known to the art as voltage-level input signals to produce a voltage-level output signal. It will be recognized by those skilled in the art, however, that flip-flops are generally triggered with a clock pulse signal which has a relatively short time duration as contrasted with the time duration of each voltage-level signal, which has a minimum interval of one digit time interval. In order to provide a means for triggering the flip-flops, each input terminal to each flip-flop has associated therewith a multiple-input-terminal "and" gate, one of whose input terminals receives a periodically recurring clock pulse signal which divides real time into clock pulse intervals, or as they are more familiarly termed, digit time intervals. The clock pulse signal by definition, therefore, presents a pulse once per digit time interval, which pulse is preferably of relatively short duration.

If now the clock pulse signal is normally at a relatively high level voltage corresponding to the high level voltage of the voltage-level signals produced at the output circuits of the flip-flops, and if each clock pulse results in a brief negative excursion of the clock pulse signal to the low level voltage of the voltage-level signals applied to the gates, it will be recognized that an applied clock pulse signal will be passed by a "clock pulse and" gate to its associated flip-flop input terminal only when a clock pulse is received and the voltage-levels of any other signals applied to the gate are at their high level values.

Referring now with particularity to FIG. 10, Equations 1 and 2, which define the input signals to flip-flop $M_2$, are mechanized by a pair of two-input terminal "clock pulse and" gates 1010 and 1012, one terminal of each of these gates being connected to a clock pulse bus 1014 which receives the clock pulse signal train from a differentiator 1016. The differentiator functions to differentiate the voltage level output signal from clock pulse flip-flop $Cl$, and may be structurally identical with the circuit shown in FIG. 10 in the above-referenced article by Eldred C. Nelson.

The other input terminal to "clock pulse and" gate 1010 is connected to the $M_1$ output conductor of flip-flop $M_1$, whereas the other input terminal of "clock pulse and" gate 1012 is connected to the $M_1'$ output conductor of flip-flop $M_1$. In operation, therefore, if flip-flop $M_1$ is in its one-representing state and a clock pulse is generated, gate 1010 will pass the clock pulse to set flip-flop $M_2$ to its one-representing state owing to the fact that it receives a high-level signal from flip-flop $M_1$, whereas gate 1012 will not pass the clock pulse because signal $M_1'$ is at its low-level voltage. On the other hand, if flip-flop $M_1$ is in its zero-representing state when a clock pulse is received, signal $M_1'$ is at its high-level voltage and will cause gate 1012 to pass the clock pulse to set flip-flop $M_2$ to its zero-representing state, while gate 1010 will fail to pass the clock pulse.

With reference now to Equations 1 and 2, it will be seen that flip-flop $M_2$ is set to one whenever flip-flop $M_1$ was one, and will be set to zero whenever flip-flop $M_1$ was zero. It will be apparent that implicit in Equations 1 and 2 are the logical expressions $M_1Cl$, and $M_1'Cl$, respectively, which state that flip-flop $M_2$ should be set to one or zero only when flip-flop $M_1$ contains a one or zero "and" a clock pulse occurs ($Cl$). However, since each flip-flop input setting function inherently includes a clock pulse signal applied to its associated "clock pulse and" gate, the logical expression $Cl$ has been omitted from all of the equations for purposes of clarity.

Continuing now with the description of FIG. 10, the input functions to flip-flop T, as given by Equations 4 and 3, are mechanized by a "clock pulse and" gate 1020, and by an "or" gate 1022 and a "clock pulse and" gate 1024. More specifically, Equation 4 is mechanized by applying signal T to one terminal of gate 1020 and the clock pulse signal to the other input terminal of gate 1020, the output terminal thereof being connected to the ZT input conductor to flip-flop T. Equation 3, on the other hand, is mechanized by applying signals V, $M_1'$, $M_2'$ and X' to the four-input-terminals of "or" gate 1022, whose output terminal is connected, together with the clock pulse bus and the T' output conductor from flip-flop T, to three input terminals on "clock pulse and" gate 1024.

In operation, "or" gate 1022 produces a high level output signal whenever any one or more of signals V "or" $M_1'$ "or" $M_2'$ "or" X' is at its high level value, this logical condition being given in Equation 3 by the expression $(V+M_1'+M_2'+X')$. In a similar manner, "clock pulse and" gate 1024 will set flip-flop T to its one-representing state whenever a high level signal is received from "or" gate 1022 "and" signal T' is at its high level value "and" a clock pulse is received. These logical conditions may then be expressed as $T'(V+M_1'+M_2'+X')Cl$, which reduces to Equation 3 by dropping the inherent logical expression $Cl$, since it is always required to set any flip-flop to either one or zero.

It will be noted that all of the "and" gates shown in FIG. 10 are actually "clock pulse and" gates inasmuch as one input terminal of each of these gates receives the clock pulse signal. In the complete mechanization of the computer, however, it will be recognized that voltage-level "and" gates will be utilized. For example, although not shown in FIG. 10 the set-to-one input function to flip-flop X defined by Equation 13 is mechanized by applying signals V' and $M_2$ to a two-input-terminal "and" gate, by applying signals V, I', J', $M_2$, T and $P_1$ to a six-input-terminal "and" gate, by combining the output signals from the two "and" gates in a two-input-terminal "or" gate, and by combining the output signal from the "or" gate with the clock pulse signal in a two-input-terminal "clock pulse and" gate whose output terminal is connected to the SX input conductor to flip-flop X. In a similar manner the mechanization of each of the remainder of the equations set forth above is completely defined by the terms of the equations themselves.

Consider now the operation of the particular inventory computer exemplified by the drawings. In order to best describe the functioning of the computer, its operation will be broken down into its major routines of "clear," "prepare to compute," and "compute," this latter routine in turn being broken down into the continuous subroutine of "addressing" and the selectively intermittent subroutines of "keyboard entry," "inventory change," and "information readout."

Clear operation

If it is assumed that the inventory computer has been completely turned off at the end of the prior day's business, the first thing that should be done to start up the computer on the following day is to set program switch 222 in the master keyboard to its clear or Z position, and thereafter actuate switch 220 in FIG. 2 to provide power to the computer components and the memory drive motor. This functions to set control flip-flop V to its zero-representing state in accordance with term 1 of Equation 18, where the circle is utilized to imply physical engagement of a switch in contradistinction to the energization of an electrical gating network. The high level output signal from flip-flop V is thus V', which as will be recalled from Table VII, is employed to distinguish the preliminary routines of "clear" and "prepare to compute" from the subsequent operational routine of "compute."

Consider now the various operations which should be carried out during the clear routine. It will be remembered that the inventory information is stored in the long memory from the prior day's operation since the memory is non-volatile in nature, or in other words, retains its information content even when the entire computer is shut down. Accordingly, it is essential that the inventory information be protected during the clear and prepare to compute operations. This is done by relay 708 in FIG. 7 which is normally open so that the writing heads on the long channel of the principal memory are idle until flip-flop V is subsequently set to its one or compute-representing conduction state.

Still another function of the clear operation is to initially clear channels E, A, F and P by writing all zeroes therein. This is done by zeroing write flip-flops $E_2$ and $F_2$ on the E and F channels, respectively, these operations being respectively specified by term 2 in Equation 30 and by term 3 in Equation 40. On the other hand, for purposes of simplicity the A and P channels, are cleared by merely shifting into these channels the signals which are read by flip-flops $F_1$ and $F_1$ on channels E and F, respectively. The shift from channel E to channel A is specified by terms 4 and 5 in Equations 31 and 32, respectively, while the shift from channel F to channel P is specified by terms 6 and 7 in Equations 33 and 34, respectively. Since only zeroes are written in channels E and F, these zeroes will be read by the associated channel read flip-flops and re-recorded in channels A and P. It should be pointed out that terms 4 and 6 in Equations 31 and 33 are of no particular significance at this time owing to the fact that only zeroes are being recorded, but are employed in the preliminary operation of prepare to compute as set forth later.

Still another function of the clear operation is to initially zero operational flip-flops $E_3$ and $F_3$, control flip-flop S, and keyboard flip-flops $K_1$ and $K_2$, to prepare these flip-flops for subsequent operations. These operations are respectively specified by the identical terms 8 in Equation 10, 9 in Equation 12, 10 in Equation 20, and 11 and 12 in Equations 42 and 44, respectively. It will also be recalled that the $M_2$ flip-flop continuously serves as a second window on mark channel M, while flip-flop X functions as a third window on mark channel M during the preliminary routines. Thus flip-flop $M_2$ merely receives the contents of flip-flop $M_1$, as specified by terms 13 and 14 of Equations 1 and 2 respectively, while the contents of flip-flop $M_2$ are in turn shifted into flip-flop X, this shift function being specified by terms 15 and 16 in Equations 13 and 14, respectively. Thus, all three of the mark channel flip-flops $M_1$, $M_2$ and X will be in their one-representing states simultaneously during one particular digit time interval for each revolution of the memory drum, namely, when the fiducial mark ⓜ has been shifted into flip-flop X, at which time the following two sector quadrant $m$ marks are in flip-flops $M_1$ and $M_2$.

The initial synchronization of timing flip-flop T is also accomplished during the clear routine. It will be recalled from FIG. 9 that flip-flop T reverses its conduction state each digit time interval, and should be in its zero-representing state during the first, third and fifth digit time intervals of each sector quadrant, and in its one-representing state during the second, fourth and sixth digit time intervals of each sector quadrant. It will be appreciated that once the proper sequence has been initiated, the flip-flop may be maintained in its proper sequence by merely using its existing state to set the flip-flop to its opposite state. Accordingly, the only problem is how to initially start the flip-flop in its proper sequence.

With reference now to FIG. 9, it will be noted that during the last digit interval of the sector quadrant in which the fiducial ⓜ mark occurs, flip-flop T should be in its one-representing state and should switch to its zero representing state during the first digit interval of the next sector quadrant. It will also be recognized that during the last digit interval of sector quadrant 4, the fiducial ⓜ mark is in flip-flop X, while flip-flops $M_1$ and $M_2$ contain the two immediately following $m$ marks in channel M. This condition during the clear routine may be identified by the logical expression ($V'M_1M_2X$), and is used to suppress any set to one signal to flip-flop T during this interval. It will be appreciated that if flip-flop T was in its zero state during the last digit interval of sector quadrant 4, it will be maintained in its zero state on into the first interval of sector quadrant 1, whereas if flip-flop T was in its one-state during the last digit interval of sector quadrant 4 it will be set to zero by its normal alternate switching action. In practice the expression ($V'M_1M_2X$) could be used to suppress a signal to flip-flop T by employing what is known to the art as an "inhibitor" gate circuit. However, the same result may be achieved by making the complement of the foregoing expression a necessary condition for a set-to-one signal for flip-flop T. Thus, the set-to-one function of flip-flop T is $T'(V+M_1'+M_2'+X')$ as given by term 17 of Equation 3, while the set-to-zero function of the flip-flop is given by term 18 of Equation 4 and specifies that the flip-flop should always be set to its zero state whenever it has previously been in its one-representing state.

It will also be recalled from the description of FIG. 9 and Table V that the flip-flops I and J must be properly synchronized to function as a scale-of-four counter for identifying the different quadrants of each sector, the count sequence being given in Table V, while the relationship of the count sequence to the fiducial mark is shown in FIG. 9. It will be noted from Table V that flip-flop I reverses its conduction state at the end of each sector quadrant, or at time $M_2T$ as set forth in terms 19 and 20 of Equations 5 and 6, respectively. Thus once flip-flop I has been initially synchronized, it may be made to continue in synchronization by merely using the present conduction state of the flip-flop to set it to the alternate state.

The initial synchronization of flip-flop I is done when the fiducial mark ⓜ is in flip-flop $M_2$, at which time the flip-flop is forced to its zero state, if it is not already there, by term 21 in Equation 6. During the immediately succeeding digit itme interval the flip-flop is then set-to-one by term 19 in Equation 5, or in other words, at the time $M_2T$; the proper pattern is thus established, since when the fiducial mark is again detected in flip-flop $M_2$, flip-flop I will already be in its zero state, as shown in FIG. 9. It should be noted that Equation 6 has been reduced to a simpler form by combining terms in accordance with the well known rules of Boolean algebra, the simplified form being given by term 22 in Equation 6.

In a similar manner it will be noted from Table V hereinabove that flip-flop J reverses its conduction state each time that flip-flop I switches from its zero-representing state to its one-representing state. Thus the normal setting functions of flip-flop J, exclusive of its initial synchronizing function, are given by terms 23 and 24 of Equations 7 and 8 respectively. The synchronization of of flip-flop J, on the other hand, occurs in the same manner as that of flip-flop I, as specified by the term 25 in Equation 8, the letter I' indicating that flip-flop I must have been properly synchronized first on the previous appearance of the fiducial mark ⓜ. Again, terms 24 and 25 of Equation 8 may be combined in a simplified single term 26 by combining terms in accordance with logical algebra notation.

The foregoing operations complete the initial synchronizing functions of the computer during the clear operation, and the inventory computer of the invention is now ready to enter the prepare-to-compute or fill routine. It should be pointed out that the clear routine is fully performed in a maximum of three memory drum revolutions after the various flip-flops in the computer have been rendered operative by their associated power supply.

*Prepare to compute*

The prepare to compute routine is initiated by switching program control switch 222 in the master input keyboard from its Z position to the adjacent Y position, the principal function of this routine being to write binary sixes in the E line and binary threes in the F line. It will be recalled from Table VII that these operations are controlled by flip-flops $E_3$ and $F_3$.

Consider now the entering of the binary sixes in channel E. After the closure of the Y switch contact, flip-flops V and $F_3$ are in their zero states and flip-flop $E_3$ is set-to-one during the last digit time interval ($M_2T$) of sector quadrant 2 ($I'J'$). This operation is specified by term 27 in Equation 9. Thereafter flip-flop $E_3$ in its one-representing state is used to control the operation of write flip-flop $E_2$ in the E channel during the first four digit time intervals of each of sector quadrants 3, 4 and 1, after which flip-flop $E_3$ is again zeroed during the last digit time interval ($M_2T$) of sector quadrant 1 ($IJ'$), as specified by term 28 in Equation 10. Once flip-flop $E_3$ is zeroed, it cannot be again set-to-one, since, as pointed out below, flip-flop $F_3$ is set to its one state. Since the E channel is only 18 bits or three sector quadrants in length, it is clear that flip-flop $E_3$ is in its one-state just long enough to permit a binary six to be written in the first four bit spaces of each sector quadrant in the E channel.

The first four bit spaces of each sector quadrant may be specified by the expression ($M_1'+M_2'T$), where $M_1'$ specifies all of the first four digit time intervals of each sector quadrant around the drum except that digit time interval during which the fiducial mark ⓜ is in flip-flop $M_1$, this interval being specified by $M_2'T$. Thus the foregoing expression may be used to specify when write flip-flop $E_2$ is to receive input signals to write binary sixes in the E channel.

Recall now that flip-flop $E_2$ was zeroed during the clear operation by term 2 of Equation 30. To write sixes in the E channel, therefore, it is only necessary to set flip-flop $E_2$ to its one-state during the third digit interval of each sector quadrant interval, and to return the flip-flop to its zero state during the fifth digit time interval. This may be done by employing the one-representing conduction state of timing flip-flop T as the triggering signal, since flip-flip T is in its one-representing state during the second and fourth digit time intervals at the end of which intervals write flip-flop $E_2$ must be changed. Thus the "write six" function of flip-flop $E_2$ may be specified by terms 29 and 30 in Equations 29 and 30, respectively.

It should be noted that in FIG. 9 the first binary one digit in the E channel appears in the second rather than the third digit interval, while the second binary zero appears in the fourth rather than the fifth digit interval, even though the third and fifth intervals are those in which flip-flop $E_2$ assumes its new state. The reason for this apparent paradox is that the time correspondence of the memory cells shown in FIG. 9 relates to the time of their appearance at the read flip-flops, including flip-flop $E_1$, whereas the "write six" operation is performed on write flip-flop $E_2$ which in normal operation presents its signals one digit time interval after the same signals have been presented by flip-flop $E_1$. It should also be recognized that after flip-flop $E_3$ has returned to its zero-state at the conclusion of the "write six" operation, the binary sixes in the E channel must be recirculated. This is accomplished by shifting into flip-flop $E_2$ the previously recorded binary sixes as they are read by flip-flop $E_1$, this function being specified by terms 31 and 32 of Equations 29 and 30, respectively.

The writing of binary threes (0011) in channel F is also accomplished in a similar manner under the control of flip-flop $F_3$, which functions in almost the identical manner as flip-flop $E_3$. The setting of flip-flop $F_3$ to its one-representing state is accomplished during the last digit time of the sector quadrant immediately following the setting of flip-flop $E_3$ to its one-state, the set-to-one signal for flip-flop $F_3$ being specified by term 33 in Equation 11.

Recalling now that flip-flop $F_2$ was set to zero during the clear routine, as specified by term 2, it will be recognized that to write binary threes in the F channel flip-flop $F_2$ should be in its zero state during the first and fourth digit intervals of each sector quadrant, and in its one-state during the second and third digit intervals of each sector quadrants. This may be accomplished by employing the zero-representing signal T' from flip-flop T as the triggering signal since flip-flop T is in its zero-representing state during the first and third digit time intervals at the end of which intervals the conduction state of flip-flop $F_2$ must be reversed. Thus the switching of the $F_2$ flip-flop during the "write three" operation is specified by the logical conditions of terms 34 and 35 in Equations 39 and 40, respectively.

Owing to the fact that the F channel is 2396 bits long as contrasted with the 18 bit length of channel E, it is clear that flip-flop $F_3$ cannot be returned to its zero-representing state after merely three sector quadrant intervals, but must remain in its one-state for at least 399 sector intervals in order to fill the entire F channel with binary threes. In the particular inventory computer herein disclosed the $F_3$ flip-flop is maintained in its one-representing state until the master keyboard operator subsequently switches the computer out of its prepare-to-compute routine by moving program control switch 222 out of engagement with its Y contact. Accordingly, the restoration of flip-flop $F_3$ to its zero-state may be specified by term 36 of Equation 12 which signifies that the flip-flop is zeroed at the end of the first sector quadrant interval occurring after the disengagement of program control switch 222 from contact Y.

After the zeroing of flip-flop $F_3$, the binary threes written in channel F are circulated therein by virtue of a shift connection established between flip-flops $F_1$ and $F_2$ by the zeroing of flip-flop $F_3$, the shift functions being specified by terms 37 and 38 of Equations 39 and 40, respectively. In addition, it should be pointed out that the binary sixes written in the E channel are also used to fill the address channel A with binary sixes owing to the shift function from read flip-flop $E_1$ to the address channel write flip-flop $A_2$, as previously specified by terms 4 and 5 in Equations 31 and 32. In a similar manner the binary threes recorded in the F channel are also used to fill the intermediate channel P with binary threes by virtue of the shift connection between read flip-flops $F_1$ and intermediate channel write flip-flop $P_2$, as previously specified by terms 6 and 7 of Equations 33 and 34, respectively.

As soon as the E, F, A and P channels have been filled in accordance with the foregoing procedure, the inventory computer of the invention may be switched to its compute routine by actuating program control switch 222 in the master input keyboard to engage its X or compute contact.

Compute operation

Before proceeding with the operational sequence of the computer during the compute operation, it should be pointed out that as soon as the computer is initially energized for the clear operation, read flip-flops $D_1$ and $D_2$ commence to read the signals appearing in their associated reading transducers in the H domain and H' domain of the long channel of the principal memory. The signals thus read are then selectively applied to the auxiliary channel write flip-flop $Q_2$ under the control of the signals H and H' generated by micro-toggle switch 18, shown in FIGS. 6 and 7, the $Q_2$ flip-flop receiving the sequential signals stored in read flip-flop $D_1$ when switch 618 generates a signal H, and receiving the signals stored in flip-flop $D_2$ when switch 618 indicates with an H' signal that the H' domain of the long memory is being scanned. These shift functions to flip-flop $Q_2$ are specified by terms 39 and 40 in Equation 53 and by terms 41 and 42 in Equation 54.

The inventory data thus placed in auxiliary channel Q is circulated therethrough and is read by the associated read flip-flop $Q_1$ but is not shifted into any other point in the inventory computer during the preliminary routines. It will be recalled that during the preliminary routines the long channel is protected from having erroneous information written therein by the fact that write flip-flop W is disconnected from its associated long channel writing heads by relay 708 in FIG. 7.

After the compute operation is initiated it is first essential to synchronize the address counter with the movement of the long channel read and write heads so that the address counter accurately represents the block address and item address of each inventory item quantity stored in the long channel. This is accomplished through the utilization of flip-flops S and V, as will now be described.

When switch contact X of program control switch 222 is engaged, nothing new occurs in the computer unless or until an H signal is received from micro-toggle switch 618, in FIGS. 5, 6 and 7, indicating that the H domain, or in other words inventory blocks fifty through ninety-nine, is being shifted into auxiliary channel Q of the long memory. Receipt of an H signal, together with the engagement of switch contact X of the program control switch then functions to set control flip-flop S to its one-representing state, as specified by term $\underline{43}$ in Equation 19.

The operation of the S flip-flop is then used to control the setting of control flip-flop V to its one-representing state upon the first appearance of the fiducial mark (m) after the long channel read heads have been switched to the H' domain. This operation is specified by term $\underline{44}$ in Equation 17, wherein the expression $M_1M_2T'$ identifies the fiducial mark, and serves to set flip-flop V to its one-state just as the very first item sector of inventory block one is actually set to enter the auxiliary channel Q, or stated differently, when the very first item sector of inventory block zero is hypothetically presented at read flip-flop $Q_1$. The term hypothetical is used because, as will be recalled, no inventory data is stored in blocks 0, 49, 50 and 99, as set forth hereinabove.

The setting of flip-flop V is used to initiate a plurality of operations simultaneously, including actuation of the address counter, and recirculation of the principal inventory memory data out of the long memory, through the auxiliary channel Q, and back into the same cells in the long memory. Considering this latter operation first, the setting of flip-flop V to its one-representing state functions to shift into flip-flop L the sequential signals appearing in auxiliary channel read flip-flop $Q_1$, as specified by terms $\underline{45}$ and $\underline{46}$ in Equations 35 and 36, respectively, to shift into write flip-flop W the sequential signals appearing in flip-flop L, as specified by terms $\underline{47}$ and $\underline{48}$ in Equations 37 and 38, respectively, and to actuate relay 708 in FIG. 7 so as to rewrite in the long channel of the principal memory the signals sequentially appearing in flip-flop W. The correlation of the conduction states of flip-flop W with the signals recorded is given by Equations 59, 60, 61 and 62.

It should be pointed out that no harm is done by shifting into the long channel the signals which were stored in flip-flops L and W when flip-flop V went to its one-representing state, since as previously mentioned, the vacant inventory block zero is now being presented by flip-flop $Q_1$. It should also be pointed out that the logical condition G' in terms $\underline{45}$, $\underline{46}$, $\underline{47}$ and $\underline{48}$ implies that the aforementioned shift into flip-flop L and then into flip-flop W occurs only when flip-flop G is in its zero-representing state, since control flip-flop G is set to its one-representing state only during the inventory change subroutine when an item increment is to be added to its corresponding item quantity.

*Addressing subroutine*

Up until the operation of flip-flop V, the address channel A has remained filled with binary sixes, but no address counting has been commenced. Upon the setting of flip-flop V, therefore, the A channel is filled with the equivalent true excess-six code binary coded decimal representation of the decimal digit zero, and hence when the address counter starts to operate, its count represents the decimal number 0000 which is the proper address of the first item sector (sector 00) in the first inventory block (block 00); however the code in which the decimal number is represented is the true excess-six code, and not the modified excess-six code used in the address counter.

Before proceeding with the logical operation of the inventory computer of the invention in the address subroutine consideration should first be given to the manner in which the address counter progresses to step the address count into the proper modified excess-six codes. As pointed out above, the binary numbers 0110, 0110, 0110, 0110 stored in channel A do not exist in the modified excess-six codes employed for representing the sector and block address of the inventory items. However, the address counter will sequentially progress from the binary numbers 0110, 0110, 0110, 0110 to the binary numbers 0111, 0000, 0000, 0000, in counting the first 1000 item sectors in the principal memory. With reference to Table I it will be seen that the modified excess-six coded representation of item sector 00 in block 10 is precisely represented by the sequential binary numbers 0111, 0000, 0000, 0000. Thereafter as the address count continues it will eventually arrive at the binary numbers 1111, 1111, 1111, 1111 representing item sector 99 in inventory block 99; upon the appearance of the next item sector, which is again item sector 00 in inventory block 00, the address count will progress to the binary numbers 0000, 0000, 0000, 0000, which will be recognized from Table I as the proper representation of item sector 00 of block 00 in the modified excess-six codes employed in the address counter.

In view of the foregoing discussion it will be discerned that after the address count is initially commenced, the count is in a non-existing code for the first 1000 item sectors after which the count is stepped into the modified excess-six codes, in which codes the address count thereafter remains. The significance of the fact that the first 1000 item sectors are represented by non-existent code numbers during the first cycle of the inventory computer is merely that no changes may be made in the inventory quantities in the first ten blocks during this cycle owing to the fact that there could be no positive inventory block comparison between the block address in the address counter and the block address of an item increment which may have been entered in the intermediate channel P during the first ten inventory block intervals.

The detailed operation of the address counter will now be considered. Basically this operation employs read flip-flops $E_1$ and $A_1$ and write flip-flops $E_2$ and $A_2$ on the E and A channels, respectively; in addition, flip-flop $C_1$ is used as a carry flip-flop for increasing the digits of the address count, while flip-flop $E_3$ is employed as a control flip-flop to designate whether a simple addition of one is to be made to an address digit, or whether both an excess-six code fix-up and a count-up of one are to be made simultaneously.

Consider now the operation of the address counter in increasing the units digit by simple addition. Each time the address counter recirculates, carry flip-flop $C_1$ is set to its one-representing state during the sixth digit time interval of sector quadrant 2, which will be recognized as occurring immediately before the units digit of the address is presented to be operated upon. The setting of flip-flop $C_1$ in this manner is specified by term $\underline{49}$ in Equation 23, the expression $(M_2T)$ describing the sixth digit interval of a sector quadrant and $(I'J')$ describing the second sector quadrant. As the binary decimal coded digits of the units digit of the address sequentially appear in read flip-flop $A_1$ in the address channel, control flip-flop $E_3$ in its zero-representing state indicates that flip-flop $A_1$ and flip-flop $C_1$ should operate as binary half-adder and the sum thereby produced should be applied to write flip-flop $A_2$ on the address channel. The simple addition sum thus applied to write flip-flop $A_2$ is specified by terms $\underline{50}$ and $\underline{51}$ in the Equations 31 and 32 respectively, terms $\underline{50}$ and $\underline{51}$ signifying that the addition occurs only during the first four digit intervals of each sector quadrant $(M_1'+M_2'T)$ while flip-flop $E_3$ is in its zero-representing state $(E_3')$, and that flip-flop $A_2$ is set-to-one if one and only one of flips-flops $C_1$ and $A_1$ is in its one-representing state, and that flip-flop $A_2$ is set to zero if flips-flops $C_1$ and $A_1$ are either both one or both zero.

As the binary digits of the units address digit are combined with the contents of carry flip-flop $C_1$, the carry flip-flop remains in the one-representing state until flip-flop $A_1$ receives a binary digit of zero. When this occurs carry flip-flop $C_1$ is restored to its zero-representing state, in accordance with term $\underline{52}$ of Equation 24. It will thus be recognized that flip-flops $C_1$ and $A_1$ perform a simple binary addition and if carry flip-flop $C_1$ is returned to its zero state during operation on the units address digit, the tens, hundreds, and thousands digits of the address count will merely be rewritten in the address channel by the half adder terms set forth above. On the other hand, if all of the binary digits of the units address digit are ones, carry flip-flop $C_1$ will remain in its one state, and thereby propagate a "count up one" signal into the next decade of the address count.

At the end of the addition of each of the address digits, the contents of carry flip-flop $C_1$, are shifted into write flip-flop $E_2$ on the short channel E, this operation being specified by terms $\underline{53}$ and $\underline{54}$ in Equations 29 and 30 respectively. It should be here pointed out that since it is essential that the binary sixes previously recorded in the E channel be maintained therein, the signals read at read flip-flop $E_1$ during the first four digit time intervals of each sector quadrant time interval $(M_1'$ or $M_2'T)$ are merely shifted into the associated write flip-flop $E_2$, this operation being specified by terms $\underline{55}$ and $\underline{56}$ of Equations 29 and 30.

Recall now that on the next recirculation of the address counter, the same simple addition continues, while any carry digits stored in the E channel have precessed by six bits and are now presented prior to the address count digits to which they pertain. These carry digits are then shifted into the A channel and are inserted in the fifth cell of the sector quadrant immediately preceding the sector quadrant containing the address digits to which the carry signals pertain. This operation is specified by terms $\underline{57}$ and $\underline{58}$ of Equations 31 and 32, the $A_1'$ in term $\underline{58}$ indicating that if a "no carry" signal was just taken from the E channel it should not be inserted in the A channel unless the carry space for which it is intended is also zero $(A')$. This is done to protect previously inserted carries from the tens, hundreds and thousands address digits, since it will be remembered that a carry from these decades is stored for a number of circulations before being used for an excess-six code fix-up on its associated digit. The recirculation of a carry digit from the tens, hundreds and thousands digit is given by term $\underline{59}$ in Equation 31, which signifies that if a previously inserted carry digit $(A_1)$ is detected during the fifth digit interval $(M_1T)$ of a sector quadrant preceding the appearance of the tens, hundreds or thousands address digits $(I+J)$, and there is no carry $(C_1')$ from the next lowest decade, then the previously inserted carry digit should be recirculated.

It will be recalled now that if a carry digit occurs from the simple arithmetic operation on the units digit of the address, the carry is used for an excess-six code fix-up on the recirculation of the address counter which next occurs after the carry signal has been placed in the A channel. It will also be remembered that the $E_3$ flip-flop is set to its one-representing state for controlling an excess-six code fix-up. The setting of the $E_3$ flip-flop to its one-representing state to make an excess-six code correction on the units digit of the address is given by term $\underline{60}$ of Equation 9, which indicates that the carry digit $(A_1)$ is used to set flip-flop $E_3$ during the fifth digit interval of the sector quadrant immediately preceding the appearance in flip-flop $A_1$ of the address units digit. It should be noted that the identical logical expression is also used to erase the carry digit in the A channel, the erase function being given by term $\underline{61}$ in Equation 32.

In a similar manner, an excess-six code fix-up on the tens, hundreds or thousands digits is provided by setting flip-flop $E_3$ to its one-representing state in response to the simultaneous receipt of a previously recorded carry digit in the address channel A and a carry digit propagated from the next lower decade digit of the address, this setting function being specified by term $\underline{62}$ of Equation 9. Again, the utilization of the carry digit recorded in channel A is accompanied by an erasure of the carry digit in the address channel, the erasure being specified by term $\underline{63}$ in Equation 32.

Considering now the mechanization of an excess-six code fix-up in any of the four digits of the address, flip-flop $E_3$ in its one representing state functions to combine the carry stored in flip-flop $C_1$, the address digit presented by flip-flop $A_1$, and the binary six being presented by flip-flop $E_1$, and thus serves to increase by seven the address digit being operated upon. It will be recognized by those skilled in the art that flip-flops $E_1$, $A_1$ and $C_1$ are thus connected as the input flip-flops to a full binary adder, the sum or result signals thereby generated being applied to write flip-flop $A_2$ and being specified by the well known full-adder terms $\underline{64}$ and $\underline{65}$ of Equations 31 and 32, respectively. The carry digits generated during the full addition on the binary digits of the address digit being operated upon are stored in carry flip-flop $C_1$, as specified by terms $\underline{66}$ and $\underline{67}$ of Equations 23 and 24, respectively, the expression $A_1E_1$ in term $\underline{66}$ representing the logical simplification of the full carry "set-to-one" expression $(A_1E_1C_1'+A_1'E_1C_1+A_1E_1'C_1+A_1E_1C_1)$, while the expression $A_1'E_1'$ in term $\underline{67}$ represents the logical simplification of the full carry "set-to-zero" expression $(A_1'E_1'C_1+A_1'E_1C_1'+A_1E_1'C_1'+A_1'E_1'C_1')$.

After an excess-six code fix-up has been made on a particular address digit, the $E_3$ flip-flop is either permitted to remain in its one-representing state if an excess-six code fix-up is also to be made on the next higher decade digit of the address count, or is returned to its zero-representing state if no excess-six code fix-up is to be made on the next higher decade digit. Thus term $\underline{68}$ of Equation 10 specifies that flip-flop $E_3$ should be zeroed if no carry digit has previously been stored in channel A for the next higher decade digit, while term $\underline{69}$ of Equation 10 specifies that regardless of whether there is or is not a carry digit stored in the address channel, flip-flop $E_3$ should be zeroed if the tens, hundreds or thousands digits $(I+J)$ is to be operated upon next and no carry digit $(C_1')$ has been propagated up from the next lower decade digit of the address count. As soon as the $E_3$ flip-flop is zeroed after one or more excess-six code fix-ups, the address counter reverts back to its normal simple addition by which the units digit is increased one unit on each recirculation of the address count, and by which the tens, hundreds and thousands recirculations of the address count, respectively.

Keyboard entry subroutine

In the normal operation of the inventory computer of the invention when no item increment is being added to its corresponding quantity and no keyboard entry is being made, flip-flop N is in its zero-representing state and thereby permits the newly formed units and tens digits of the address count to be shifted into flip-flop $R_1$, during sector quadrant intervals 3 and 4, as specified by terms 70 and 71 in Equations 45 and 46. It will be noted that the expression for the newly formed digits as given by terms 70 and 71 represents a simplification of terms 50 and 64 in Equation 31, and of terms 51 and 65 in Equation 32. The additional expression JN' in terms 70 and 71 signifies that the shift into flip-flop $R_1$ takes place only during sector quadrant intervals 3 and 4 and only when flip-flop N is in its zero-representing state.

It will be recognized from terms 70 and 71 that the shift into flip-flop $R_1$ occurs during only the first four digit time intervals ($M_1'+M_2'T$) of sector quadrants 3 and 4. During sectors quadrants 1 and 2 when flip-flop J is in its zero-representing state, or if flip-flop N is in its one-representing state, flip-flop $R_1$ is zeroed during the first four digit intervals of each sector quadrant, this operation being specified by term 72 in Equation 46.

Now during the first four digit time intervals of each sector quadrant, flip-flop $R_1$, $R_2$, $R_3$ and $R_4$ function as a simple shifting register, the shift from flip-flop $R_1$ into flip-flop $R_2$ being specified by terms 73 and 74 of Equations 47 and 48, respectively, the shift into flip-flop $R_3$ from flip-flop $R_2$ being specified by terms 75 and 76 of Equations 49 and 50, respectively, and the shift from flip-flop $R_3$ into flip-flop $R_4$ being specified by terms 77 and 78 of Equations 51 and 52, respectively. It will be recognized, therefore, that when flip-flop N is in its zero-representing state the newly formed sector address digits $as_1$ and $as_2$, shown in FIG. 9 are sequentially shifted into flip-flops $R_1$ through $R_4$ during sector quadrant intervals 3 and 4, the unit address digit $as_1$ being stored in these flip-flops during the last two digit time intervals of sector quadrant 3 while the tens decade address digit is stored in flip-flops $R_1$ through $R_4$ during the last two digit intervals of sector quadrant 4.

Consider now the operation of the computer when the start button in a keyboard is depressed to indicate a keyboard entry. For purposes of clarity the start signal from input keyboard No. 1 will hereinafter be designated $K_{s1}$, while the keyboard start signal from input keyboard No. 2 will be designated $K_{s2}$. Assuming that a keyboard start signal is received from keyboard No. 1, the associated keyboard flip-flop $K_1$ is set to its one state during the sixth or last digit time interval of sector quadrant 2, as specified by term 79 in Equation 41, a condition of term 79 being that flip-flops $K_1$ and $K_2$ must both be in their zero-representing states. The reason for this restriction is to prevent one of the keyboard flip-flops $K_1$ and $K_2$ from operating when the other is still in its one-representing state at the conclusion of a prior keyboard entry operation. It should be here noted that the set-to-one function of flip-flop $K_2$ as given by Equation 45 includes a term 80 which is identical to term 79 with the exception that term 80 includes the keyboard start signal $K_{s2}$ in lieu of start signal $K_{s1}$.

Immediately after flip-flop $K_1$ is set to its one-representing state at the end of sector quadrant 2, the units digit of the address count is shifted into flip-flops $R_1$ through $R_4$, as set forth above. During the fifth digit time interval of sector quadrant 3 ($IJM_1T'$), the units address digit stored in the flip-flops is then compared with the units digit of the sector address stored in keyboard No. 1, the comparison being carried out by zeroing flip-flop $K_1$ in accordance with term 81 of Equation 42 if any binary bit of the units address digit does not correspond to the correspondingly weighted binary bit of the units digit of the sector address set-up in the keyboard. It should be noted that the sequential binary digits of the sector address in a keyboard are designated by signals $d_{i1}$ through $d_{i8}$ where $i$ represents the number of the keyboard, and where the signals $d_{i1}$ through $d_{i4}$ represent the sequential binary digits of the units digit of the sector address, while signals $d_{i5}$ through $d_{i8}$ represent the sequential binary digits of the tens digit of the sector address. It should also be noted that the set-to-zero function of flip-flop $K_2$ as given by Equation 44 also includes a term 82 for zeroing flip-flop $K_2$ when keyboard No. 2 fails to make an affirmative comparison of the units address digits, the only difference between terms 81 and 82 being that the signals from keyboard No. 1 are designated $d_{11}$ through $d_{14}$ while the signals from keyboard No. 2 are designated $d_{21}$ through $d_{24}$.

If the comparison of the units digit of the address is negative, and flip-flop $K_1$ is restored to zero, the keyboard start signal $K_{s1}$ continues to be received from the associated keyboard and flip-flop $K_1$ is again set to its one-representing state in accordance with term 79 in Equation 41 at the end of the next sector quadrant 2, and thereby initiates another comparison operation. It will be recognized that within a maximum of ten sector intervals an affirmative comparison will be made between the units digit of the address count and the units digit of the keyboard sector address. When this occurs, flip-flop $K_1$ remains in its one-representing state on into sector quadrant interval 4, during which time the tens decade digit of the address count is entered in flip-flops $R_1$ through $R_4$. Thereafter, during the fifth digit time interval of sector quadrant interval 4, after the tens digit of the address has been stored in flip-flop $R_1$ through $R_4$, flip-flop $K_1$ again functions during the fifth digit time interval to compare the ten digits of the address count with the tens digit of the sector address keyed up in the associated keyboard; if a negative comparison results, flip-flop $K_1$ is zeroed in accordance with term 83 of Equation 42, which serves to compare the binary digits of the tens digit of the address count with the binary digits of the sector address tens digit stored in the keyboard. If flip-flop $K_1$ is thus zeroed, the previously described operation of the $K_1$ flip-flop and of the units digit comparison is once more commenced. Again it will be noted that the zeroing function of flip-flop $K_2$, as given by Equation 44 includes a similar term 84.

It will be recognized that within a maximum of one hundred sector intervals correspondence will be achieved between the keyboard sector address and the sector count as represented by the units and tens digit of the address count. It should be clear, therefore, that the inventory computer has now recognized that the item increment awaiting entry in the associated keyboard belongs in the following item sector in the intermediate channel. However, before the entry can be made, two different checks must be carried out during the sixth or last digit time interval of sector quadrant 4 to be sure that it is proper to enter the item increment from the keyboard. The first of these checks will be seen to effect both keyboards, while the second check will effect only keyboard No. 2.

Firstly it will be recalled that a "sector filled" mark $f$ is stored in the last digit space of sector quadrant 4 of the item sector immediately preceding the item sector to which the $f$ mark pertains. Consequently if an affirmative comparison of the sector address has resulted during the fifth digit interval of sector quadrant 4 a test should be made during the sixth digit interval of sector quadrant 4 to see if there is an $f$ mark, represented by a binary one, in read flip-flop $P_1$ on the intermediate channel. If there is an $f$ mark, the following item sector in the intermediate channel is already full and whichever keyboard is attempting an entry should be dismissed without entry, while the absence of an $f$ mark indicates the following P channel item sector is vacant and an entry may be made therein.

The second check made during the sixth digit time interval of sector quadrant 4 is to see if any other keyboard entry flip-flops are in their one-representing state. More specifically, under the assumption made hereinabove that the computer includes two keyboard entry flip-flops $K_1$ and $K_2$, it will be recognized from terms 79 and 80 of Equations 41 and 43 that although neither can be set-to-one if the other is already in its one-representing state, there is nothing to prevent both flip-flop $K_1$ and flip-flop $K_2$ from being set-to-one simultaneously. Accordingly, if both keyboards attempt to make entries simultaneously, both of the keyboard entry flip-flops can be set-to-one to make a sector address comparison.

Now ordinarily the sector addresses of the two entries are different, and hence if one keyboard entry flip-flop makes an affirmative comparison, the other usually has been zeroed previously by virtue of a negative comparison. If, however, both of the entries have the same sector address, regardless of whether their block addresses agree or not, it is possible for both of flip-flops $K_1$ and $K_2$ to be operated up to the sixth digit interval of sector quadrant 4, or in other words, up until the last moment before item entry is to be made. It is obvious then that one or both of the keyboard entry flip-flops should be zeroed so that both input keyboards do not attempt to spill into the same item sector in the intermediate memory.

In the particular inventory computer herein shown and described, keyboard No. 1 may be dismissed during he sixth digit time interval of sector quadrant 4 only if an $f$ mark is detected indicating that the following item sector in the intermediate channel is full. This is done by again zeroing flip-flop $K_1$, this time in accordance with term 85 of Equation 42. On the other hand, keyboard No. 2 may be dismissed in either of two manners during the sixth digit time interval of sector quandrant 4, namely, by the detection of an $f$ mark indicating the following item sector is filled, or if flip-flop $K_1$ has also made an affirmative comparison, the dismissal of keyboard No. 2 being specified by term 86 in Equation 44.

It should be here pointed out that the dismissal of a keyboard during the sixth digit time interval of sector quadrant 4 is also accompanied by a keyboard hold signal being transmitted to the associated keyboard to release its keyboard start button. It will be recalled from the description of FIG. 3 that this does not release the keys which have been depressed in the keyboard, since an entry has not yet been made, but merely requires that the start button be first released and then redepressed to re-initiate the entry. The keyboard hold signals for keyboards No. 1 and No. 2 are given by terms 87 and 88 in Equations 57 and 58, respectively, these terms being identical to terms 85 and 86 which zero the keyboard entry flip-flops.

Assume now that either keyboard No. 1 or keyboard No. 2 has not been dismissed, and that its corresponding flip-flop $K_1$ or $K_2$ remains in its one-representing state indicating that a keyboard entry is to be made. The first thing that is done is the entry of an $f$ mark in the intermediate channel in the sixth digit space of sector quadrant 4 to indicate henceforth that the following item sector is filled, the entry of the $f$ mark being specified by term 89 in Equation 33. It should be noted that the expression $P_1'$ in term 89 signifies that no $f$ mark was formerly existent, while the term $N'$ indicates that a new $f$ mark may only be written while flip-flop N is in its zero-representing state.

Simultaneously with the entry in flip-flop $P_2$ of the $f$ mark, the binary digits of the units digit of the block address are stored in flip-flops $R_1$ through $R_4$ by virtue of a parallel shift from the keyboard which is entering data. The parallel shift of the units digit of the block address into flip-flops $R_1$ through $R_4$ is specified by terms 90 and 91 in Equations 45 and 46, by terms 92 and 93 in Equations 47 and 48, by terms 94 and 95 in Equations 49 and 50, and by terms 96 and 97 in Equations 51 and 52. It will be noted that the signals from the keyboard are designated $bi_1$ through $bi_4$, where $i$ takes the designation of the keyboard from which the signals emanate.

During the first four digit intervals of the following sector quadrant 1 the signals entered in flip-flops $R_1$ through $R_4$ are then shifted through the register in accordance with terms 73 through 78, and are shifted from flip-flop $R_4$ on into intermediate channel write flip-flop $P_2$ as specified by terms 98 and 99 of Equation 33 and 34. The expression $J(K_1+K_2)$ is employed to represent the first and second sector quadrants of an item sector in which an item entry is being made.

After the units digit of the block address has been entered in the intermediate memory, the binary digits of the tens digit of the block address are stored in flip-flops $R_1$ through $R_4$ by virtue of a parallel shift during the last digit interval of sector quadrant 1 from the keyboard which is entering data, the parallel shift being specified by terms 100, 101, 102 and 103 of Equations 45, 47, 49 and 51, respectively. Again the signals from the keyboard are designated $bi_5$ through $bi_8$, where $i$ takes the numerical designation of the keyboard from which the signals emanate. It should be pointed out that zero setting signals are no longer required for flip-flops $R_1$ through $R_4$ owing to the fact that term 72 in Equation 46 automatically fills the register with zeroes as the digits entered from the keyboard are shifted into the intermediate memory channel P. During the first four digit intervals of sector quadrant 2 terms 98 and 99 in Equations 33 and 34 are then again operative to shift into write flip-flop $P_2$ the tens digit of the block address of the item entry, and thus block address digits $b_1$ and $b_2$, in FIG. 9, are completely written in the intermediate channel.

After the block address digits have been entered, the sign of the item increment is entered into flip-flop $P_2$ from the keyboard during the sixth or last digit interval of sector quadrant 2, this operation being specified by terms 104 and 105 in Equations 33 and 34, respectively, wherein $S_{11}$ and $S_{11}'$ represent a plus sign and negative sign, respectively, from keyboard No. 1, while $S_{12}$ and $S_{12}'$ respectively represent a plus sign and a minus sign from input keyboard No. 2.

In addition to the entry of the sign digit in the intermediate memory, two other operations are also performed during the last digit interval of sector quadrant 2. One of these operations is a parallel shift of the units digit of the item increment into flip-flops $R_1$ through $R_4$ from the keyboard which is entering data. This operation is specified by terms 106, 107, 108 and 109 in Equations 45, 47, 49 and 51, wherein the units digit of the item increment is represented by signals $i_{11}$ through $i_{14}$ for keyboard No. 1 and by signals $i_{21}$ through $i_{24}$ for input keyboard No. 2.

The second operation performed at the end of sector quadrant 2 is the setting of control flip-flop N to its one-representing state to control the subsequent entry of the item increment digits into the intermediate channel. This operation is specified by term 110 in Equation 15, and takes place to provide a control for permitting the remainder of the keyboard entry to be made in the intermediate channel, since the keyboard entry flip-flop which has heretofore controlled the item entry will be zeroed before the item entry is completed in order to prevent the item entry from being written in two successive intermediate channel item sectors. Thus during the first four digit intervals the sector quadrant 3 which occurs during item entry, the item increment units digit is sequentially shifted out of flip-flops $R_1$ through $R_4$ and into the intermediate channel write flip-flop $P_2$ under the control of flip-flop N in its one-representing state, as specified by terms 111 and 112 of Equations 33 and 34, respectively.

At the end of sector quadrant 3, however, the keyboard entry flip-flop is still available to control a parallel shift of the item increment tens digit from the associated keyboard into register flip-flops $R_1$ through $R_4$. This last operation is specified by terms 113, 114, 115 and 116 in Equations 45, 47, 49 and 51, respectively, wherein the tens digit of the item increment is represented by signals $i_{15}$ through $i_{18}$ for keyboard No. 1 and by signals $i_{25}$ through $i_{28}$ for input keyboard No. 2. The item increment tens digit is then in turn shifted into flip-flop $P_2$ during the first four digit time intervals of sector quadrant 4, as specified by the previously described terms 111 and 112 in Equations 33 and 34.

At the end of sector quadrant 4, flip-flop N in its one-representing state is used to zero whichever of keyboard entry flip-flops $K_1$ and $K_2$ has been operated during keyboard entry, this operation being specified by term 117 in Equation 42 by term 118 in Equation 44. Simultaneous with the zeroing of the keyboard entry flip-flop, the same logical condition used to zero the keyboard entry flip-flop is used to transmit a keyboard release signal to the input keyboard which has been making the item entry. It will be recalled from FIG. 2 that the keyboard release signals are designated $K_R$, the release signal to keyboard No. 1 being identified as $K_{R1}$ and being specified by term 119 in Equation 55, while the release signal to keyboard No. 2 is identified as $K_{R2}$ and is specified by term 120 in Equation 56. The receipt of a keyboard release signal in the keyboard which has just completed entering an item entry then serves to release all of the keys which have been depressed and to restore the keyboard to its normal condition awaiting the entry of a further inventory item change.

After the release of the keyboard and its associated keyboard entry flip-flop at the end of sector quadrant 4 the keyboard is completed. Flip-flop N may hold over in its one-representing state until the end of the following sector quadrant 2, even though keyboard entry has been completed, and be zeroed at that time by term 121 in Equation 16, or may be zeroed at the end of sector quadrant 4 by another signal to be described later in discussing the inventory change subroutine. It will be recognized, therefore, that the entire keyboard entry operation, from the time the keyboard entry flip-flop was set-to its one-representing state at the start of the affirmative sector address comparison, until flip-flop N was finally zeroed, has consumed one and one-half sector time intervals. It will also be noted that flip-flop N is zeroed in time to permit another keyboard entry to either start or recommence its sector address comparison operation during sector quadrant intervals 3 and 4.

Recall now that after keyboard entry is made in the intermediate memory channel P, the item increment thereby stored may not be removed until its corresponding item quantity appears for modification. Inasmuch as the item quantity may not appear for many recirculations of the intermediate memory, it will be recognized that the logical gating matrix of the inventory computer of the invention must include structure for recirculating the stored keyboard entry until its item increment has been combined with its corresponding item quantity. The logical expressions which define the mechanization of the logical gating network for performing the recirculation operation will now be described.

The first piece of intelligence information to be presented when a keyboard entry is recirculating is its associated $f$ mark in the last digit space of the preceding intermediate chanel sector. It will be recalled from term 89 in Equation 33 that this space is defined in time by the expression ($I'JM_2T$). Accordingly if a previously recorded $f$ mark is detected, it is recirculated in accordance with term 122 of Equation 33, where $P_1$ represents the '$f$ mark and $\overline{F_1}'$ indicates that no $g$ mark has yet been detected to indicate that the following item increment can be combined with its corresponding item quantity. It will be recognized too that if there is no $f$ mark, indicating that the following item sector is empty, and no keyboard entry is being made as set forth above, then the zero recorded in the $f$ mark should be recirculated so as to prevent the recordation of a false $f$ mark. The recirculation of a zero in the $f$ mark space is given by term 123 of Equation 34, where $P_1'$ represents a zero in the $f$ mark space and the expression ($N+K_1'K_2'$) implies that no keyboard entry is being made ($K_1'K_2'$) or if one is being made, it is being made in the preceding item sector of the intermediate chanel (N).

Following the recirculation of the $f$ mark, the block address digits $b_1$ and $b_2$ and the item increment digits $II_1$ $II_2$, together with the sign $S_1$ of the item increment, must be recirculated if no item entry is being made in a particular item sector. The recirculation of the block address digits is specified by terms 124 and 125 of Equations 33 and 34, respectively, wherein the expression $J'K_1'K_2'$ indicates that both of the keyboard entry flip-flops are in their zero-representing state during sector quadrants 1 and 2, thereby implying that no keyboard entry is being made. In a similar manner, the recirculation of the item increment sign digit $S_1$ is accomplished in accordance with terms 126 and 127 of Equations 33 and 34, respectively, the expression $\overline{K_1'K_2}'$ again signifying that no keyboard entry is being made, while expression $I'J'M_2T$ identifies the sign digit space. On the other hand, the recirculation of the item increment digits is accomplished in a manner slightly different from recirculation of the block address digits, the difference being that the expression JN' is used to imply that no keyboard entry is taking place during sector quadrants 3 and 4, the full expression for the recirculation of the item increment being given by terms 128 and 129 in Equations 33 and 34, respectively.

In view of the above described recirculation terms, it will be recognized that an item entry will be recirculated until it is subsequently combined with its corresponding item quantity during the inventory change operation. It should also be clear that until this occurs keyboard entries may be made in other item sectors which are idle in the intermediate channel P, and that it is possible for a subsequently entered keyboard entry to be combined with its appropriate inventory item quantity before the earlier entry is combined with its inventory item quantity.

*Inventory change subroutine*

Assuming now that one or more item entries have been made in the intermediate memory, the manner in which these are combined with their associated item quantities will now be described. Recall first from the description of FIG. 9, however, that the digits of each inventory quantity, as they are stored in the long memory, are not yet represented in the true excess-three code, but are in error by either a plus three or a minus three, each binary coded decimal digit of each item quantity being followed by a carry digit which indicates whether the fix-up required on its associated digit is a plus three or a minus three. These carry sign digits are designated $R_1$ through $R_4$ in channel Q in FIG. 9.

It will also be remembered from the description of FIG. 9 that on each recirculation of the inventory item quantities out of the long channel and into the auxiliary channel Q, the carry sign digits of the item quantity digits are also placed in the long precession channel F. This operation is specified by terms 130 and 131 in Equations 39 and 40, which imply that during the fifth digit time interval of each sector quadrant ($M_1T'$) during the compute routine (V) the contents of read flip-flop $D_1$ are shifted into the F channel when the H' domain of the principal memory long channel is being scanned, while the contents of read flip-flop $D_2$ are shifted into the F channel when the H domain of the principal memory long channel is being scanned. It should be here pointed out that during the first four digit intervals of each sector quadrant the F channel recirculates the binary threes written therein during the prepare to compute routine described previously. The recirculation of the binary threes is specified by terms 132 and 133 of Equations 39 and 40, respectively.

Each carry sign digit placed in the F channel appears in read flip-flop $F_1$ in channel F during the fifth digit interval of the sector quadrant immediately preceding the appearance in auxiliary channel read flip-flop $Q_1$ of the item quantity digit to which the carry sign digit pertains, owing to the fact that channel F is six bits shorter in length than auxiliary channel Q as disclosed in FIG. 8. Each carry sign digit thus presented by flip-flop $F_1$ is then shifted into flip-flop $F^3$ where it is permitted to remain during the next sector quadrant interval while its associated item quantity digit is presented by flip-flop $Q_1$, the shift of the carry sign digits into flip-flop $F_3$ being specified by terms 134 and 135 of Equations 11 and 12, respectively.

Now ordinarily, in the absence of an inventory change operation the carry digits stored in flip-flop $F_3$ are not utilized and are replaced every six bits by the next succeeding carry sign digit. More specifically, the precessed carry sign digits stored in flip-flop $F_3$ are only used as a control function when an inventory change operation is being performed on the inventory item quantity which includes the item quantity digit to which the carry sign digit pertains.

Consider now the manner in which the inventory change subroutine is initiated. It should be remembered first that each item entry in intermediate channel P is preceded by an $f$ mark, and that the block address stored in the intermediate channel has been catalogued intentionally as belonging in the inventory block two blocks lower than the actual block in which its corresponding inventory item quantity is contained.

As each $f$ mark appears in intermediate memory read flip-flop $P_1$ indicating that the following item sector contains an item entry, the $f$ mark is shifted into flip-flop $P_2$ and is rewritten. Simultaneously with the rewriting of the $f$ mark in the P channel, it is shifted into flip-flop S as specified by term 136 of Equation 19, wherein $$U'M_1'M_2T'$$

identifies the first digit interval of sector quadrant 1 at which time the $f$ mark is in write flip-flop $P_2$. The S flip-flop then functions to compare the binary bits of the block address digits of the item entry in channel P with those of the block address count in address channel A, a negative comparison resulting in a zeroing signal being applied to the S flip-flop, as specified by term 137 of Equation 21. It will be noted from term 137 that the binary bits are compared while they are in flip-flop $A_2$ and $P_2$, rather than when they are in flip-flops $A_1$ and $P_1$; the reason for this is the fact that the S flip-flop was set to one during the first digit interval of sector quadrant 1, and unless the bits are compared while in flip-flops $A_2$ and $P_2$, the first binary bit of the units digit of the block address could not be compared. It should also be noted that term 137 includes the timing expression $(M_2'+M_1T')$ which identifies the second through fifth digit intervals of each sector quadrant. However, since one digit interval was consumed in shifting the block address digits from flip-flop $P_1$ to $P_2$ and from flip-flop $A_1$ to $A_2$, it will be seen that the comparison is still made on the bits which appeared in flip-flops $A_1$ and $P_1$ during the first four digit intervals of sector quadrants 1 and 2.

If the block address digits of the item entry and the block address digits of the address count compare favorably, flip-flop S remains in its one-representing state on through sector quadrants 1 and 2. The conduction state of flip-flop S at the end of sector quadrant 2 is then recorded in the sixth digit space in the precessing F channel, as specified by terms 138 and 139 in Equations 39 and 40, respectively, a positive block address comparison resulting in the writing in the F channel of a $g$ mark represented by a binary one. It will be recalled that the $g$ mark as written is represented in FIG. 9 by the space designated $g_1$.

If the S flip-flop has indicated a positive block comparison, it remains in its one-representing state on through the following sector quadrants 3 and 4, and at the end of sector quadrant 4 again takes the contents of the succeeding $f$ mark space. Obviously if the succeeding item sector is filled and has an $f$ mark, flip-flop S will still remain in its one-representing state and initiate another block address comparison. If, on the other hand, the following item sector is idle, flip-flop S is zeroed in accordance with term 140 of Equation 20. It will be noted that term 136 of Equation 19 and term 140 of Equation 20 combine to place into flip-flop S a binary one each time an $f$ mark is detected, and to either maintain the S flip-flop in its zero state, or to restore it to its zero state whenever there is no $f$ mark indicating that the following item sector in the intermediate channel is vacant.

The $g$ mark written in the F channel is now circulated therethrough, and next appears at read flip-flop $F_1$ advanced six bit spaces with respect to the intermediate channel contents, as illustrated by the space designated $g_2$ in FIG. 9. It will be recalled that the $g$ marks which appear in the F channel at the end of a sector quadrant are merely rewritten in the F chanel once more to be taken through another circulation of the F channel; the rewriting of the $g$ marks at the end of the first sector quadrant is specified by terms 141 and 142 of Equations 39 and 40, respectively.

At the end of the second recirculation of the $g$ mark, it is presented at flip-flop $F_1$ during the last digit interval of the item sector preceding the item sector to which it pertains, and simultaneous with the presentation of the corresponding $f$ mark in channel P indicating that the following item sector contains an item entry. The coincidence of the $f$ and $g$ marks is now detected by control flip-flop N, which is set to one if $f$ and $g$ marks are simultaneously received as specified by term 143 of Equation 15, and is set to or maintained at zero if $f$ and $g$ marks are not simultaneously received, as specified by term 144 of Equation 15. In addition to setting control flip-flop N to its one-representing state, the coincidence of the $f$ and $g$ marks is used to erase the $f$ mark by writing a binary zero in intermediate channel P so that on subsequent recirculations the item sector now about to be operated upon will appear vacant to future keyboard entries. The erasure of the $f$ mark is specified by term 145 of Equation 34, which is substantially identical with term 143 in Equation 15 for setting flip-flop N to its one-representing state.

The setting of flip-flop N to its one-representing state at the end of sector quadrant 4 signifies that the following item increment and item quantity are to be combined. However, the N flip-flop must first hold over through sector quadrants 1 and 2 owing to the fact that the item increment units digit and the units digit of the item quantity are not available to be operated upon until sector quadrant 3. Recalling now that flip-flop N will be restored to zero at the end of sector quadrant 2 by term 121 of Equation 16, it will be recognized that the control function should be shifted to another logical element for controlling the subsequent inventory change operation. This is done by setting flip-flop G during the last digit interval of sector quadrant 2 to the state previously held by flip-flop N, this operation being specified by terms 146 and 147 in Equations 21 and 22, respectively. It should be here noted that these terms imply that the G flip-flop will stay in the state to which it has been set for only one sector interval, or in other words, just long enough to complete the inventory change operation, after which the G flip-flop will be zeroed by term 147 unless the N flip-flop is again operated to indicate two successive inventory change subroutines are to be carried out using two successive item entries in the intermediate channel P.

During the last digit interval of sector quadrant 2 still another operation is performed, namely, the item increment sign digit $S_1$ is abstracted from the P channel and is placed in flip-flop X to control the arithmetic operations which follow, the shift of the sign digit into flip-flop X being specified by terms 148 and 149 of Equations 13 and 14, respectively. It will be recalled that if an item increment sign digit has a binary value of one, the item increment is to be added to the corresponding item quantity, while if the sign digit has a binary value of zero the item increment is to be subtracted from its corresponding item quantity.

After the G flip-flop has been set to its one-representing state and after the X flip-flop has received the sign digit, the actual inventory change operation begins. Before describing this operation in detail, it should be recalled that the change operation actually consists of two operations which are carried out simultaneously, namely the excess-three code fix-up or conversion of the item quantity digits, as they appear at auxiliary channel read flip-flop $Q_1$, to the true excess-three binary coded decimal code, and the modification of the item quantity digits, as they appear at flip-flop L, in accordance with the sign and magnitudes of the item increment. For purposes of clarity, the excess-three code fix-up will first be described, after which the addition or subtraction of the item quantity and item increment will be described. It should be kept in mind, however, that both of these operations are actually being carried on simultaneously.

In considering the excess-three code fix-up of the digits of the item quantity to be operated upon, it is important to recall that a carry sign digit of zero represents a plus indicating that a binary three should be added to the corresponding quantity digit, and that a carry sign digit of one represents a minus indicating that a binary three should be subtracted from the corresponding quantity digit. It should also be pointed out that the operation of subtraction is carried out by adding to the pertinent quantity digit the complement of a binary three, plus one in the least significant place. In other words, if a plus three fix-up is required, the binary number 0011 is added to the quantity digit, whereas if a minus three fix-up is required, the binary three complement 1100, plus a one in the least significant digit which makes it 1101, is added to the pertinent quantity digit.

Recall now from the description of FIG. 9 that each carry sign digit is shifted into flip-flop $F_3$ in accordance with terms 134 and 135 of Equations 11 and 12 so that flip-flop $F_3$ can control whether the fix-up is positive or negative, a plus three fix-up being indicated when flip-flop $F_3$ is in its zero-representing state ($F_3'$) while a minus three fix-up is indicated when flip-flop $F_3$ is in its one-representing state ($F_3$). In addition to being shifted into flip-flop $F_3$, each carry sign digit is shifted simultaneously into carry flip-flop $C_2$, as specified by terms 150 and 151 in Equations 25 and 26, respectively. This flip-flop is used as the carry flip-flop in the excess-three code fix-up, a binary zero being initially recorded therein when a plus three fix-up is required and a binary one being initially recorded therein when a minus three fix-up is required. It should be clear, therefore, that the setting of flip-flop $C_2$ to one for a minus three fix-up functions to provide the additional binary one which must be added to the least significant digit during the subsequent subtraction operation which is performed by complementing the subtrahend and adding.

Assume now that the units digit $Q_1$ of the item quantity being operated upon has a carry sign digit $R_1$ of zero, indicating that a plus three fix-up is to be made. The item quantity digit presented at read flip-flop $Q_1$ and the binary three presented at read flip-flop $A_1$ are then additively combined during the first four digit intervals of sector quadrant 3 with flip-flop $C_2$ being used as the carry flip-flop, the sum thereby generated being shifted into flip-flop L. It will be recognized that this is another example of the full binary addition well known to the art, the sum signals shifted into flip-flop L being specified by the unreduced terms 152 and 153 in Equations 35 and 36, respectively. As each binary bit of the item quantity digit is added to the correspondingly weighted binary digits of the binary three sequentially presented at flip-flop $F_1$ the carry digits generated by the additive process are stored in flip-flop $C_2$ as specified by terms 154 and 155 in Equations 25 and 26, respectively. It should be noted that the expression $F_3'$ in these terms again implies an addition of a binary three, while the expressions ($F_1Q_1$) in term 154 and ($F_1'Q_1'$) in term 155 are logical contractions or simplifications of the full carry expressions $(Q_1C_2F_1+Q_1'C_2F_1+Q_1C_2'F_1+Q_1C_2F_1')$ and $$(Q_1'C_2'F_1+Q_1'C_2F_1'+Q_1C_2'F_1'+Q_1'C_2'F_1')$$

respectively.

If, on the other hand, it is assumed that the carry sign digit stored in flip-flops $F_3$ and $C_2$ is one, a minus excess-three fix-up is indicated and a full addition is again made, only this time the signals utilized from flip-flop $F_1$ are reversed so that the complement of the binary three is added to the item quantity digits. The sum thus generated is of course shifted into flip-flop L in the same manner as above, the sequential binary digits of the sum being specified by terms 156 and 157 in Equations 35 and 36, respectively. Again the carries resulting from the addition on each pair of correspondingly weighted binary digits are stored in flip-flop $C_2$ to be added with the next higher order binary digit, this operation being specified by terms 158 and 159 in Equations 25 and 26, respectively, wherein the expression $F_3$ implies a minus three fix-up and wherein the expressions ($F_1'Q_1$) and ($F_1Q_1'$) are logical contractions of the full carry expressions $(Q_1C_2F_1'+Q_1'C_2F_1'+Q_1C_2'F_1'+Q_1C_2F_1)$ and $(Q_1'C_2'F_1'+Q_1'C_2F_1+Q_1C_2'F_1+Q_1'C_2'F_1)$, respectively.

It should be pointed out that there is no carry over from any item quantity digit to the next higher decade digit of the item quantity, but that flip-flop $C_2$ is set by terms 150 and 151 at the beginning of the operation on each digit. The reason for this apparent failure to propagate carries is the fact that it may be shown by number theory that no carry can ever result from a mere excess-three code fix-up. It should also be reemphasized that the item quantity digits shifted into and sequentially presented by flip-flop L are represented in the true excess-three binary coded decimal code, and are now ready to be combined with the item increment stored in the intermediate channel P.

Consider now the addition of the item increment and item quantity. It will be recalled from the description of FIG. 9 that the item increment is combined with the units and tens digits of the inventory item quantity during sector quadrant intervals 3 and 4, or in other words while flip-flop J is in its one-representing state. It will also be recalled from the description set forth above that the item increment sign $S_1$ has been stored in flip-flop X to indicate whether the item increment should be added to or subtracted from its item quantity. Again, as in the excess-three code fix-up previously described, a subtraction of the item increment is accomplished by complementing the item increment and adding one to the least significant binary digit, the add one to the least significant digit in the case of subtracton being in turn by shifting the complement of the sign digit $S_1$ into flip-flop $C_3$, as specified by terms 161 and 160 in Equations 27 and 28, respectively.

It will be remembered that the $C_3$ flip-flop is the carry flip-flop used in combining the item increment and item quantity, and thus if $S_1$ is a one indicating that the item increment is to be added to its item quantity, term 161 sets flip-flop $C_3$ to an initial zero state, whereas if $S_1$ has a value of zero indicating that the item quantity is to be subtracted from its item quantity, flip-flop $C_3$ is initially set to one by term 160 to provide the additional one in the least significant binary digit. Before describing the equations for combining the item increment and item quantity, it should also be pointed out that the combining operation is accomplished during the second through fifth digit intervals $(M_2'+M_1T')$, rather than during the first four digit intervals, since there is one digit time interval delay between the time the binary bits of each quantity digit appear in auxiliary channel flip-flop $Q_1$ and the time the corrected bits appear in flip-flop L.

If it is assumed now that the sign of the item increment is positive, flip-flop X in its one-representing state directs the addition of the item increment in accordance with the full adder terms 162 and 163 of Equations 37 and 38, respectively, the result being stored in flip-flop W to be rewritten in the principal inventory long channel. Simultaneous with the generation of each binary digit of the sum, flip-flop $C_3$ stores any carry digits generated for inclusion in the next arithmetic operation, this operation being specified by the simplified terms 164 and 165 in equations 27 and 28, respectively.

During sector quadrant intervals 1 and 2, on the other hand, the item increment has passed and the binary threes from the F channel are added to the hundreds and thousands digits of the item quantity, together with any carries propagated up from the next lower stages of carry flip-flop $C_3$. This is therefore another full adder operation as specified by terms 166 and 167 of Equations 37 and 38, the only difference between these terms and terms 162 and 163 being that flip-flop $F_2$ is used instead of flip-flop $P_2$, and flip-flop J is in its zero-representing state J' during sector quadrant intervals 1 and 2. The carry digits generated for inclusion in the next arithmetic operation are here specified by terms 168 and 169 of Equations 27 and 28, respectively.

If one the other hand it is assumed that the item increment sign digit is zero, in which case flip-flop X is in its zero-representing state, the complementary output signals are taken from flip-flop $P_2$ during sector quadrant intervals 3 and 4 and from flip-flop $F_2$ during sector quadrant intervals 1 and 2. Thus full adder terms 170 and 171 of Equations 37 and 38 specify the generation of the sum digits while the item increment is being subtracted from the item quantity by complementing and adding, while simplified terms 172 and 173 in Equations 27 and 28 specify the generation of carries. Similarly, during the following sector quadrant intervals 1 and 2 full adder terms 174 and 175 of Equations 37 and 38 specify the generation of the sum digits while binary threes from the F channel are substracted from the hundreds and thousands digits of the item quantity, whereas the simplified terms 176 and 177 in Equations 27 and 28 specify the generation of carry digits.

Regardless of whether the item increment is being added to or subtracted from its item quantity during the inventory change subroutine, any carry digits stored in flip-flop $C_3$ at the end of the arithmetic operation on a particular item quantity digit are carried over for inclusion in the arithmetic operation on the next higher order item quantity digit. In addition to this, it will be recalled that each carry digit must be stored in the fifth digit space following its newly generated item quantity digit, since it will be remembered that the newly formed item quantity digits shifted back into the principal memory are once more in error and will subsequently require an excess-three code fix-up of either plus three or minus three, depending upon the sign of the carry digit. The storage of the carry digits is accomplished by shifting into flip-flop W during the sixth digit time interval the inverted contents of flip-flop $C_3$, as specified by terms 178 and 179 of Equations 37 and 38, respectively.

The reason for the above-described inversion of the signals is that when flip-flop $C_3$ is in its one-representing state it presents a carry digit of plus one indicating that plus three must be added in the subsequent excess-three code fix-up, whereas if flip-flop $C_3$ is in its zero state at the end of the arithmetic operation on a particular item quantity digit a minus three fix-up must be made subsequently; however it will be recalled from the description of terms 134 and 135 in Equations 11 and 12, and of terms 150 and 151 in Equations 25 and 26 that a carry digit of plus one received from the long precessing channel F indicates a minus three fix-up whereas a zero carry sign digit received from the precessing channel F indicates a plus three. Accordingly, the carry sign digit is inverted when it is shifted from flip-flop $C_3$ into flip-flop W so as to compromise these different notations.

The only operation remaining to be described in the carrying out of the inventory change subroutine is the handling of the item quantity sign digit $S_2$ in the sixth bit space following the fourth item quantity digit of the item quantity. It should be pointed out first that a zero stored in the $S_2$ bit space represents a positive inventory of the particular item quantity to which it relates, while a one stored in the $S_2$ bit space represents a back-ordered inventory of the item quantity. It should next be kept in mind that when flip-flop X is in its one-representing state, the item increment is added to the item quantity, whereas the item increment is substracted from the item quantity when flip-flop X is in its zero-representing state. Finally it should be noted that the carry digit stored in flip-flop $C_3$ at the end of the arithmetic operation on the thousands decade digit of the item quantity may be employed in conjunction with the old sign digit $S_2$ and the state of flip-flop X to indicate what the new sign digit should be.

The following truth table correlates the value of the new sign digit with the value of the old sign digit, the particular arithmetic operation performed, and the value of the carry digit generated by the arithmetic operation on the highest order decade digit of the item quantity.

TABLE VIII

| Condition | Old Sign Digit Flip-flop $Q_1$ | Arithmetic Operation Flip-flop X | Carry Digit Flip-flop $C_3$ | New Sign Digit to be placed in Long Channel |
|---|---|---|---|---|
| 1 | 0 (plus) | 1 (add) | 0 | 0 (plus). |
| 2 | 0 (plus) | 1 (add) | 1 | cannot occur. |
| 3 | 0 (plus) | 0 (subtract) | 0 | 1 (minus). |
| 4 | 0 (plus) | 0 (subtract) | 1 | 0 (plus). |
| 5 | 1 (minus) | 1 (add) | 0 | 1 (minus). |
| 6 | 1 (minus) | 1 (add) | 1 | 0 (plus). |
| 7 | 1 (minus) | 0 (subtract) | 0 | cannot occur. |
| 8 | 1 (minus) | 0 (subtract) | 1 | 1 (minus). |

Now consider the significance of the various conditions. Condition (1) states that if the inventory was positive, and the item increment was added (as for example when more of the item was received from a manufacturer), and no carry digit resulted, the sign digit of the new quantity remains positive. Condition (2) is the same as condition (1) except that a carry digit has resulted; it will be assumed that this cannot occur since this condition would imply more than ten thousand units were on hand in the inventory.

Condition (3) states that if the inventory was positive, and the item increment was subtracted therefrom (as when an order for the item is filled), and no carry digit has been generated, the sign digit should be changed to indicate a back-ordered inventory, since the order was for a larger quantity than there are units of the item on hand. Condition (4), on the other hand, is similar to condition (3) except that a carry signal resulting from the arithmetic operation indicates that there are at least as many units on hand as have just been ordered, and hence the inventory should remain positive.

Conditions (5) through (8) define the operation of the computer when the inventory is initially back-ordered or negative, conditions (5) and (6) indicating that additional units of the item have been received, while conditions (7) and (8) indicate that further orders have been received and the quantity of the item back-ordered has increased. More specifically, condition (5) represents the situation where the additional quantity received and added is insufficient to overcome the back-ordered inventory, while condition (6) represents the situation where the quantity received does overcome the back-orders. Accordingly in the latter instance the sign digit should be changed to once more indicate a positive inventory.

With respect to condition (7), it will be stipulated that this cannot occur, since it implies that so many orders have been received that the back-ordered exceeds ten thousand units. Condition (8), on the other hand, represents the instance where an additional order has been received while the inventory is back-ordered, but the new back-ordered quantity is less than ten thousand; hence the new sign digit should again be the same as the old.

Summarizing the possible conditions, therefore, it will be seen that the new item quantity sign digit is one for conditions (3), (5) and (8), and is zero for conditions (1), (4) and (6). Representing these conditions in logical algebra then results in a new sign digit of one being represented by the expression $$(Q_1'X'C_3' + Q_1XC_3' + Q_1X'C_3)$$

and a new sign digit of zero being represented by the expression $(Q_1'XC_3' + Q_1'X'C_3 + Q_1XC_3)$. Owing to the fact that conditions (2) and (7) cannot occur, these expressions may then be simplified to $$(X'C_3' + Q_1(C_3 + X'))$$

and $(XC_3 + Q_1'(C_3 + X))$, respectively.

Returning now to the description of the generation and storage of the new sign digit, it will be recalled that the new thousands digit of the item quantity is generated and stored in flip-flop W during the second through fifth digit time intervals of sector quadrant 2, and that flip-flop $C_3$ does not store the final carry digit until the sixth digit interval of sector quadrant 2. Simultaneously therewith, the old sign digit $S_2$ appears in flip-flop $Q_1$, and it is at this time that the new sign digit is formed and stored in flip-flop L, as specified by terms 180 and 181 of Equations 35 and 36, respectively.

It will be recognized that the new sign digit thus stored in flip-flop L must be shifted into flip-flop W to be rewritten in the principal inventory memory. If the following item quantity is also set-up to receive an inventory quantity, flip-flop G remains operated and the shift from flip-flop L to flip-flop W occurs in the first digit time interval of the following item sector as specified by terms 182 and 183 of Equations 37 and 38, respectively. It should be here noted that the expression $M_1'M_2$ in these terms identifies the first digit interval of each sector quadrant although in only one out of every four quadrants will a sign digit be presented in flip-flop L to be shifted into flip-flop W. However, since the other three sector quadrants have no intelligence information stored in their sixth digit spaces, as shown in FIG. 9, it is not necessary to restrict the shift function of terms 182 and 183 to only one sector quadrant.

If, on the other hand, flip-flop G, having concluded the inventory change operation, is zeroed by term 147 of Equation 22 as described previously, then the shift of the new sign digit $S_2$ into flip-flop L is made by the terms 46 and 47 in Equations 37 and 38 which have already been described.

*Information read-out subroutine*

The information read-out subroutine will be the last subroutine to be described, and has been held until last primarily because of the fact that numerous different readout systems could be employed with the inventory computers of the invention, depending upon individual customer requirements, and because different users might wish to read-out of the computer different intelligence information. Consequently, the inventory readout system to be shown and described is only exemplary and should not be construed to limit the invention.

Basically the information read-out subroutine utilized with the detailed computer herein shown and described performs two fundamentally distinct read-out functions, and employs a magnetic tape readout device of the type diagrammatically illustrated in FIG. 11. With reference now to FIG. 11 the read-out device includes a magnetic tape 1100, a plurality of channel writing transducers 1101, 1102, 1103 and 1104 driven from a corresponding plurality of writing amplifiers respectively designated CH1, CH2, CH3 and CH4, and a drive motor 1106 actuatable from a relay amplifier 1108 for moving tape 1100 past the channel writing transducers at a preselected speed.

Consider now the two different read-out functions of the inventory read-out subroutine. Firstly the computer is operative upon depression of a make-make switch B in FIG. 11 to read-out of the computer and onto tape 1100 the entire inventory stored in the principal memory of the computer. Secondly, the computer is operative each time the inventory change subroutine takes place to store in the read-out tape the various items previously tabulated in Table VI hereinabove.

Considering first the read-out of the entire inventory, this operation is usually carried out at one or more preselected times each day and is initiated by operation of make-make switch B in the read-out device at a time when no inventory item entries are being made in the keyboards. As switch B is operated a high level voltage is first transmitted to relay amplifier 1108 to turn the amplifier on and thereby energize drive motor 1106 to move the read-out tape. This operation is specified by term 184 in Equation 63.

Immediately thereafter, the operation of switch B also transmits a signal (B) to the computer which is employed to initiate the read-out of the entire inventory. Upon receipt of this signal the computer is immediately rendered operative to store in channels 3 and 4 of the read-out tape the marker bits stored in channel M and the clock signals stored in channel Cl on the inventory computer's memory drum. These operations are specified by terms 185 and 186 in Equations 71 and 72 and by term 187 in Equation 73, respectively, and are carried out so that the proper timing marks will be available on the readout tape when the tape is subsequently processed by any of numerous conversion devices, none of which is shown.

To read-out the entire inventory the computer should optimally start with item sector 00 in block 00 and end with item sector 99 in block 99. This is done by setting flip-flop $B_3$ to its one-representing state during the last digit interval of the last sector quadrant when item sector 99 in inventory block 99 is appearing in auxiliary channel read flip-flop $Q_1$, this particular digit interval being identifiable from the remaining nine thousand nine hundred and ninety-nine digit intervals of a complete inventory inventory circulation by the generation of a carry digit by the thousands decade digit of the address count. The operation of the $B_3$ flip-flop may thus be specified by term $\underline{188}$ of Equation 65, wherein $C_1$ indicates the carry digit from the address counter.

After flip-flop $B_3$ has been set to its one-representing state, the entire inventory is shifted into channel 1 on the readout tape as the inventory appears at auxiliary channel read flip-flop $Q_1$, as specified by terms $\underline{189}$ and $\underline{190}$ of Equations 67 and 68, respectively. Simultaneously therewith, the operation of flip-flop $B_3$ also serves to shift into channel 2 of the read-out tape the address of each inventory item, the address being taken from the address channel read flip-flop $A_1$ as specified by terms $\underline{191}$ and $\underline{192}$ of Equations 69 and 70, respectively.

After the entire inventory has been sequentially transmitted to the read-out tape, flip-flop $B_3$ is once more returned to its zero-representing state at the end of item sector 99 in inventory block 99 by the generation of another carry digit from the thousands decade digit of the address count, this operation being specified by term $\underline{193}$ in Equation 66. In addition, this same condition is also employed, in conjunction with the state of flip-flop $B_3$ during this same digit interval, to turn off the read-out relay amplifier, as specified by term $\underline{194}$ in Equation 64.

It should be pointed out that switch B in the read-out mechanism may be relased at any time after flip-flop $B_3$ has been set-to-one, and the read-out will still continue to completion. However, it will be recalled that the recording of the marker bits and clock pulses in channels 3 and 4 of the read-out device was initially dependent upon switch B having been depressed. In order to permit the release of switch B, without halting the recordation of the marker bits and clock pulse signals, the operation of flip-flop $B_3$ is employed to assure that these signals will continue to be recorded throughout the read-out operation, as specified by terms $\underline{195}$ and $\underline{196}$ in Equations 71 and 72, respectively, and by term $\underline{197}$ in Equation 73.

It will be recognized that each inventory item in the inventory is read out without having been corrected to the true excess-three code. However, each quantity digit carries therewith its carry sign digit, so that as pointed out previously, all of the intelligence information is provided to indicate the quantity of each inventory item either on hand or back-ordered. It will be apparent to those skilled in the art, of course, that the excess-three code fix-up could be made during information read-out with little additional sophistication in the logic of the inventory computer. However, for purposes of brevity it has been assumed that the fix-up is to be made subsequently when the read-out tape is processed.

As pointed out hereinabove, the computer is also operative each time an inventory change routine takes place to store in the read-out tape the information listed in Table VI so that each keyboard entry made may be checked immediately. However, before it is shown how this read-out is accomplished, consideration should first be given to the entry in channel B of the order identification digits $N_1$, $N_2$, $N_3$ and $N_4$ in FIG. 9. The order identification digits are actually entered in channel B during the keyboard entry subroutine simultaneous with the entry in channel P of the item increment and its block address; however, the description of operation has been deferred until this time due to the fact that the incorporation of an order identification channel is discretionary and is not essential to the operation of the inventory computer.

In the entry of the order identification digits in channel B, flip-flops $O_1$, $O_2$, $O_3$ and write flip-flop $B_2$ are employed as a shifting register for receiving a parallel shift of the binary bits of each digit from the entering keyboard, and for sequentially shifting the bits into the B channel. The shift of order identification digit $N_1$ into flip-flops $O_1$, $O_2$, $O_3$ and $B_2$ is specified by terms $\underline{198}$, $\underline{199}$, $\underline{200}$ and $\underline{201}$ in Equations 74, 76, 78 and 80, respectively. It will be noted that the shift takes place during the first digit interval of sector quadrant 1 rather than during the last digit interval of sector quadrant 4, the reason therefor being that one of the register flip-flops, namely flip-flop $B_2$, is also the write flip-flop on channel B, and hence the least significant binary bit of digit $N_1$ must be placed therein during the first digit interval of the sector quadrant.

It should also be noted that the binary bits of the order digits presented by the keyboards are represented as:

$$n_{ijk}$$

where $i=$number of keyboard entering data;
$j=$decade digit of the order number; and
$k=$binary place of each bit within its decade digit.

After the entry of the first order number digit in the flip-flops, the least significant binary bit thereof is immediately recorded by flip-flop $B_2$. Thereafter, the remaining digits are then shifted sequentially on into flip-flop $B_2$ during the second through fifth digit time intervals, as specified by terms $\underline{202}$ and $\underline{203}$ in Equations 76 and 77, by terms $\underline{204}$ and $\underline{205}$ in Equations 78 and 79, and by terms $\underline{206}$ and $\underline{207}$ in Equations 80 and 81, respectively. It should be here noted that terms $\underline{206}$ and $\underline{207}$ are qualified by the additional expression $(K_1+K_2)(J'+N)$ which indicates that the shift from flip-flop $O_3$ into flip-flop $B_2$ can only occur during the four successive sector quadrant intervals during which an inventory item is actually being entered in the computer from a keyboard. It should also be pointed out that Equation 75 includes a term $\underline{208}$ which serves to zero flip-flop $O_1$ during the second digit interval while the shift operation is taking place so that flip-flops $O_1$, $O_2$, $O_3$ and finally $B_2$ will be sequentially cleared to zero as the binary bits of the order identification digit are shifted into channel B.

After the units decade digit $N_1$ of the order identification number has been entered in channel B, the tens decade digit $N_2$ is shifted into flip-flops $O_1$, $O_2$, $O_3$ and $B_2$, during the first digit interval of sector quadrant 2, as specified by terms $\underline{209}$, $\underline{210}$, $\underline{211}$ and $\underline{212}$ of Equations 74, 76, 78 and 80, respectively. The previously described shift operation represented by terms $\underline{202}$ through $\underline{208}$ then shift these digits into the B channel and serve to again clear the register preparatory to entering the hundreds decade digit of the order identification number.

The parallel shift of the hundreds decade digit $N_3$ into the register thereafter takes place during the first digit interval of sector quadrant 3, as specified by terms $\underline{213}$, $\underline{214}$, $\underline{215}$ and $\underline{216}$ of Equations 74, 76, 78 and 80, respectively, the binary bits of the digit then again being shifted into channel B. It will be noted, however, that term $\underline{216}$ now includes a qualifying expression N which is used to distinguish the sector quadrant 3 during which an entry is being made in the memory, from the previous sector quadrant 3 during which sector address comparison fas being carried out.

In a similar manner the parallel shift into the register of the thousands decade digit $N_4$ of the order identification number is specified by terms $\underline{217}$, $\underline{218}$, $\underline{219}$ and $\underline{220}$ of Equations 74, 76, 78 and 80, respectively term $\underline{220}$ again including the expression N to prevent a false entry during the prior sector quadrant 4 when sector address comparison was being made. The binary bits are then once more shifted into the B in the previously described manner.

It will be remembered that the shift into flip-flop $B_2$ from flip-flop $Q_3$, as specified by terms 206 and 207, was qualified so that this shift could only be made during the carrying out of the keyboard entry subroutines. During all other times flip-flop $B_2$ is coupled to its associated read flip-flop $B_1$ and receives the contents thereof by a simple shift of each sequential binary bit, as specified by terms 221 and 222 of Equations 80 and 81, respectively. The expression $(K_1'K_2'+JN')$ in these equations identifies all time except when a keyboard entry is actually being made.

It has thus been shown how the order identification numbers are stored in the B channel concomitantly with the storage of the item increments or inventory change data. Consideration will now be given to the reading out of this information during the carrying out of the inventory change subroutine. It will be recalled that an affirmative block address comparison resulted in the recordation of a $g$ mark in channel F, and that this mark was recirculated through the precessing F channel twice so as to provide a means for erasing the sector filled mark $f$. The first appearance of the $g$ mark at flip-flop $F_1$, after only one recirculation, is employed to energize the relay amplifier in the read-out device for moving the read-out tape, this operation being specified by term 223 in Equation 63. After the coincidence of the $f$ and $g$ marks is later detected and flip-flop N is operated to initiate the inventory change, the order identification number is transmitted from flip-flop $B_1$ to read-out channel 1 while the item increment block address and item increment are simultaneously transmitted to read-out channel 2, these information transfers being specified by terms 224 and 225 in Equations 67 and 68, respectively, and by terms 226 and 227 in Equations 69 and 70, respectively. It will be recognized that the expressions $(J'N+ JG)$ in these terms specifies the four sector quadrant intervals during which the item sector information to be read out appears at read flip-flops $P_1$ and $B_1$ on the P and B channels, respectively.

Simultaneous with the read-out of channels P and B, the marker bits from channel M and the clock pulse signal are also applied to read out channels 3 and 4, as specified by terms 228 and 229 in Equations 71 and 72 respectively, and by term 230 in Equation 73. The expression $(J'N+G)$ in these terms indicates that the marker bits and clock pulses continue to be recorded for two sector quadrant intervals after the read-out of the order identification number and item increment with its block address has been completed, the reason therefor being to permit the recordation in read-out channel 2 of the item quantity sign digit $S_2$ as it is generated, as specified by terms 231 and 232 in Equations 69 and 70, respectively. As soon as this is accomplished the relay amplifier in the read-out mechanism is turned off during the last digit time interval during which flip-flop G is operated, as specified by term 233 in Equation 64.

It should be pointed out that if the read-out system functions in according with the foregoing logic, the relay amplifier should preferably include a count-up count-down accumulator which is responsive to each turn-on signal to the amplifier to count-down, and to each turn-off signal to the relay amplifier to count-up, the conduction state of the most significant digit stage of the accumulator being used to control a motor energizing relay. The reason for incorporating the accumulator in the read-out device resides in the fact that one complete block interval elapses between the turning on of the relay amplifier by term 223 of Equation 63 and the recordation of the item increment and order identification number in the read-out tape; inasmuch as other inventory change operations might be taking place during this interval and since each such operation will generate a turn-off signal at its conclusion, it is clear that a structure is required to insure that the tape unit is still operative each time an invenory change operation takes place.

It will be recognized by those skilled in the art, of course, that other structures could be employed to insure that the tape unit remained operative until the information from each inventory change operation was recorded therein. For example, the relay amplifier could include a relatively slow release relay so that each time a turn-on signal was received in accordance with term 223 of Equation 63, the relay would be momentarily energized and would not release until sufficient time had elapsed for the recordation in the read-out channels of the subsequently occurring inventory change operation information. If this technique were to be employed term 233 of Equation 64 would not be required.

It is clear, of course, that numerous other modifications and alterations could be made in the inventory computer herein described without departing from the spirit or scope of the invention. As pointed out previously, for example, additional structure could be provided without inventive skill to make the excess-three code fix-up of the newly formed item quantity digits before they are restored to the principal memory of the computer. It should also be reemphasized that the logical equations defining the logical mechanizatin of the computer have been set forth in their unreduced form for purposes of clarity, and that these equations may be greatly simplified in accordance with well known techniques of Boolean algebra, as was done in the instance of terms 22 and 26 in Equations 6 and 8 for example, to thereby greatly simplify the mechanization of the logical gating matrix. Accordingly it is to be expressly understood that the invention is to be limited only by the spirit and scope of the appended claims.

What is claimed as new is:

1. In an electrical digital computer including a principal memory for serially presenting at a read point electrical signals representing information items to be operated upon, said principal memory being divided into a plurality of blocks each having a plurality of sectors, one sector for each information item, an identification system for identifying the appearance at the read point of the electrical signals representing the item stored in a selected sector of a selected block of the principal memory, said system comprising: an intermediate memory operable in synchronism with the principal memory, said intermediate memory having a storage capacity equal to the storage capacity of one block of the principal memory and being divided into a plurality of sectors, one for each sector of a block of the principal memory; means for storing in the sector of said intermediate memory associated with the selected sector electrical signals representative of the selected block; block counting means for generating electrical signals repesentative of the block of the signals appearing at the read point; and indicating means, for indicating correspondence between the signals generated by said counting means and said electrical signals stored in said intermediate memory to identify the appearance at the read point of the signals representing the selected item.

2. In an electronic digital computer including a principal memory for serially presenting at a read point electrical signals representing information items to be operated upon, said principal memory being divided into a plurality of blocks each having a plurality of sectors, one sector for each information item, an identification system for identifying the appearance at the read pont of the electrical signals representing the item stored in a selected sector of a selected block, said system comprising: an intermediate memory operable in synchronism with the principal memory, said intermediate memory including a plurality of sectors corresponding respectively to the plurality of sectors in a block of the principal memory; means for storing in the sector of said intermediate memory corresponding to the selected sector electrical signals representative of the block to be selected; generating means for generating electrical signals representative of the block of the signals appearing at the read point; and comparison means, responsive to the signals generated by said generating means and said electrical signals stored in said intermediate memory, for generating a comparison signal when the signals generated by said generating means correspond to the signals stored in said intermediate memory.

3. In an electronic digital computer including a principal memory for serially presenting at a read point electrical signals representing information items to be operated upon, said principal memory being divided into a plurality of blocks each having a plurality of sectors, one sector for each information item, an identification system for identifying the appearance at the read point of the electrical signals representing the item stored in a preselected sector of a preselected block identified by sector address signals and block address signals received from an input device, said system comprising: an intermediate memory operable in synchronism with the principal memory, said intermediate memory having a storage capacity equal to the storage capacity of one block of the principal memory and being divided into a plurality of sectors, one for each sector of a block of the principal memory; means responsive to the sector address signals received from the input device for storing in the sector of said intermediate memory associated with the selected sector the block address signals received from the input device; block counting means for generating electrical signals representative of the block of the signals appearing at the read point; and indicating means, for indicating correspondence between the signals generated by said counting means and the signals stored in said intermediate memory to identify the appearance at the read point of the signals representing the selected item.

4. In an electronic digital data processor including a principal memory for serially presenting at a read point electrical signals representing a plurality of item quantities to be operated upon, said principal memory being divided into a plurality of blocks each having a plurality of sectors, one sector for each item quantity, a control network for changing the quantity of a selected item, in the principal memory by an incremental amount represented by an incremental change signal, the selected item having a preselected block address and a preselected sector address, said control network comprising: an intermediate memory operable in synchronism with the principal memory, said intermediate memory being divided into a plurality of sectors corresponding respectively to the sectors in a block of the principal memory; means for storing in the sector of said intermediate memory corresponding to the preselected sector electrical signals representative of the selected block address and of the incremental change; generating means for generating electrical signals representative of the block address of the signals appearing at the read pont; comparison means responsive to the signals generated by said generating means and the selected block address signals stored in said intermediate memory for generating a comparison signal when the signals generated by said generating means correspond to the selected block address signals stored in said intermediate memory; means responsive to said comparison signal for combining the signals representing the selected item quantity with the signals representing the incremental change to produce output signals representing the new quantity for the selected item; and means for recording said output signals in the preselected sector in the preselected block in the principal memory.

5. In an electronic digital data processor including a principal memory for serially presenting at a read point electrical signals representing a plurality of item quantities to be operated upon, said principal memory being divided into a plurality of blocks each having a plurality of sectors, one sector for each item quantity, a control network for changing the quantity of a selected item in the principal memory by an incremental amount represented by an incremental change signal received from an input device, the selected item having a preselected block address and preselected sector address identified by signals also received from the input device, said control network comprising: an intermediate memory operable in synchronism with the principal memory, said intermediate memory being divided into a plurality of sectors corresponding respectively to the sectors in a block of the principal memory; means responsive to the sector address signals from the input device for storing in the sector of said intermediate memory corresponding to the preselected sector the electrical signals representative of the preselected block address and of the incremental change; and means responsive to the preselected block address signals stored in said intermediate memory for combining the signals representing the selected item quantity with the signals representing the incremental change to produce output signals representing the new quantity for the selected item.

6. The electronic digital data processor defined in claim 5 which further includes means for recording said output signals in the preselected sector of the preselected block in the principal memory.

7. In an electronic digital data processor including a recirculating principal memory for serially presenting at a read point electrical signals representing a plurality of item quantities to be operated upon, said principal memory being divided into a plurality of blocks each having a plurality of sectors, one sector for each item quantity, a control network for changing the quantity of a selected item in the principal memory by an incremental amount represented by an increment change signal received from an input device, the selected item having a preselected block address and preselected sector address identified by signals also received from the input device, said control network comprising: a recirculating intermediate memory operable in synchronism with the principal memory, said intermediate memory being divided into a plurailty of sectors corresponding respectively to the sectors in each block of the principal memory; an address counter operable in synchronism with the principal memory for producing output signals representative of the block and sector address of the item quantity whose signals are appearing at the read point; means responsive to the sector address signals from the input device and the sector address represented by the output signals from said counter for storing in the sector of said intermediate memory corresponding to the preselected sector the electrical signals representative of the preselected block address and of the incremental change; and means responsive to the preselected block address signals stored in said intermediate memory and the block address signals from said counter for combining the signals representing the selected item quantity with the signals representing the incremental change to change the item quantity by the incremental change.

8. In a digital data processing machine wherein a plurality of sequential blocks of information data, each composed of a plurality of sequential sectors of information data, are stored as signals in a principal recirculating memory which includes read means for sequentially presenting electrical signals representing the sequential sectors of data within the sequential blocks of data stored in the principal memory and writing means for recording in the principal memory signals applied thereto, an input buffer unit for receiving from at least one input device input data relating to the information data stored in a specified one of the information sectors in a specified one of the information blocks and for combining the input data with the information data to which it relates, said input buffer unit comprising: a control circuit normally operable to apply to the principal memory writing means the signals presented at the principal memory read means; an address counter operable in synchronism with the principal memory for sequentially presenting output signals representing the sector address and the block address of the information signals being sequentially presented by the principal memory rear means; an intermediate memory synchronized with said principal memory for temporarily storing input data received from the input device, said intermediate memory including first means for recording applied signals and second means for presenting after a predetermined time delay signals recorded by said first means, said predetermined time delay being equal to the time required for the signals representing one complete block of information data to be presented by the read means of the principal memory; selectively actuable means normally operative to apply to said first means signals presented by said second means; means coupled to said address counter and to the input device for actuating said selectively actuable means to apply to said first means signals representing the input data and the specified block address when the specified sector address corresponds to the sector address represented by the output signals from said address counter; comparator means coupled to said address counter and said second means for generating a control signal when upon recirculation of said intermediate memory the signals representing the specified block address correspond to the block address represented by the output signals from said address counter, and means coupled to said reading means and to said second means and responsive to said control signal for combining the signals representing the input data with the information sector signal from the principal memory reading means to apply to said principal memory write means new information sector signals representative of the combination of the input data and the information data represented by the signals being read.

9. The digital data processor defined in claim 8 wherein said address counter includes a recirculating memory the recirculation period of which corresponds to the time required for the signals representing one sector of data to be presented at said principal memory read means.

10. In a digital data processing machine wherein a plurality of sequential information blocks, each composed of a plurality of sequential sectors representing a corresponding plurality of item quantities, are stored as signals in a principal recirculating memory which includes read means for sequentially presenting electrical signals representing the sequential item quantities within the sequential blocks of data stored in the principal memory and writing means for recording in the principal memory signals applied thereto, an input buffer unit for receiving from at least one input device electrical signals representing a quantity change to be made to the item quantity stored in a specified one of the sectors in a specified one of the information blocks and for combining the quantity change with the item quantity to which it relates, said input buffer unit comprising: a control circuit normally operable to apply to the principal memory writing means the signals presented at the principal memory read means; an address counter operable in synchronism with the principal memory for sequentially presenting output signals representing the sector and block addresses of the item quantities sequentially presented by the principal memory read means; an intermediate memory synchronized with said principal memory for temporarily storing quantity change data received from the input device, said intermediate memory including first means for receiving applied signals and second means for presenting after a predetermined time delay signals received by said first means, said predetermined time delay being equal to the time required for the signals representing one complete block of information data to be presented by the read means of the principal memory; selectively actuable means normally operative to apply to said first means signals presented by said second means; means coupled to said address counter and to the input device for actuating said selectively actuable means to apply to said first means signals representing the quantity change data and the specified block address when the specified sector address corresponds to the sector address represented by the output signals from said address counter; comparator means coupled to said address counter and said second means for generating a control signal when upon recirculation of said intermediate memory the signals representing the specified block address correspond to the block address represented by the output signals from said address counter, and means coupled to said reading means and to said second means and responsive to said control signal for combining the signals representing the quantity change with the signals representing the specified item quantity to apply to said principal memory write means signals representative of the algebraic sum of the item quantity change.

11. The combination defined in claim 10 wherein said address counter, said intermediate memory and the principal memory comprise tracks on a common magnetic drum.

12. In an electronic digital computer, an input buffer unit for receiving groups of input information from one or more input devices and for temporarily storing each group of information until it can be deposited in a predetermined spot in a principal recirculating memory, said input buffer unit comprising: an intermediate recirculating memory operable in synchronism with the principal memory, said intermediate memory containing a plurality of sequential information storage spots and making an integral number ($n$) of recirculations during each recirculation of the principal memory whereby each sequential information storage spot in the intermediate memory corresponds to $n$ equally spaced spots in the principal memory, said $n$ spots being available at the principal memory at equally time spaced intervals, first transfer means operable during a single recirculation of said intermediate memory for entering only one group of information from each input device into that one of the intermediate memory spots which corresponds to the principal memory spot for which the group of information is destined; and second transfer means for transferring the group of information from said intermediate memory to the principal memory when the principal memory spot for which it is destined becomes available to receive information.

13. In an electronic digital computer, an input buffer unit for receiving groups of input information from one or more input devices and for temporarily storing each group of information until it can be deposited in a predetermined spot in a principal recirculating memory, said input buffer unit comprising: an intermediate recirculating memory operable in synchronism with the principal memory, said intermediate memory making an integral number ($n$) of recirculations during each recirculation of the principal memory, whereby each sequential information storage spot in the intermediate memory corresponds to $n$ equally spaced spots in the principal memory, said $n$ spots being available at the principal memory at equally time spaced intervals; first transfer means for entering each group of information from the input device into the intermediate memory spot which corresponds to the principal memory spot for which the group of information is destined; second transfer means for transferring the group of information from said intermediate memory to the principal memory when the principal memory spot for which it is destined becomes available to receive information; and including means for indicating when an information storage spot in said intermediate memory contains a group of information, and means for indicating when an information storage spot in said intermediate memory is idle, said first transfer means being operable to enter a group of information into said intermediate memory only when the intended information storage spot therein is idle.

14. In an electronic digital computer, an input buffer unit for selectively receiving groups of input information from a plurality of input devices and for temporarily storing each group of information until it can be deposited in a predetermined spot in a principal recirculating memory having an input and an output circuit, said input buffer unit comprising: an intermediate recirculating memory operable in synchronism with the principal memory and having an input circuit and an output circuit, said intermediate memory including a plurality of sequential information storage spots each of which is presented at the output circuit of said intermediate memory, during successive recirculations thereof, simultaneous with the presentation at the output circuit of the principal memory of successive ones of a plurality of equally time-spaced spots in the principal memory which correspond to the information storage spot being presented by said intermediate memory output circuit; first transfer means for entering each group of information into only that one of the intermediate memory spots which corresponds to the principal memory spot for which the group of information is destined; and second transfer means for transferring the group of information from said intermediate memory to the principal memory when principal memory spot for which it is destined becomes available to receive information.

15. In an electronic digital computer, an input buffer unit for receiving groups of input information signals from one or more input devices and for temporarily storing each group of input information signals until it can be combined with information signals previously recorded in an associated and predetermined spot in a principal recirculating memory, said input buffer unit comprising: an intermediate recirculating memory operable in synchronism with the principal memory said intermediate memory making an integral number ($n$) of recirculations during each recirculation of the principal memory whereby each sequential information storage spot in the intermediate memory corresponds to $n$ equally spaced spots in the principal memory, the information signals stored in said $n$ spots being presented by said principal memory at equally time-spaced intervals; transfer means operable during a single recirculation of said intermediate memory for entering and storing only one group of input information signals from each input device into that one of the intermediate memory spots which corresponds to the principal memory spot wherein are recorded the information signals with which the group of input information signals are to be combined; and means for combining each group of input information signals stored in said intermediate memory with the information signals presented by the principal memory when the information signals previously recorded in the associated and predetermined spot in the principal memory are presented thereby.

16. In an electronic digital computer, the combination comprising: a relatively long recirculating loop for serially presenting groups of information signals to be operated upon; a relatively short recirculating loop for storing and serially presenting groups of input signals for operating upon said groups of information signals, each group of input signals presented by said short loop corresponding to a plurality of equally time-spaced groups of information signals presented by said long loop, each group of input signals including signals identifying a predetermined one of the plurality of equally time spaced groups of information signals as the group to be operated upon; and means responsive to each group of input signals for operating upon the predetermined one of said corresponding plurality of groups of information signals.

17. In an electronic digital computer, the combination comprising: a relatively long recirculating loop for serially presenting information signals to be operated upon; a relatively short recirculating loop for storing and serially presenting input signals for operating upon said information signals, each input signal presented by said short loop corresponding to a plurality of equally time-spaced information signals presented by said long loop, said short loop storing a first number of input signals; and means for entering in said short loop during any single recirculation thereof a second number of input signals less than said first number, said means entering each input signal in a predetermined phase of the recirculating cycle of said short loop so that each input signal is presented by said short loop coincidentally with the presentation by said long loop of the information signal upon which the input signal is to operate.

18. In an electronic digital computer, the combination comprising: a relatively long recirculating loop for serially presenting information signals to be operated upon; a relatively short recirculating loop for storing and serially presenting identification signals and input signals associated therewith for operating upon specified ones of said information signals, the recirculation period of said short loop consuming an aliquot part of the recirculation period of said long loop whereby each input signal in said short loop is presented coincidentally with a plurality of equally time-spaced information signals from said long loop, said identification signals specifying which one of said plurality of equally time spaced information signals is to be operated upon by each of said input signals; and means responsive to each input signal for operating upon the one of said plurality of information signals specified to be operated upon.

19. In a digital computer wherein a plurality of signal sets are recorded in a memory and are serially presented at a read point, each signal set comprising a group of signals to be operated upon and at least one control signal for indicating the operation to be performed, the group of signals in each signal set being presented at the read point prior to the appearance of the associated control signal at the read point, the combination comprising: a first information flow path for receiving the signals presented at the read point and including first means for re-presenting said signals after a first predetermined time delay; a second information flow path coupled to the read point for receiving the control signals and including second means for re-presenting each control signal received after a second predetermined time delay, said first predetermined time delay being longer than said second predetermined time delay by the interval required to present a signal set at the read point; and control means coupled to said first and second means and responsive to each control signal presented by said second information flow path for operating on the group of signals thereafter presented by said first information flow path.

20. In a digital computer, the combination comprising: a magnetic memory for serially storing a plurality of signal sets; a reading circuit for serially presenting the signals in each signal set, each signal set including a group of signals to be operated upon and at least one control signal for indicating the operation to be performed the group of signals in each signal set being presented by said reading circuit prior to the presentation by said reading circuit of the associated control signal; a first information flow path for receiving the signals presented by said reading circuit and for representing said signals after a first predetermined time delay; a second information flow path coupled to said reading circuit for receiving the control signal in each signal set and for representing each control signal received after a second predetermined time delay, said first predetermined time delay being longer than said second predetermined time delay by the interval required to present a signal set at said reading circuit; and control means responsive to each control signal presented by said second information flow path for operating on the group of signals thereafter presented by said first information flow path.

21. The combination defined in claim 20 wherein said magnetic memory comprises a track on a magnetic drum and wherein said first information flow path also comprises a track on said magnetic drum.

22. The combination defined in claim 20 wherein said magnetic memory comprises a magnetic drum having a magnetic track recorded thereon for storing said signal sets, and wherein said first and second information flow paths each comprises an associated magnetic track on said drum.

23. In a digital computer, the combination comprising: a magnetic memory for serially storing a plurality of signal sets; a reading circuit for serially presenting the signals in each signal set, each signal set including a group of signals to be operated upon and at least one control signal for indicating the operation to be performed, the group of signals in each signal set being presented by said reading circuit prior to the presentation by said reading circuit of the associated control signal; a first information flow path for receiving the signals presented by said reading circuit and for representing said signals after a first predetermined time delay; a second information flow path coupled to said reading circuit for receiving the control signal in each signal set and for representing each control signal received after a second predetermined time delay, said first predetermined time delay being longer than said second predetermined time delay by the interval required to present a signal set at said reading circuit; selectively actuable means coupled to said first and second information flow paths and receiving each control signal presented by said second flow path and each signal presented by said first flow path, said selectively actuable means being normally operative to re-record in said magnetic memory signals presented by said first information flow path, and being operative in response to an applied actuating signal for operating upon each group of signals received from said first information flow path in accordance with the associated control signal previously presented by said second information flow path; and means for generating and selectively applying an actuating signal to said selectively actuable means.

24. In a digital computer, the combination comprising: a first recirculating memory having a predetermined period and including a read circuit for presenting signals stored in said memory, a write circuit for recording signals in said memory, and selectively actuable control means normally operable to apply to said write circuit signals presented by said read circuit, said first memory having serially recorded therein a plurality of signal sets, each signal set including a group of address signals preceded by a first signal for indicating whether the address signals following thereafter represent useful intelligence information for initiating an electrical operation; means for generating reference address signals; comparator means responsive to each first signal presented by said read circuit for electrically comparing the following group of address signals with said reference address signals when said first signal indicates that the following group of address signals represents useful intelligence information, and for generating a control signal when a group of address signals correspond to said reference address signals; a second recirculating memory having a predetermined period shorter than that of said first recirculating memory and including a read circuit and a write circuit; means for applying to said write circuit of said second recirculating memory each control signal generated by said comparator means; means responsive to the subsequent appearance of a first signal at said read circuit of said first memory and to the appearance of the corresponding control signal at said read circuit of said second memory for actuating said selectively actuable means to apply to said write circuit of said first recirculating memory a first signal indicating that the following address signals do not represent useful intelligence information, and means responsive to said control signal for performing the electrical operation.

25. In a digital computer, the combination comprising: a first recirculating memory having a predetermined period and including a read circuit for presenting signals stored in said memory, a write circuit for recording signals in said memory, and selectively actuable control means normally operable to apply to said write circuit signals presented by said read circuit, said first memory having serially recorded therein a plurality of signal sets, each signal set including a group of information signals preceded by a first signal indicating that the information signals following thereafter are to be utilized; means, responsive to said first signal, for utilizing the following information signals and for generating a control signal; a second recirculating memory having a predetermined period shorter than that of said first recirculating memory and including a read circuit and a write circuit; means for applying each control signal to said write circuit of said second recirculating memory; each control signal recorded in said second recirculating memory being subsequently presented by the associated read circuit simultaneously with the subsequent presentation at the read circuit of said first recirculating memory of the first signal which initiated the generation of the control signal; and means responsive to the subsequent appearance of a first signal at said read circuit of said first memory and to the appearance of the corresponding control signal at said read circuit of said second memory for actuating said selectively actuable means to apply to said first memory read circuit a first signal indicating that the following information signals are not to be utilized.

26. In a digital computer, a binary coded decimal counter for generating a count signal train including $n$-sets of four sequential binary signals for representing each of the decimal digits of an $n$ decade digit count, the four sequential binary signals representing each decade digit being preceded by a carry signal for indicating whether the next carry digit signal received from the next lower decade should be used to provide an excess code fix-up, said counter unit comprising: a recirculating memory for storing the count signal train, said memory including read means for serially presenting the signals stored in said memory and write means for storing signals in said memory; signal combining means coupled to said read means, for modifying the count signal train, said combining means including first means for modifying the binary signals representing the units decade digit of the count upon each recirculation of said memory to represent an increase of one unit in the units decade digit, a carry flip-flop for generating a carry signal each time the signals representing a decade digit overflow, and second means for modifying the binary signals representing each of the higher order decade digits each time a carry signal is generated from the immediately preceding lower order decade; a precessing memory having a writing circuit and a reading circuit, said precessing memory providing to signals applied to its writing circuit a time delay equal to $$\frac{n-1}{n}$$

of the period of said recirculating memory; and means for applying each decade digit carry signal generated by said signal combining means to said write circuit of said precessing memory whereby the decade digit carry signals are presented at the read circuit of said precessing memory prior to the appearance at said read circuit of said recirculating memory of the binary signals representing the decade digit which overflowed.

27. The combination defined in claim 26 which further includes means for selectively applying to the write circuit of said recirculating memory carry signals presented by the read circuit of said pressing memory.

28. In a binary coded decimal counter for generating a count signal train including $n$-sets of four sequential binary signals for representing each of the decimal digits of an $n$ decade digit count, the four sequential binary signals representing each decade digit being preceded by a fix-up signal indicating whether a code fix-up is required on the binary signals, the combination comprising: a recirculating memory for storing the count signal train, said memory including first write means for storing binary signals applied thereto, first read means for presenting signals applied thereto, and means for applying each signal stored by said write means to said read means after a predetermined time delay; signal generating means, coupled to said read means, for generating a fix-up signal when the signals presented by said read means represent a predetermined decimal digit; a precessing memory including second write means for storing signals applied thereto, second read means for presenting signals applied thereto and means for applying each signal stored by said second write means to said second read means after a time delay equal to $$\frac{n-1}{n}$$

times said predetermined time delay; and means for applying each fix-up signal to said second write means whereby the fix-up signal is presented by said second read means prior to the presentation by said first read means of the binary signals requiring the code fix-up.

29. In an electronic digital inventory computer, adapted to store a large number of information signals representing inventory items which are subject to incremental change; the combination comprising: a relatively long recirculating loop for storing and serially presenting groups of information signals representing inventory item information; a relatively short recirculating loop for storing and serially presenting groups of input signals, each group of input signals representing an incremental change of an inventory item and an identification of the short loop cycle in which the inventory item to be changed will appear, one recirculation of said long loop equalling an integral number of recirculations of said short loop, each group of input signals being presented coincidentally with the presentation of a plurality of equally time-spaced groups of information signal; first means operable during a recirculation period of said short loop to fill only a portion of said short loop with one or more groups of input signals, each group of input signals being entered in a predetermined phase of the recirculation period of said short loop so that in subsequent recirculations of said short loop, each group of input signals is presented coincidentally with the presentation of the group of information signals it is to change; and second means operable in response to each group of input signals for modifying the coincidentally presented inventory item by the incremental change represented by the group of input signals during the recirculation of the short channel identified by the group of input signals.

30. In an electronic digital inventory computer adapted to store a large number of inventory items which are subject to change, the combination comprising: a relatively long recirculating loop for storing and serially presenting groups of information signals representing inventory item information; a relatively short recirculating loop for storing and serially presenting groups of input signals, each group of input signals including signals representing the sign and the magnitude of the change to be made to a predetermined inventory item; an integral number of recirculations of said short loop equalling one recirculation of said long loop, each group of input signals further including identification signals identifying the short loop recirculation in which a predetermined group of information signals representing the predetermined item is presented by said long loop; first means adapted to be connected to a source of input signals, said first means being operable during a recirculation period of said short loop to fill only a portion of said short loop with at least one group of input signals in a predetermined phase of the recirculation period of said short loop so that in a subsequent recirculation of said short loop each group of input signals stored in said short loop is presented coincidentally with the presentation of the predetermined group of information signals it is to change; and second means coupled to said short loop, said long loop and said first means, said second means being operable in response to each group of input signals for identifying the short loop recirculation during which the group of input signals coincides with the group of information signals it is to change and being operable during the identified recirculation, in response to the sign and magnitude representing signals of the group of input signals for modifying the coincidentally presented group of information signals to represent the changed inventory item.

31. Apparatus of claim 30 wherein said first means includes: means adapted to be connected to a source of groups of input signals and phase identification signals associated therewith; means connected to be responsive to short loop recirculation for producing signals indicating the phase thereof; coincidence means connected to be responsive to coincidence of phase identification signals and phase indicating signals for producing coincidence signals; and means connected to be responsive to coincidence signals for entering groups of input signals into said short loop in a predetermined phase of the recirculation thereof.

32. Apparatus of claim 30 wherein said second means includes: counting means operable to count recirculations of said short loop; signalling means connected to be responsive to identification signals of a group of input signals and to said counting means for producing a first signal representing the occurrence of the short loop cycle identified by said identification signals; and operating means connected to be responsive to short loop signals, long loop signals, and said first signals for producing and entering in said long loop groups of information signals representing inventory items modified in accordance with the sign and magnitude of the change, represented by the group of input signals responded to.

33. An inventory computer for storing a plurality of groups of information signals representing inventory information respecting a corresponding plurality of inventory items and for modifying ones of said items in response to updating information represented by groups of input signals provided from one or more input devices; said computer comprising: a relatively long recirculating serial memory for storing and serially presenting groups of information signals, each group of signals representing an inventory item; a relatively short recirculating serial memory for storing and serially presenting groups of input signals for updating inventory items, each recirculation of said long memory corresponding to an integral number of recirculations of said short memory, many groups of information signals of said long memory being presented coincidentally with each group of input signals in said short memory; entry means adapted to be connected to an input device and operable in response to input device signals for entering groups of input signals into a portion of said short memory, each group of input signals representing an identification of a group of information signals to be modified and the modification to be made thereto, each said group of input signals being entered in the phase of the short memory recirculation which eventually coincides with the presentation by said long memory of the group of information signals to be modified; and operating means connected to be operable in response to each group of input signals for signalling the coincidence between the presentation by the short memory of a group of input signals and the presentation by the long memory of the group of information signals to be modified by that group of input signals, said operating means being further operable in response to signalled coincidence for combining the groups of input and information signals to produce and store in said long memory a new group of information signals representing the modified inventory item.

References Cited in the file of this patent

UNITED STATES PATENTS

| | | |
|---|---|---|
| 2,416,445 | Jensen | Feb. 25, 1947 |
| 2,540,654 | Cohen | Feb. 6, 1951 |
| 2,609,143 | Stibitz | Sept. 2, 1952 |
| 2,614,169 | Cohen | Oct. 14, 1952 |
| 2,686,632 | Wilkinson | Aug. 17, 1954 |
| 2,733,425 | Williams et al. | Jan. 31, 1956 |
| 2,772,050 | Robinson et al. | Nov. 27, 1956 |
| 2,776,794 | Williams et al. | Jan. 8, 1957 |
| 2,794,970 | Yostpille | June 4, 1957 |
| 2,799,845 | Dieterich | July 16, 1957 |
| 2,831,180 | Hasbrouck | Apr. 15, 1958 |

OTHER REFERENCES

"Description of Serial Acoustic Binary Edvac," Theory and Techniques for Design of Electronic Digital Computers, Sharpless, Lecture 47, pp. 47-1 to 47-7, Fig. 1 relied on, June 1948.